May 24, 1966   D. R. FISHER ETAL   3,253,088
CENTRAL OFFICE MULTICUSTOMER PRIVATE BRANCH EXCHANGE SYSTEM
Filed May 1, 1962   46 Sheets-Sheet 1

INVENTORS
D. R. FISHER
E. J. GESING
F. H. KOSTER
R. J. KOWALINSKI
BY Howard R. Popper
ATTORNEY May 24, 1966     D. R. FISHER ETAL     3,253,088
CENTRAL OFFICE MULTICUSTOMER PRIVATE BRANCH EXCHANGE SYSTEM
Filed May 1, 1962     46 Sheets-Sheet 2

May 24, 1966 D. R. FISHER ETAL 3,253,088
CENTRAL OFFICE MULTICUSTOMER PRIVATE BRANCH EXCHANGE SYSTEM
Filed May 1, 1962 46 Sheets-Sheet 14
FIG. 14
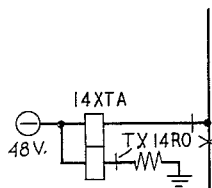
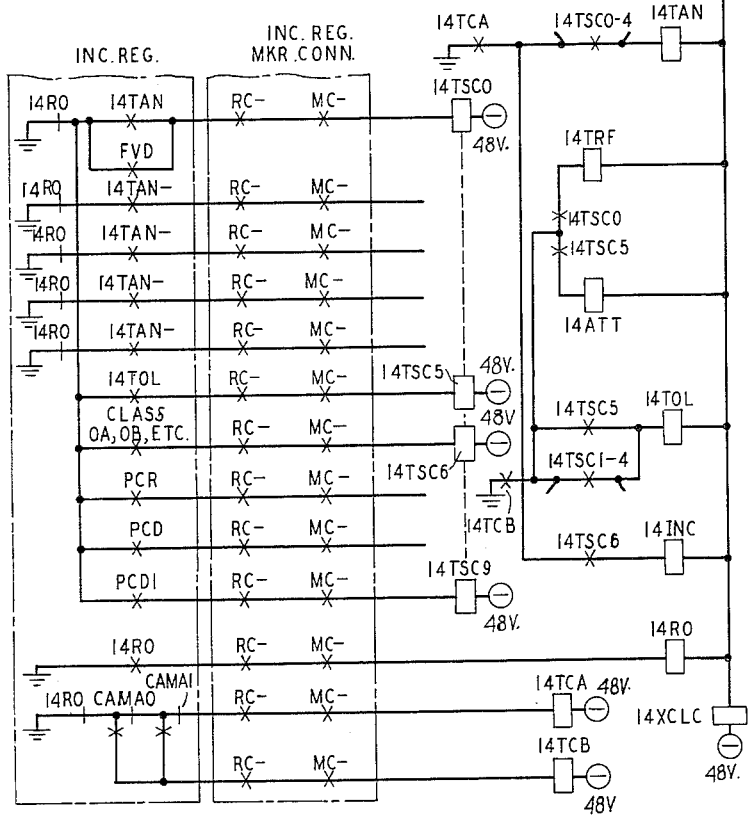
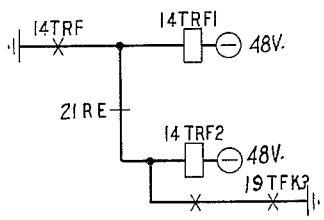

FIG. 16
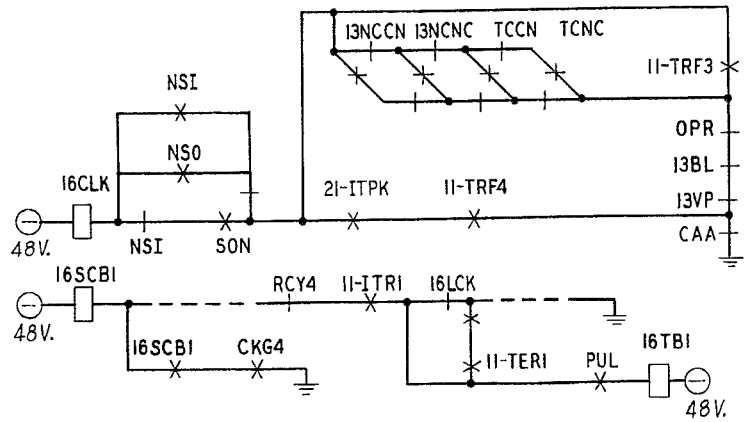
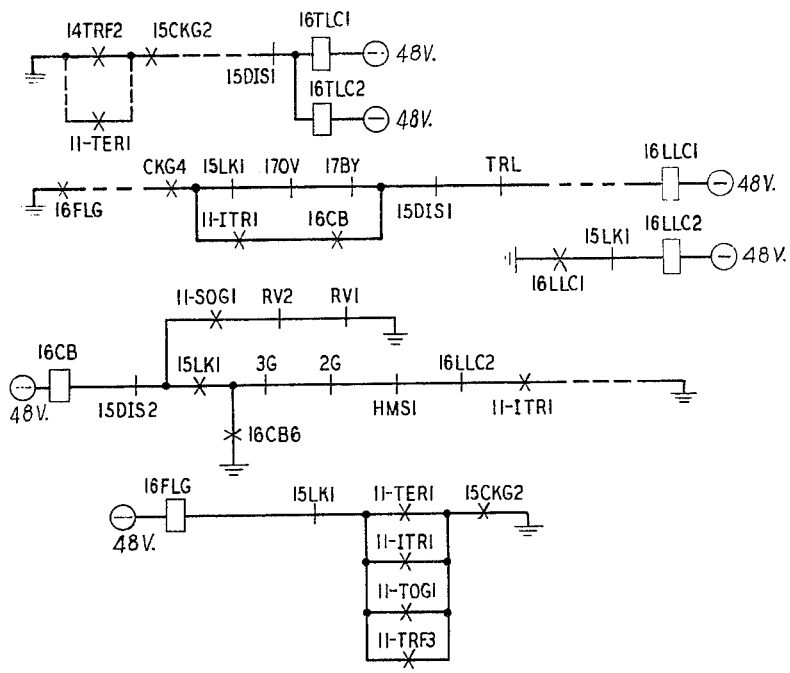

May 24, 1966 D. R. FISHER ETAL 3,253,088
CENTRAL OFFICE MULTICUSTOMER PRIVATE BRANCH EXCHANGE SYSTEM
Filed May 1, 1962 46 Sheets-Sheet 24

May 24, 1966    D. R. FISHER ETAL    3,253,088
CENTRAL OFFICE MULTICUSTOMER PRIVATE BRANCH EXCHANGE SYSTEM
Filed May 1, 1962    46 Sheets-Sheet 25

May 24, 1966 D. R. FISHER ETAL 3,253,088
CENTRAL OFFICE MULTICUSTOMER PRIVATE BRANCH EXCHANGE SYSTEM
Filed May 1, 1962 46 Sheets-Sheet 30

May 24, 1966 D. R. FISHER ETAL 3,253,088
CENTRAL OFFICE MULTICUSTOMER PRIVATE BRANCH EXCHANGE SYSTEM
Filed May 1, 1962 46 Sheets-Sheet 34

May 24, 1966  D. R. FISHER ETAL  3,253,088
CENTRAL OFFICE MULTICUSTOMER PRIVATE BRANCH EXCHANGE SYSTEM
Filed May 1, 1962  46 Sheets-Sheet 39

FIG. 41
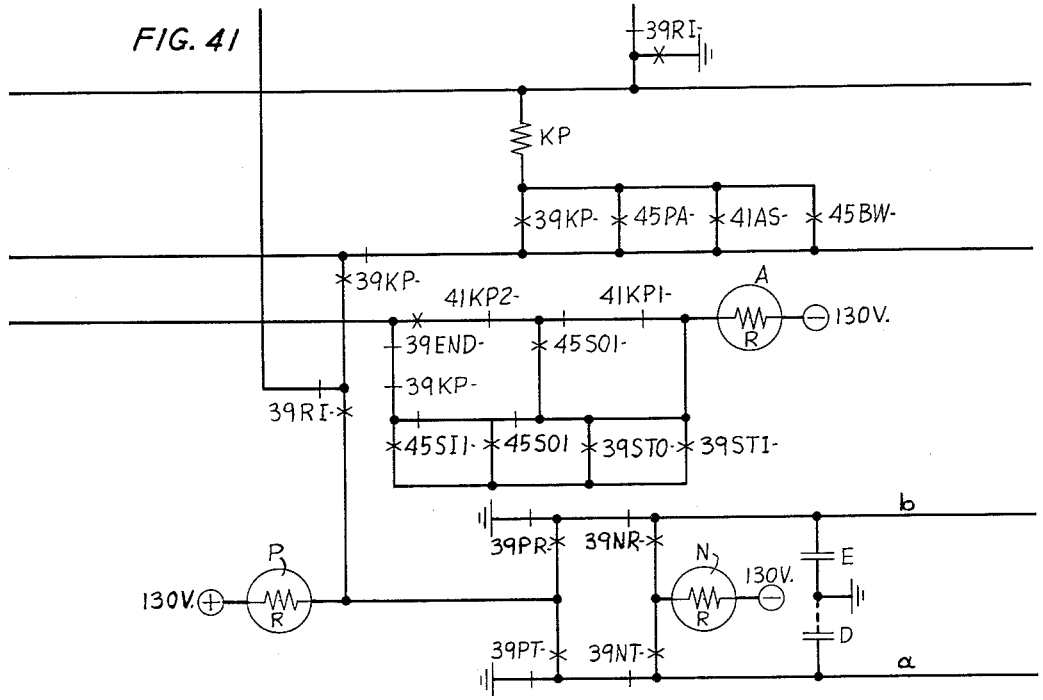
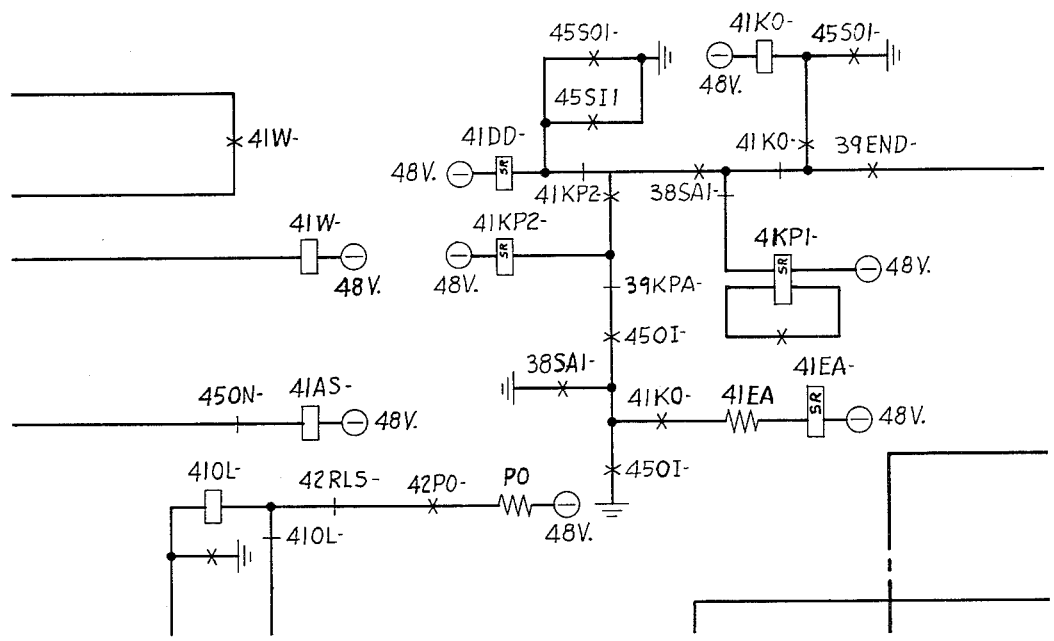

May 24, 1966  D. R. FISHER ETAL  3,253,088
CENTRAL OFFICE MULTICUSTOMER PRIVATE BRANCH EXCHANGE SYSTEM
Filed May 1, 1962  46 Sheets-Sheet 43

May 24, 1966 D. R. FISHER ETAL 3,253,088
CENTRAL OFFICE MULTICUSTOMER PRIVATE BRANCH EXCHANGE SYSTEM
Filed May 1, 1962 46 Sheets-Sheet 45

May 24, 1966  D. R. FISHER ETAL  3,253,088
CENTRAL OFFICE MULTICUSTOMER PRIVATE BRANCH EXCHANGE SYSTEM
Filed May 1, 1962

FIG. 46

PORTIONS OF LINE LINK FRAME AND FRAME CONNECTOR CCTS.

| FIG. 1 | FIG. 2 | FIG. 3 | |
|---|---|---|---|

PORTIONS OF DIAL TONE MARKER

| FIG. 4 | FIG. 5 |
|---|---|

PORTIONS OF COMPLETING MARKER

| FIG. 6 | FIG. 7 | FIG. 8 | FIG. 9 |
|---|---|---|---|
| FIG. 10 | FIG. 11 | FIG. 12 | FIG. 13 |
| FIG. 14 | FIG. 15 | FIG. 16 | FIG. 17 |

| FIG. 18 | FIG. 19 | FIG. 20 | FIG. 21 | FIG. 22 |
|---|---|---|---|---|

INCOMING TRUNK CCT.

| FIG. 23 | FIG. 24 | FIG. 25 | FIG. 26 |
|---|---|---|---|

INTRA-OFFICE TRUNK CCT.

| FIG. 27 | FIG. 28 | FIG. 29 | FIG. 30 | FIG. 31 |
|---|---|---|---|---|

ATTENDANT TRUNK CCT.

| FIG. 32 | FIG. 33 | FIG. 34 |
|---|---|---|
| FIG. 35 | FIG. 36 | FIG. 37 |

ATTENDANT CONSOLE

POSITION CCT.

| FIG. 38 | FIG. 39 |
|---|---|
| FIG. 40 | FIG. 41 | FIG. 42 |

LOOP CCT.

| FIG. 43 | FIG. 44 | FIG. 45 |
|---|---|---|

United States Patent Office 3,253,083
Patented May 24, 1966

3,253,083
CENTRAL OFFICE MULTICUSTOMER PRIVATE BRANCH EXCHANGE SYSTEM
Donald R. Fisher, Elizabeth, N.J., and Eugene J. Gesing, Massapequa, Frederick H. Koster, New Hyde Park, and Raymond J. Kowalinski, Ronkonkoma, N.Y., assignors to Bell Telephone Laboratories, Incorporated, New York, N.Y., a corporation of New York
Filed May 1, 1962, Ser. No. 191,507
20 Claims. (Cl. 179—27)

This invention relates to central office telephone switching systems, and more particularly to a switching system for providing private branch exchange service to a plurality of telephone customers.

Telephone switching systems have in the past been assigned two distinct interconnection functions. On the one hand, systems are known which automatically may interconnect a line associated with one individual telephone customer with the line assigned to any other telephone customer. The central office wherein the switching equipment is located performs a more or less public service in effecting these connections and the switchboard operators, that may be brought into the call to facilitate its completion when, for one reason or another, a human operator is found to be more desirable than automatic machinery, are employees of the telephone company. On the other hand, telephone switching systems are known which are assigned for use solely by, and are located wholly within the confines of, a single telephone customer. Usually this telephone customer is a large business organization with many telephone extensions between which calls are placed on an "intercom" basis which is usually characterized by interconnections being made by dialing fewer digits than would be required between stations belonging to different telephone customers. In these private telephone switching systems (PBX's) the switchboard operator is an employee of the telephone customer and not only shares his confidences but is required to be sufficiently familiar with the particular functioning of her employer's business to enable her properly to route those incoming and outgoing calls requiring her assistance.

While development of both of the foregoing types of telephone systems has proceeded apace, improvements in central office switching have been more easily implemented because their cost is borne over a wider base and is therefore not nearly as burdensome as the cost of implementing improvements in systems whose capital costs are chargeable primarily, or exclusively, to the single customer utilizing the equipment. Costs tend to remain high both because much "customer engineering" time goes into a PBX installation and because of the fact that the relocation of a PBX telephone customer to new quarters often means that the switching system engineered for the previous location is found to be unsatisfactory for the needs of the old customer at the new location as well as for the needs of the new customer or customers occupying the old quarters. Accordingly, a telephone switching system which can serve a private branch exchange customer no matter where he is located, which is usable by customers having differing requirements for the various aspects of private branch exchange service, and whose improvement costs are amenable to a broadly based distribution, is desirable. The present invention is concerned with implementing the foregoing objectives.

In accordance with the principles of the present invention, a telephone central office switching system such as that disclosed in A. J. Busch Patent 2,585,904, February 19, 1952, is enabled to provide private branch exchange service to a plurality of different telephone customers while maintaining the capability of providing the conventional switching services usually furnished by a telephone central office. The new type of private branch exchange service will hereinafter be referred to as Customer Group Service. Customer Group Service is not to be confused with the limited form of assistance priorly given by telephone central offices to PBX trunks and described, inter alia, at column 171 et seq. of the abovementioned Busch patent, wherein the common control marker is enabled to hunt over a plurality of equivalent incoming trunks from a called PBX in order to seize an idle one over which the call may be completed. A telephone switching system embodying the principles of the present invention may advantageously continue to perform this function both for conventional PBX customers as well as for those customers subscribing for Customer Group Service. That is, a telephone central office equipped to provide Customer Group Service may continue to provide central office functions for conventional private branch exchange systems that effect "intercom" connections by switching equipment individual to, and located upon, the premises of the conventional PBX customers. However, for customers desiring Customer Group Service the central office system of the present invention will eliminate the need for any switching equipment on the premises of every such customer and the central office will perform all the interconnections among each customer's private lines and trunks.

In one illustrative embodiment of the present invention the several extension stations of each telephone customer desiring Customer Group Service are given individual line appearances at the central office. The group of lines for each such customer is given a distinguishing class of service number and the individual lines of the group are given a rate treatment number which determines, inter alia, their dialing restrictions. Advantageously, the rate treatment numbers may retain the same significance from customer group to customer group. The foregoing two types of numbers are used by the common control equipment to effectuate the different types of calls capable of being handled by the switching system. The new types of calls are as follows:

An incoming call, which is a call directed to one of the stations of a customer group from one of the common trunks of the central offce that may be used by a telephone customer irrespective of his customer group;

A transfer call, which is a call requiring that a connection be established to an attendant or group of attendants individual to the customer group with which the transferring or first called station is associated;

A directory number call, which is a call requiring that a connection be established to an attendant or group of attendants individual to a customer group in response to the registration of the listed directory number for that customer group;

An attendant call, which is a call continued by an attendant or one of a group of attendants individual to a customer group;

A customer group originating call, which is a call originating from a station of a customer group;

An intra-office call, which is a call between two stations having individual line appearances at the same central office;

An intra-customer group call, which is a call made between stations individual to a customer group; and An "ADS" call, which is a call made between stations not in the same customer group but with some of the privileges peculiar to intra-customer group calls.

Further in accordance with this illustrative embodiment, the class of service of a called telephone having a line appearance in the central office under consideration is ascertained and, if the called telephone belongs to a customer group being furnished Customer Group Service, the called telephone's class of service is registered in the common control equipment of the telephone central office. The common control equipment is conditioned by the registration of the called telephone's class of service to accord that called telephone call transfer privileges, e.g., via access to the attendant or group of attendants individual to his associated customer group. Call transfer operations may be initiated by a station of a customer group, such as an extension which has had an incoming call connected thereto, by switchhook flashing. The combination of the switchhook flashing signal and the registered class of service enables the conditioned common control equipment to select a switching route to the appropriate attendant or group of attendants. After a connection has been established to the attendant, and she is given sufficient information as to the identity of the party to whom the call is to be transferred, the attendant may redirect the central office common control equipment to reroute the call to the desired other station in the called customer's group. Advantageously, the attendant may be permitted to transfer the call outside the customer's group on the same basis as if the transferred-to station were in the customer group.

It will be recalled that a salient feature of the common switch controlling marker type of operation disclosed in the aforementioned patent to A. J. Busch is that the location of equipment on the switch frames is flexibly related to the directory number associated with the equipment. A translator, called a number group translator, is disclosed therein which obtains for the marker the line equipment location corresponding to any particular directory number. It is a feature of the present invention that incident to the translation of a customer group directory number the marker be provided with information to inhibit the completion of a communications linkage to the line equipment location being furnished by the translation and that, instead, a communications linkage be established to an attendant trunk in accordance with a route dictated by the class of service received from the aforementioned line equipment location. The marker then establishes a communications linkage so that the calling party may converse with the attendant or an idle one of a group of attendants assigned to the called customer.

According to a further aspect of the foregoing illustrative embodiment, the common control equipment of the central office processes the customer group directory number call by ascertaining the class of service assigned to an always-idle equipment location corresponding to the called directory number. In accordance with a still further aspect of the illustrative embodiment under consideration the establishment of the communications linkage to the attendant of the desired customer is extended by the common control equipment transmitting a signal to the trunk (over which the customer group directory number call is incoming) to initiate a trunk operation substantially similar to that occurring during the above-described transfer type of call.

In the illustrative embodiment hereinafter to be described in detail the aforementioned incoming trunk (and at least one of the intra-office trunks) has appearances on two types of switching frames and is therefore a tandem type trunk. It is a feature of the present invention that a tandem trunk be controlled to extend a communications linkage from a particular one of its appearances in accordance with the class of service of a called line.

Another feature of the present invention is means for obtaining the registration of the class of service of an equipment location on a switching frame without the line having either initiated a call or having had a communications channel extended thereto.

When a call has been transferred to a customer group attendant either because a station of the customer group has initiated a transfer request or because an incoming call was for a customer group directory number, the attendant to whom the call is transferred may continue the call to another extension of the same customer group by keying its number. It is an aspect of this phase of the operation of the system of the present invention that one of the group of registers normally associated with one of the aforementioned tandem type of incoming trunks for use in receiving digits transmitted from a distant office may be selected by the attendant to receive the number of the station to which the call is to be transferred. The class of service of the customer group attendant is registered by the common control equipment in the conventional manner for calling lines and, in accordance with the principles of the present invention, is compared with the class of service obtained when the marker seizes the switching frame equipment location of the called line. A communications linkage is permitted to be established if the classes of services match and is inhibited upon a failure to match. Advantageously, however, a circuit is provided for overriding the failure to match under predetermined conditions.

Accordingly, a further aspect of the storage of a line's class of service manifests itself in a circuit controlled by customer group lines which have frequent need to call lines belonging to one or more different telephone customers locally served by the common central office of the type under consideration. An example of the foregoing may be found to be applicable at airport installations where the reservation clerks must make arrangement with the other airlines, limousine, and bus services, etc. within the airport complex. It is desirable that these reservation clerks and the customer group attendants for each airline be permitted to dial the stations of these other telephone customers by using as few digits, for example, as are required to reach another extension within their own company.

Calls originated by a customer group line (including, at the attendant's option, calls made by attendants associated with customer group lines) advantageously obtain access to an originating register for the receipt of the called digits, as described in the aforementioned patent to A. J. Busch. The originating register, however, in accordance with the principles of the present invention, is conditioned by the receipt of a class of service assigned to customer group stations to request of the common control equipment a different type of called number translator than would be requested, for example, if the same digits were called by a line not in a customer group. Accordingly, the numbers dialed by a customer group station and by a non-customer group station may advantageously be treated differently by the common central office of the present invention.

It is an advantage of the circuits providing this function that the limited number of one, two and three digit codes obtaining in a decimal system may be employed to maximum efficiency. For example, the digit "0" dialed by a non-customer group line indicates a resquest for a telephone company operator, whereas the same digit dialed by a customer group line indicates a request for one of the attendants associated only with the customer group in which the calling line is located. It is also an aspect of this phase of operation of the present invention that the type of called number translator designated to the common control equipment in accordance with the class of service of the calling line and the digits of the called number play a part in controlling the read-in or storage of the class of service of a called line on certain types of calls. In accordance with the foregoing, translator selection is made so that intra-office calls originated by a customer group line will effect the registration of a called line's class of service either, on the one hand, incident only to the establishment of a communications linkage to the called line or, on the other hand, throughout the continuance of the telephone call. The temporary registration of a called line's class of service on intra-office calls ostensibley being made within a customer's group of lines is used to determine whether the call is actually within the lines of the customer group, and accordingly, whether the call is permitted. Storage of a called line's class of service during the continuance of a telephone calls, on the other hand, is used to determine whether the called line is permitted the privilege of having the call transferred to another telephone.

The handling of the above-mentioned types of intra-office calls is facilitated in one illustrative embodiment of the present invention by a tandem type of intra-office trunk circuit having not only the normal first and second appearances on the trunk link frame but including a tandem appearance on the line link frame and a memory apparatus as well. From the line link frame appearance the common control marker may establish a switching route to one of a group of trunks (such as attendant trunks) determined by the class of service information stored in the memroy portion of this intra-office trunk incident to the establishment of a switching connection from one of the aforementioned two trunk link frame appearances to a customer group line served by the central office.

It is an aspect of both the aforementioned types of trunks, which are capable of instructing the common control equipment in the selection of switching routes to other trunks, that access to the common switch controlling marker be obtained through an incoming type of register normally incapable of seizing a marker until having had called number digits entered therein from a distant signaling office. In accordance with the principles of the present invention, however, such a register when seized by one of the aforementioned types of trunks will request access to the common switch controlling marker without having called number digits registered therein whenever the trunk having stored a customer group class of service number is activated by a service request signal initiated from the customer group line.

It is another aspect of the present invention that the groups of attendant trunks assigned for use with different customer service groups be enabled to reach their associated attendant console equipment by utilizing common distribution equipment, for example, equipment of the type described in the copending applications of O. H. Williford, Serial No. 135,913, and V. J. Matthews, Serial No. 135,914, both filed September 5, 1961, now Patents 3,180,941 and 3,180,942, respectively, issued April 27, 1965. It is a common feature of this and of the foregoing applications that trunks requiring the services of an attendant indicate their presence on a "release-loop" basis on an attendant console, which console, under the control of the attendant, directs the switching functions to be accomplished. In accordance with the principles of the present invention, however, the attendant trunks also appear on the line link frames so that, under control of the attendant console, calls that have been transferred to the attendant trunk (at its trunk link appearance) may be extended via the line link appearance thereof to outgoing tie line trunks. It is a further feature of the attendant equipment to select key-pulsing apparatus having characteristics appropriate to the call when extended respectively over the aforementioned line link and trunk link appearances of the attendant trunk.

The foregoing and other objectives and features may become more apparent by referring now to the following description and drawing in which:

FIGS. 5 through 22 show portions of the completing marker in their relation to the originating and incoming register circuits, the incoming register link, and the trunk link and connector circuits;

FIGS. 38 through 45 show the loop, position, and attendant console circuits; and FIGS. 46 show how FIGS. 1 through 45 should be positioned.

CONTENTS

I. Marker Circuit:
   (a) Incoming Calls
   (b) Transfer Calls
   (c) Customer Group Directory Number Calls
   (d) Attendant-Completed Calls
   (e) Intra-Customer Group and "ADS" Calls (Four-digit Basis Calls)
   (f) Intra-Office Calls (Seven-digit Basis Calls)
   (g) Intra-Office Calls, Route Advance II. Incoming Trunk Circuit:
   (a) Incoming Call
   (b) Transfer Call
   (c) Attendant-Completed Call
   (d) Attendant Signaling Toll Operator
   (e) All Attendant Trunks Busy
   (f) Directory Number Call III. Intra-Office Trunk Circuit (with Transfer)

IV. Attendant Trunk and Loop, Position and Console Circuits

V. Attendant Trunk Operation, Tie Line Calls

VI. Dial "0" Call to Customer Group Attendant

I. *Marker Circuit*

Figure 9:
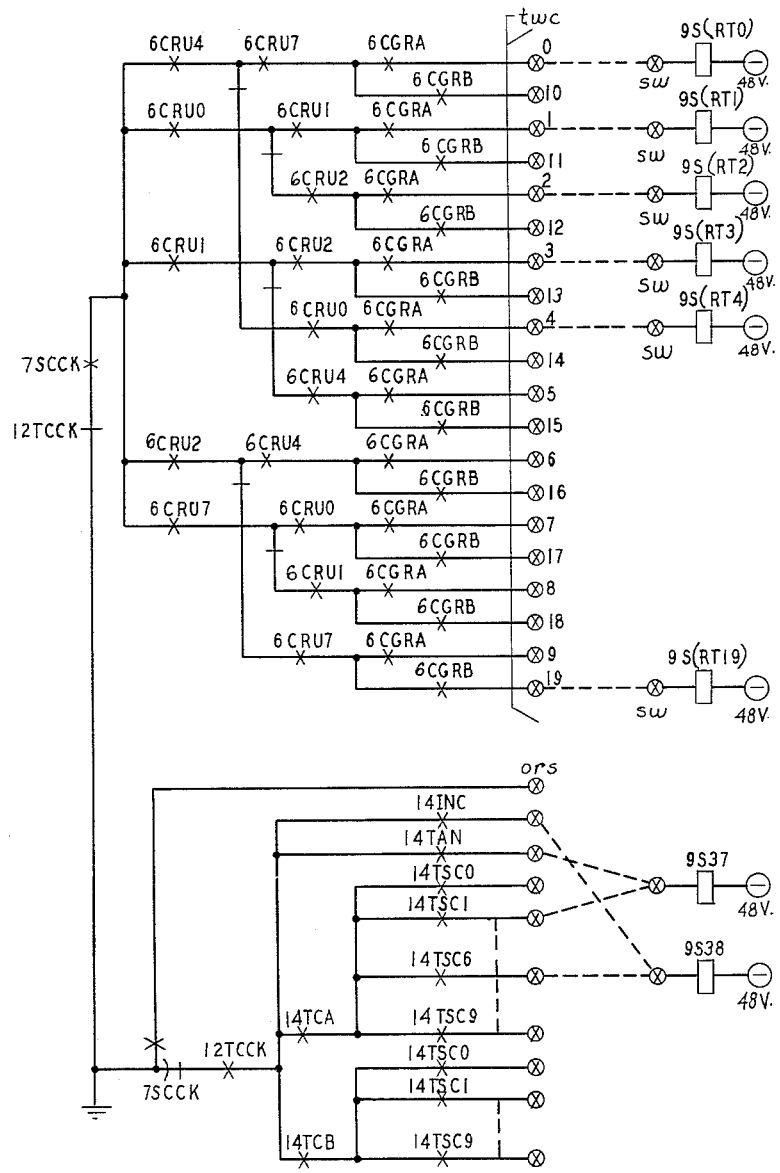
Figure 10:
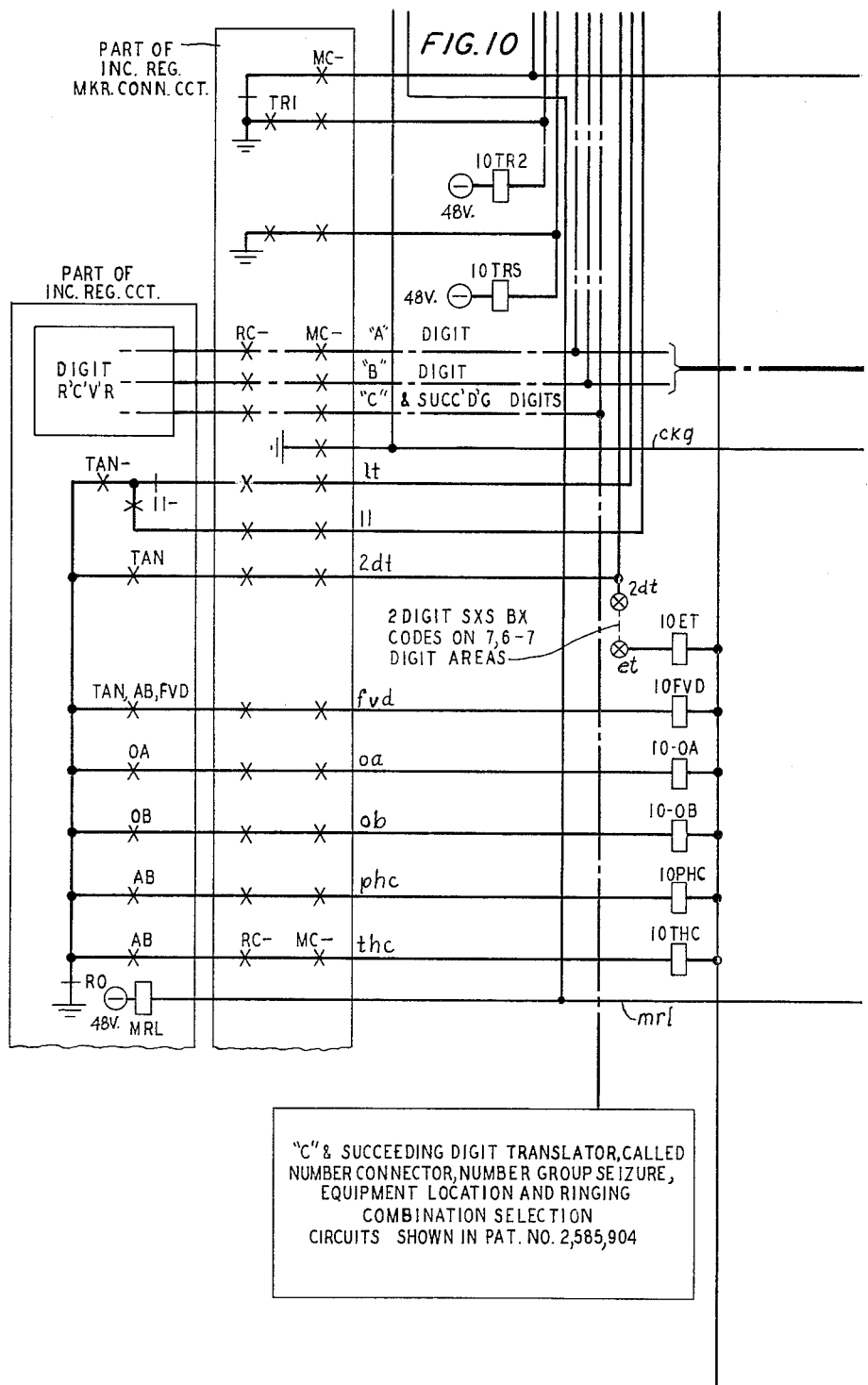
Figure 17:
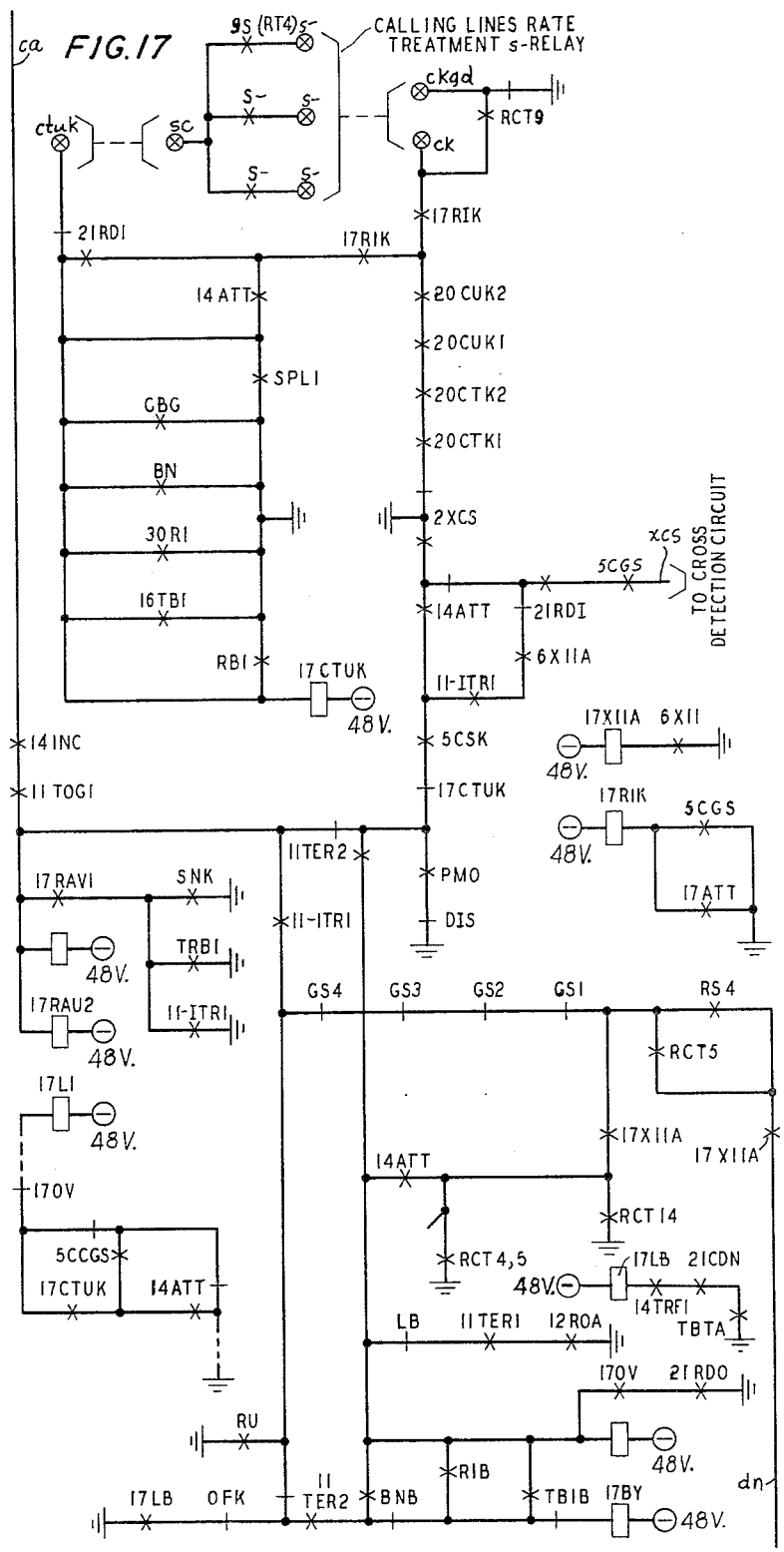
Figure 18:
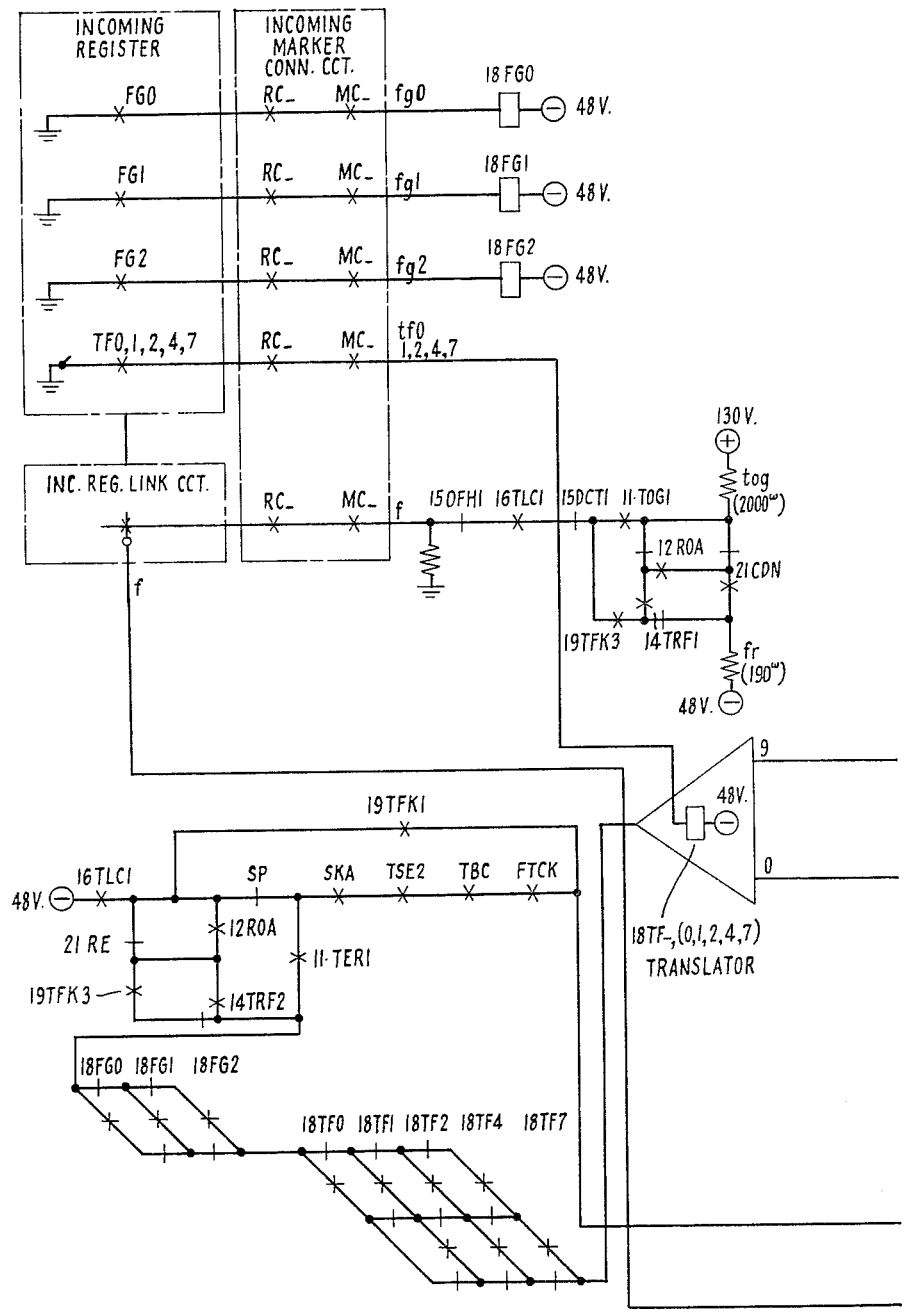

(a) *Incoming calls.*—A remote calling office 2300 impresses a calling condition on a trunk circuit (FIGS. 23 through 26 incoming to the central office under consideration, causing the incoming trunk to request access to an incoming register through the incoming register link 2310. When the calling office 2300 has transmitted the called number to the incoming register, parts of which register are shown in FIGS. 10, 14, and 18, the incoming register seizes the completing marker, parts of which are shown in FIGS. 5 through 22. The incoming register, as instructed by the incoming trunk, selects one of the marker's called number translators by operating a corresponding one of the marker relays 6LT, 6–11X, 10ET, 10FVD, etc., into which translators the "A," "B," and "C" digits of the called number are entered. The incoming register, as instructed by the incoming trunk, also operates one of the marker's trunk operating class relays 14TCA or 14TCB and one of trunk operating class relays 14TSC0 through 14TSC9 to inform the marker of the class in which the incoming trunk is operating.

The incoming trunk being of the tandem type, may receive calls capable of local completion within the central office under consideration, as well as calls for the lines not directly served by the central office, in which latter case this central office must select a route to an appropriate group of trunks outgoing from this central office over which the call may be continued to its destination. For purposes of illustration, let it be assumed that the incoming trunk under these circumstances will operate trunk operating class relay 14TSC1. The foregoing operations of conventional tandem type trunks, incoming registers, and common switch controlling markers for performing this function are well known and are described, inter alia, in Patent 2,531,637 to C. G. Miller and in Patent 2,535,661 to A.O. Adam and R. C. Avery. However, it is desired to point out that heretofore, when the marker, after translating the called number, determined that the call was capable of local completion to a line directly served by this central office (and accordingly operated one of the local completion relays such as marker relay 13LPA) no further use was made of the tandem trunk's line link frame appearance and for all intents and purposes the tandem trunk operated as if it were a local completing trunk.

In addition to the foregoing, or true tandem type of operation of tandem type trunks, a practice has grown up in the telephone industry of assigning tandem type trunks for use on a segregated basis so that the trunk will only operate to complete incoming calls to lines directly served by the office, i.e., the incoming register will operate one of the marker's "OA," "OB," etc., relays as instructed by the incoming trunk. This practice may arise because the pattern of traffic from the remote calling central office to this central office has undergone a change requiring an increase in the number of local completing trunks. Instead of adding trunks capable solely of local completion, the telephone operating company may find it expendient to add tandem type trunks, foreseeing the day when the traffic pattern may again change and require tandem capability for continuing calls to subsequent central offices. Such tandem trunks, which are segregated for use as local completing trunks, will for purposes of illustration be assigned trunk service class 6 and will cause marker relay 14TSC6 to be operated. When one of these local completing type of tandem class trunks has a calling condition impressed thereon, the incoming register seized by this trunk will, in addition to selecting a marker translator and a trunk operating class 14TSC– relay such as relay 14TSC6, also select the particular "office" 'relay 10–OA, 10–OB, 10PHC, 10THC, etc., that designates the group of lines to which it may complete calls. This operation is also well known and is described in Patent 2,587,817 to A. J. Busch and H. J. Michael, the disclosure of which is incorporated herein by reference. However, it is desired to point out that heretofore the designation of one of the aforementioned 10–OA, 10–OB, etc., relays had characterized the trunk as a local completing class of trunk and tandem operation of this trunk thereafter was obviated as inconsistent with its intended functions.

Accordingly, the incoming trunk bearing a call for a line directly served by the central office under consideration may operate trunk operating class relay 14TSC1 if the trunk is not segregated solely for use as a local completing trunk, or trunk service class relay 14TSC6 in the event that it is so segregated. Let it be assumed initially that relays 14TCA, 14TSC1, and 10ET are operated. Relay 14TCA operated makes available an operating ground that may be completed over a make contact of any one of trunk operating class relays 14TSC0–4 to operate tandem class relay 14TAN. Relay 14TAN operated prepares a path for operating tandem outgoing class relays 11TOG1, 2. An operating path will be completed to relay 11TOG1, 2 if the called number translator selected by the incoming register, such as the "extra" translator designated by the operation of relay 10ET, decodes the called number to ground a code point for a "R–" route relay indicating that an outgoing sender is required for handling the call.

Thus, for example, if the decimal output bus 9 of the "A" digit called number translator and the decimal output bus 8 of the "B" digit called number translator (FIG. 12) were grounded, extra translator relay 12ET8 would be operated by the decimal 8 bus. Contacts of relay 12ET8 steer the ground from the decimal 9 bus of the "B" digit translator to code point 98. The ground which is applied by the "A" digit translator to decimal bus 9 is made available to the "A" digit translator over the path including back contact XT, make contact 15CKG2, back contacts 6OR and 6FAC, one make contact and 8 break contacts of the checking circuit including transfer contacts of each of trunk operating class relays 14TSC0 through TSC9, one make and one break contact of the 6TCA–6TCB checking circuit, back contacts of relays 14TSC9, 8, and 7, and back contacts 14RO, 6FAC, and 6OR. In this ground-applying path, relay XT is normal because the incoming register has selected only one translator, e.g., extra translator 10ET, and relays 6OR and 6FAC are normal because an incoming rather than an originating register has seized the marker, and relay CKG2 is operated because, as described in any of the aforementioned Busch patents, it is the marker off-normal relay which is operated whenever the marker is seized.

The ground made available at the left-hand apex of the "A" digit translator is steered to bus 9 over contacts of "A" digit translator relays (not shown) in response to the two-out-of-five encodement of the "A" digit supplied over leads 0, 1, 2, 4, 7 from the incoming register. Ground is also made available from the output of the 6TCA–6TCB checking circuit over back contacts 14TRF and 14RO to operate trunk class check relay 12TCCK. In the operating path for relay 12TCCK relay 14TRF is normal because no transfer condition has been established, as will be explained hereinafter in connection with the transfer call, and relay RO is normal because no reorder condition has been initiated, as described in the Busch patent.

Figure 8:
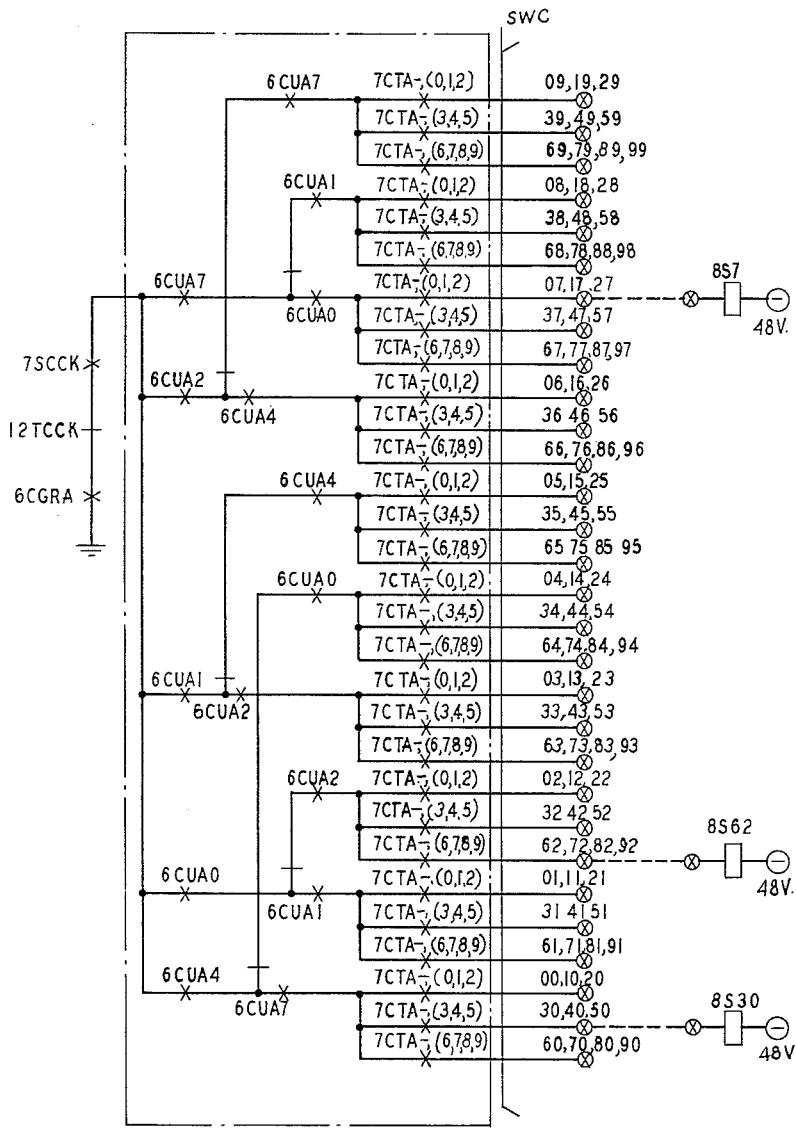

Code point 98 (FIG. 12) is cross-connected to service common punching 12sc7. Associated with service common punching 12sc7, as well as with other service common punchings, are a plurality of make contacts belonging to different "8S–" and "9S–" screening relays. These screening relays in the marker are relays (windings whereof are shown in FIGS. 8 and 9) whose contacts shown in FIGS. 12, 13, and 17) may be associated in various combinations with the service common punchings to extend operating paths for specific functions. Accordingly, for purposes of simplified illustration, only a few of such make contacts are shown associated with each service common punching.

Screening relay 8S37 is operated by a ground provided over a back contact of class of service check relay 7SCCK, make contact of trunk class check relay 12TCCK and make contacts of relays 14TCA and 14TSC1. The make contact of 8S37 associated with service common punching 12sc7 is shown as being cross-connected to the winding of route relay 12R98(TOG). Route relay 12R98(TOG) designates that group of outgoing trunks appropriate for furthering the call that was initially incoming to the central office under consideration to a further or subsequent central office. One of the work contacts of this relay (not shown) completes an operating path to the winding (not shown) of relay SON, one of whose make contacts is shown in the operating path of relays 11TOG1, 2. This operating path may be traced from a ground provided in the incoming register (FIG. 10) over the incoming register's back contact TR1 and the incoming register's marker connector make contact MC–, back contacts of marker relays TR2, LR, and RTST (FIG. 11), and the make contacts of the aforementioned SON and 14TAN relays to the windings of relays 11TOG1, 2. Relays 11TOG1, 2 operated initiate the sequence of operations described in detail in the above-mentioned Patent 2,585,904 and these operations are accordingly not necessary to be further discussed herein.

However, if the number called by the incoming register resulted in the grounding of code point 29 (FIG. 12) this ground would have been extended to service common punching 12sc3 and the make contact of screening relay 8S37 to the cross-connection point for the local completion relay 13LPA. Relay 13LPA operated at one of its make contacts in FIG. 11 completes an operating ground from the incoming register (FIG. 10) and a make contact of relay 12TCCK to the windings of relays 11TER1, 2.

Figure 21:
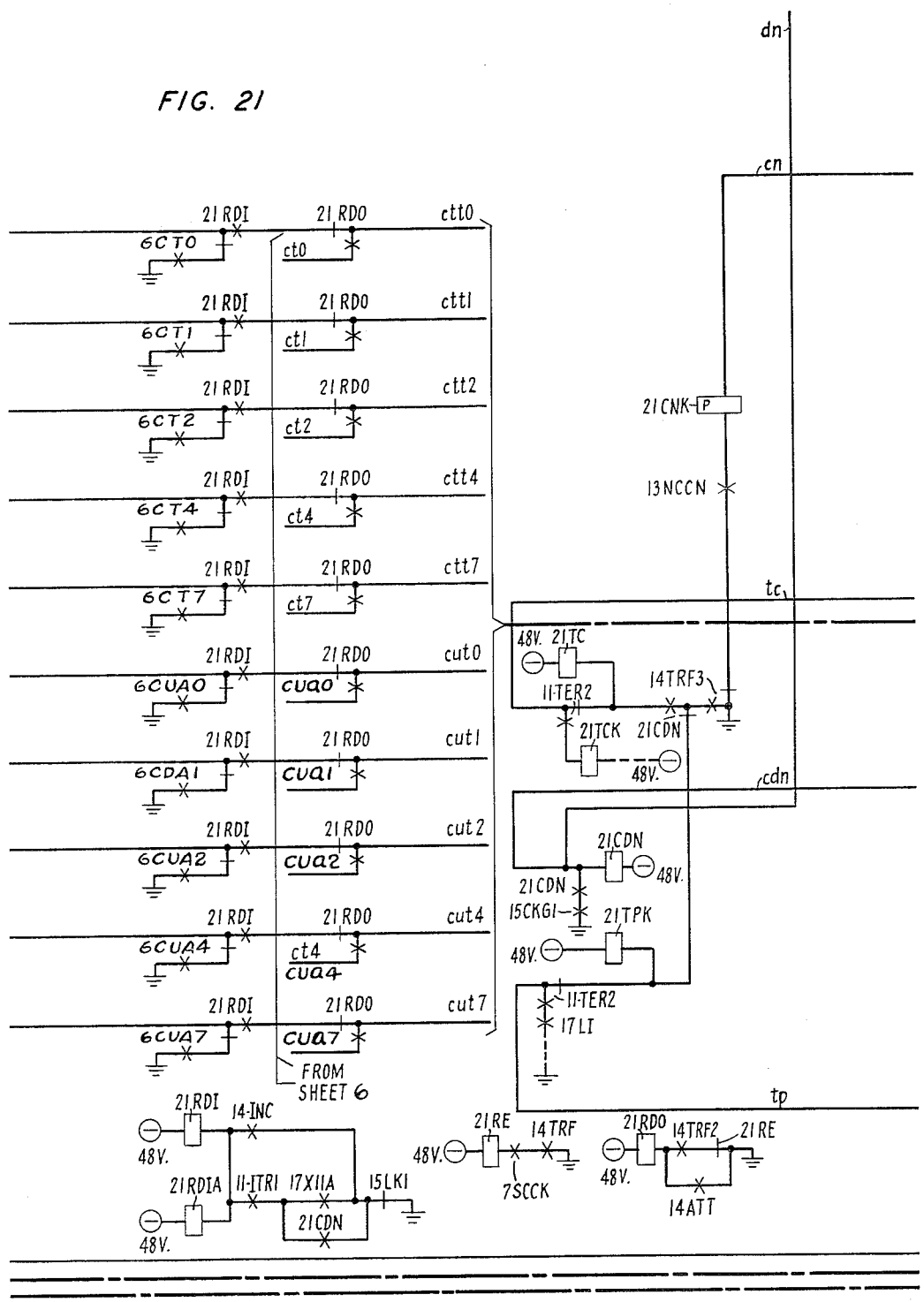

On the other hand, had the incoming trunk been of a tandem type segregated for use as a local completion trunk, the incoming register would have operated trunk service class relay 14TSC6 and one of the "office" relays such as "office" relay 10–OA. Relay 14TSC6 at one of its make contacts completes an operating ground made available over a make contact of relay 14TCA to the winding of incoming class relay 14INC in the marker. Relay 14INC operated operates relay 21RDI (FIG. 21).

Figure 11:
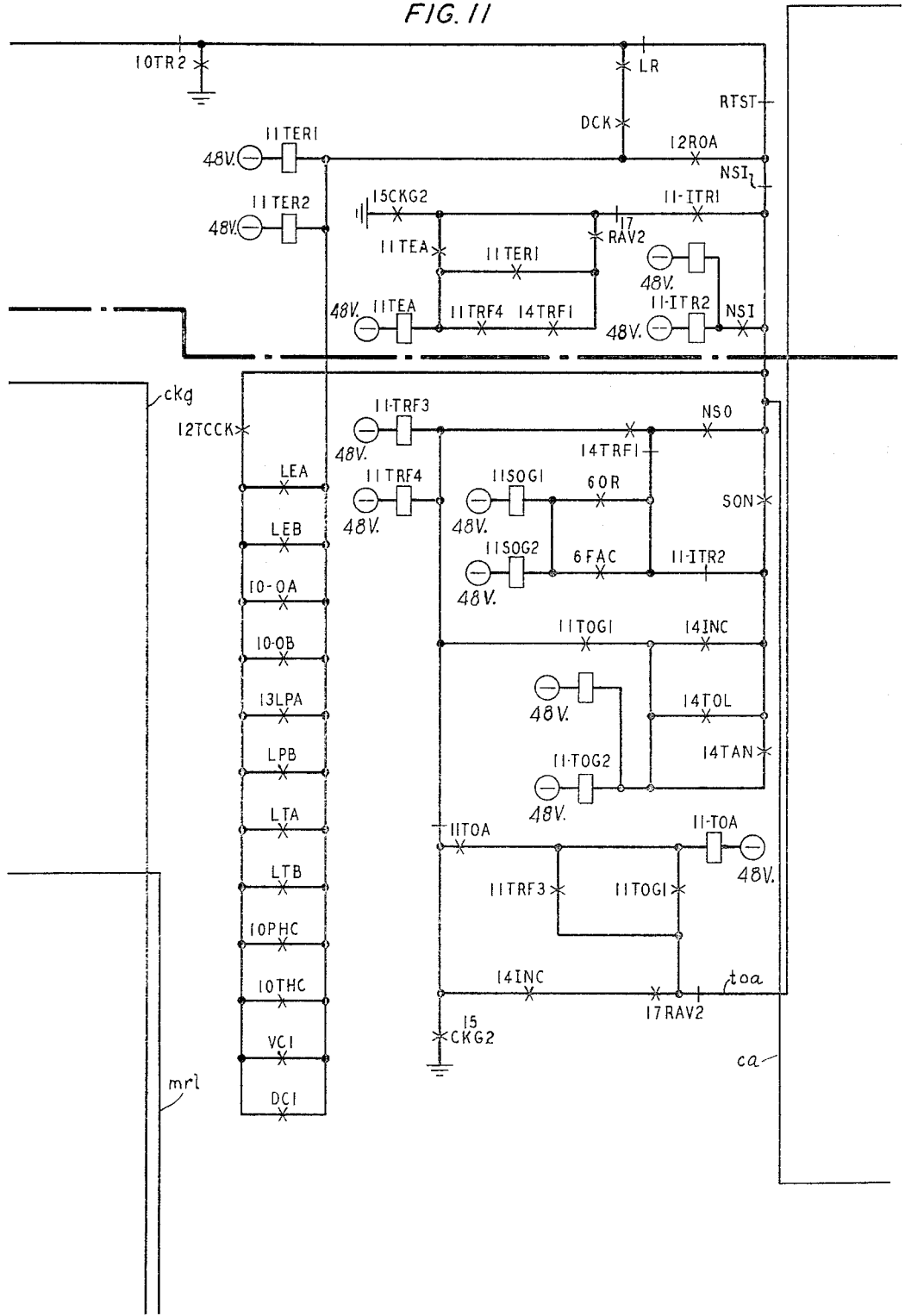

Relays 11TER1, 2 are operated by the ground provided by the incoming register (FIG. 10) and the make contacts of relays 12TCCK and 10–OA, appearing in FIG. 11.

As an alternative to the above, had the incoming trunk not been segregated for use solely as a local completion trunk, i.e., office relay 10–OA not operated, relay 14INC may still have been operated over the path provided by the operated make contacts of relays 14TCA and 14TSC6. In FIG. 9 a ground made available over a back contact of relay 7SCCK and a make contact of relay 12TCCK would be extended by make contacts of either relays 14INC or 14TSC6 to punchings associated with an auxiliary screening relay such as 9S38 whose contacts (not shown) would provide an alternative path from code point 29 via a service common punching, a make contact of the auxiliary screening relay 9S38 to the winding of a location completion relay such as 13LPA. However, to avoid confusion between the local numbers designated by the operation of relay 13LPA and those designated by the operation of relay 10–OA, the contacts and cross-connections to the contacts of auxiliary screening relay 9S38 are omitted from the drawing.

Figure 1:
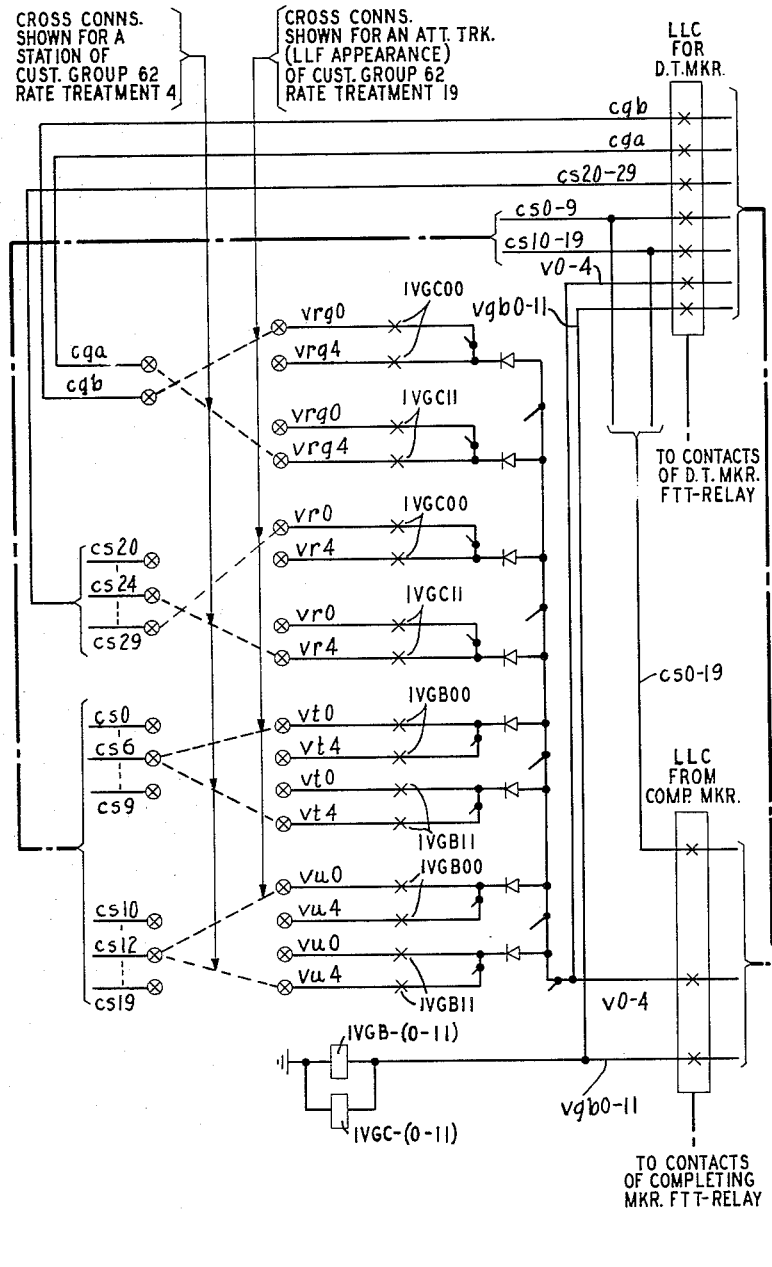
FIGS. 1 and 4 show a portion of the line link frame and frame connector circuits.
Figure 4:
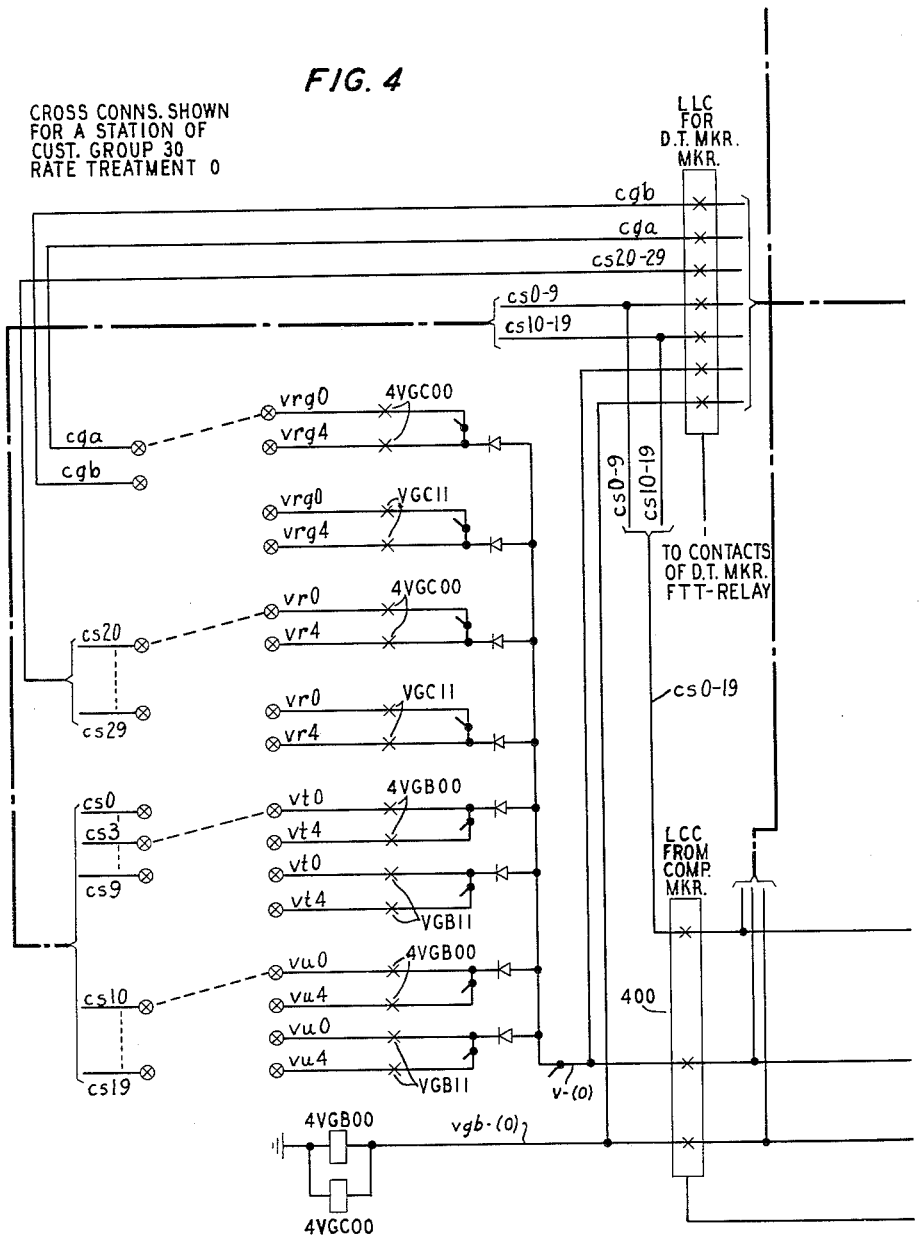
Figure 22:
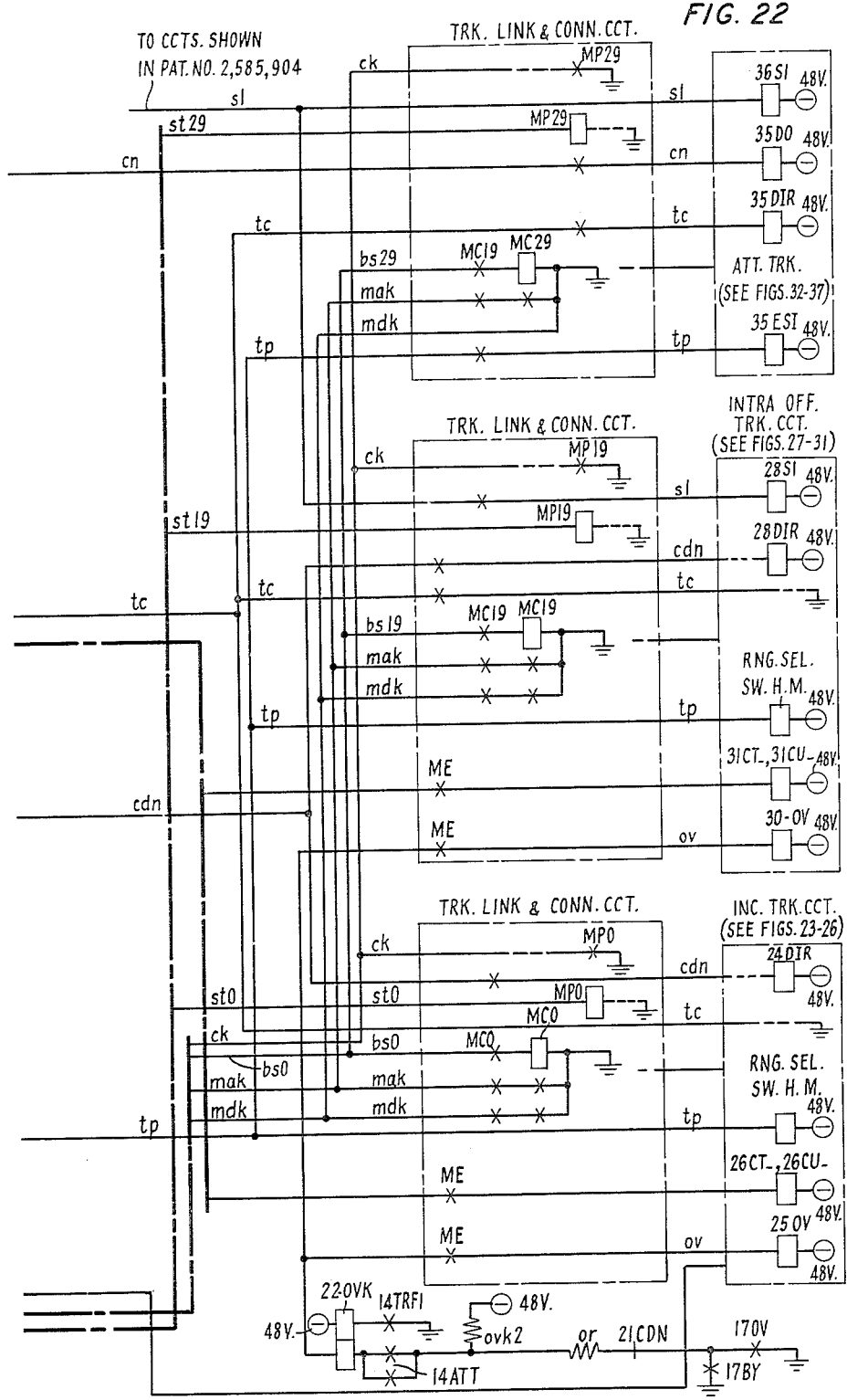

A make contact of relay 11TER1 in FIG. 16 completes an operating path to the winding of forward linkage relay 16FLG which initiates a sequence of operations (described in Busch 2,585,904) in which the marker undertakes to seize the trunk link frame where the calling incoming trunk (portions of which are shown in FIG. 22) is located and extend a communications switch linkage from it to the line link frame (portions of which are shown in FIGS. 1 and 4) appearance of the called line. Briefly, the number of the trunk link involved is received from the incoming register (FIG. 18) over the $fg-$ and $tf-$ leads operating correspondingly numbered 18FG– and 18TF– relays in the marker. Operating battery is extended over a make contact of relay 16TLC1, a back contact of relay SP, a make contact of relay 11TER1, the checking circuit consisting of one make contact and two back contacts of relays 18FG0, 1, 2, the checking circuit consisting of two make contacts and three back contacts of the two-out-of-five checking circuit for the contacts of relays 18TF0, 1, 2, 4, 7, the two-out-of-five to the one-out-of-ten 18TF– translator circuit, the FG– steering circuit (FIG. 19) to one of the $st0$ through $st29$ leads. The incoming trunk illustrated in FIG. 22 is shown associated with lead $st0$ corresponding to the operation of relays 18FG0 and 18TF0. The MP– relay in the selected trunk link (FIG. 22) returns ground over the $ck$ lead to operate trunk frame seizure check relay 19TFK3 in the marker.

Operation of the 19TFK3 relay completes the operating resistance battery path from the marker source of 48 volts potential in FIG. 18, low resistance $fr$, back contact 14TRF1, make contact 19TFK3, back contact 15DCT1, make contact 16TLC1, and back contact 15OFH1 to the $f$ lead of the incoming trunk via the incoming register marker connector and incoming register link circuits. In this operating path relay 16TLC1 was operated over a path completed by the operation of relays 11TER1 and 15CKG2.

Figure 2:
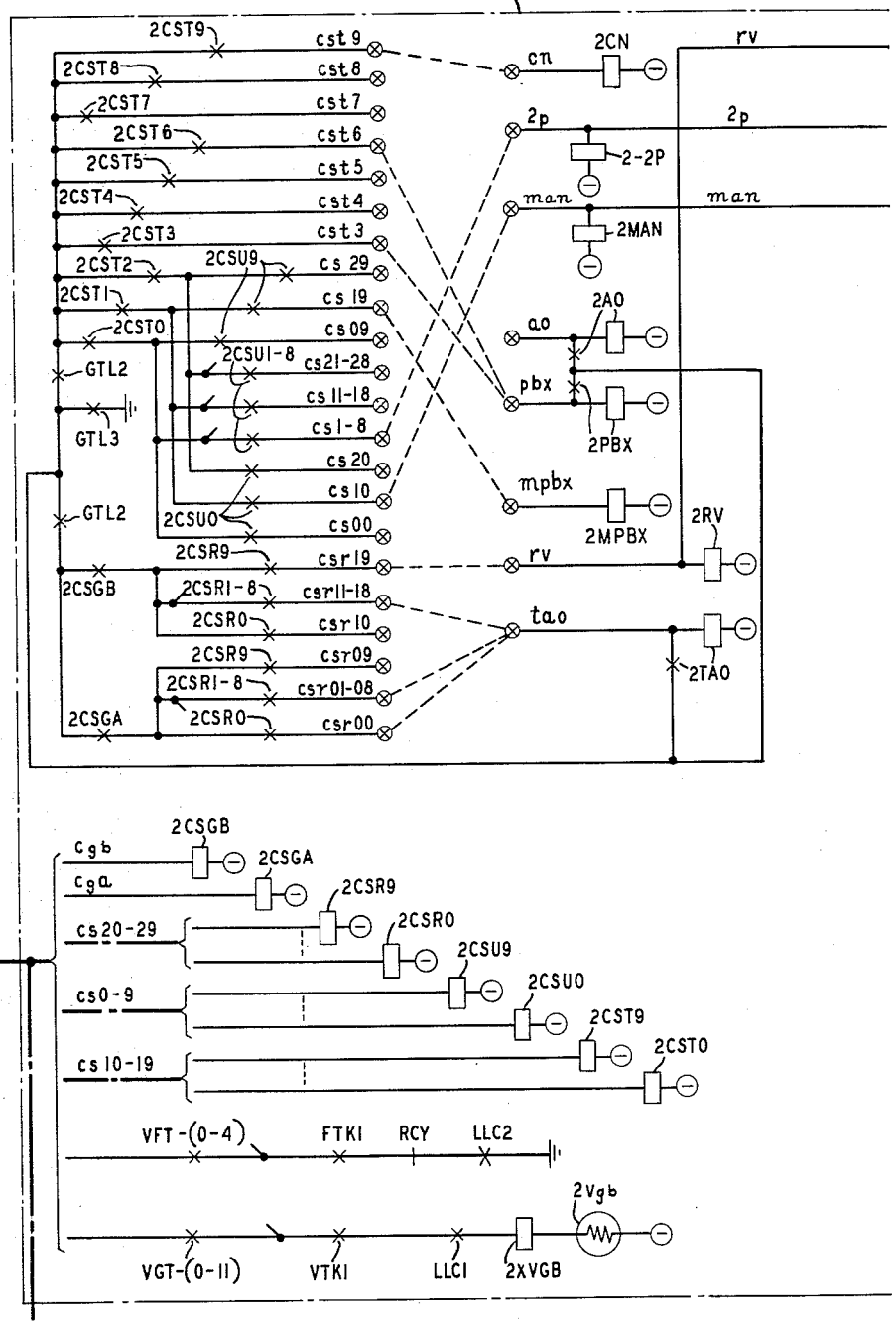
FIGS. 2 and 3 show a portion of the dial tone marker circuits.

After the marker has possession of the trunk link, it selects the number group circuit (FIG. 10), as described in Busch Patent 2,585,904, which translates the called number to obtain the equipment location corresponding thereto. The block of number groups is indicated by the operation of the local completion relays 10–OA, 10–OB, 13LPA, etc., while the number group selected within a block is determined by the thousands digit of the called line numericals. Seizure of the number group permits the hundreds, tens, and units digits to control the number to be translated and recorded on the equipment relays FTT–, FUT–, VGT–, HGT–, and VFT– (not shown). Contacts of the FTT– and FUT– relays (shown in FIGS. 2 and 5) control the selection of the desired line link frame and frame connector circuits (FIGS. 1 and 4) while contacts of the VGT–, HGT–, and VFT– relays control selection of the desired line hold magnet within the selected line link frame, as described in Busch, aforesaid.

Assuming that the called line is located on frame 27 (FIG. 4), operation of the FTT2 and FUT7 relays extends battery to the marker preference MP– relay (not shown) in the line link connector 400 for line link frame 27, seizing the connector which operates to connect the line link frame with the marker. Assuming further that the called line is located on vertical file "0" and the vertical group "00," marker relay VFT0 operated extends over its make contact an identifying ground made available over a make contact of relay FTK1 to the line link frame. Operation of marker relay VGT0 extends operating battery made available over make contacts of relays VTK1, 16LLC1, winding 5XVGB and resistor $vgb$ to the windings of line link relays 4VGB0, 4VGC0. Relays 4VGB0 and 4VGC0 extend the identifying ground made available over a make contact of marker relay VFT0 to punchings $vrg0$, $vr0$, $vt0$, and $vu0$. These punchings are respectively cross-connected to the punchings associated with leads $cga$, $cs20$, $cs3$, and $cs10$. Of the aforementioned leads only the group of leads $cs0$ through $cs19$ are utilized by the completing marker and in the illustrative example the grounded ones thereof, namely, leads $cs3$ and $cs10$ operate marker relays 5CTS3 (implicit in the group of relays 5CST0 through 5CST9 indicated in FIG. 5) and 5CSU0, respectively. The operation of one 5CST– relay and one 5CSU– relay indicates to the marker that the called line is in a particular customer group which in the illustrative example is customer group 30.

Figure 5:
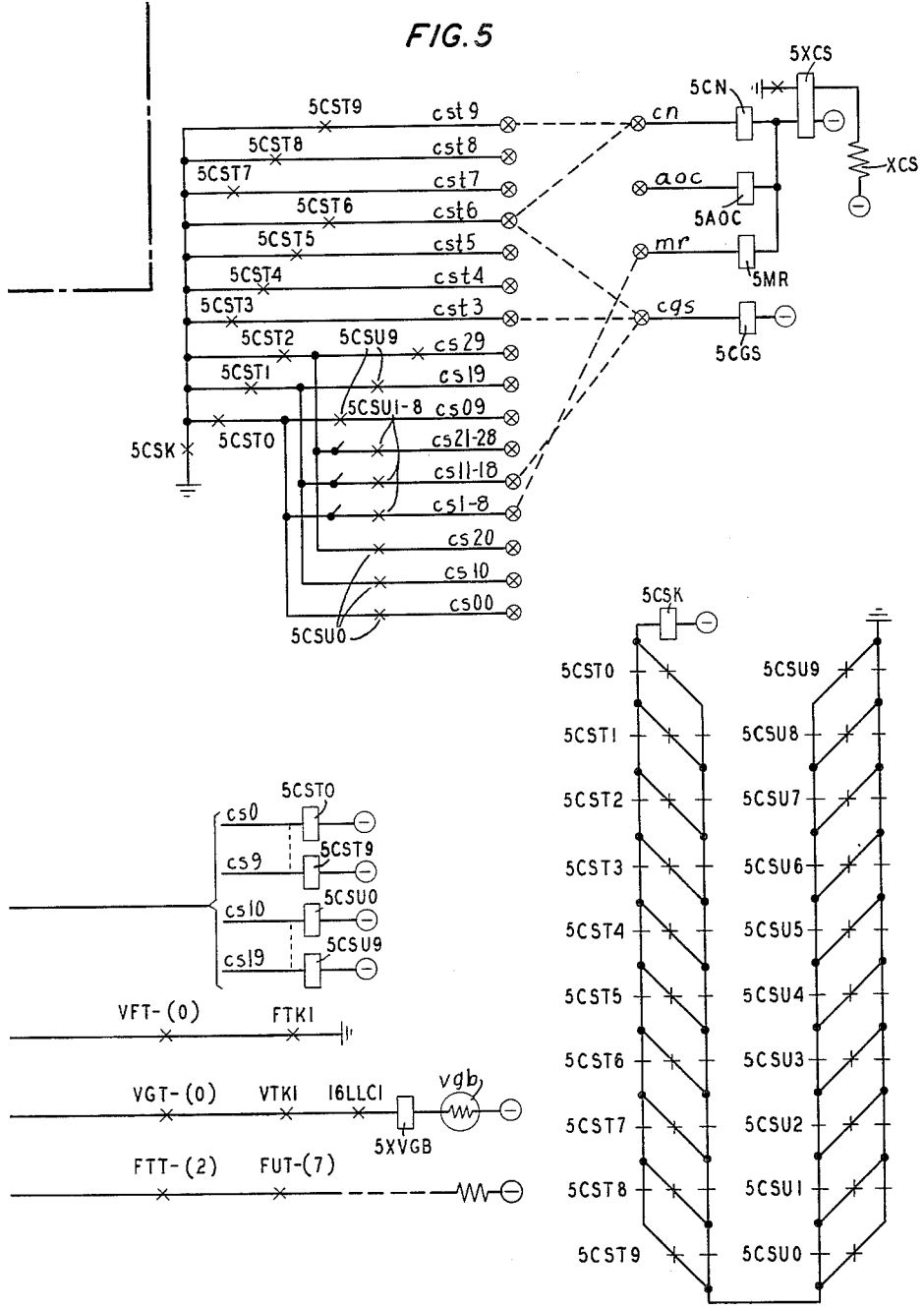
Figure 6:
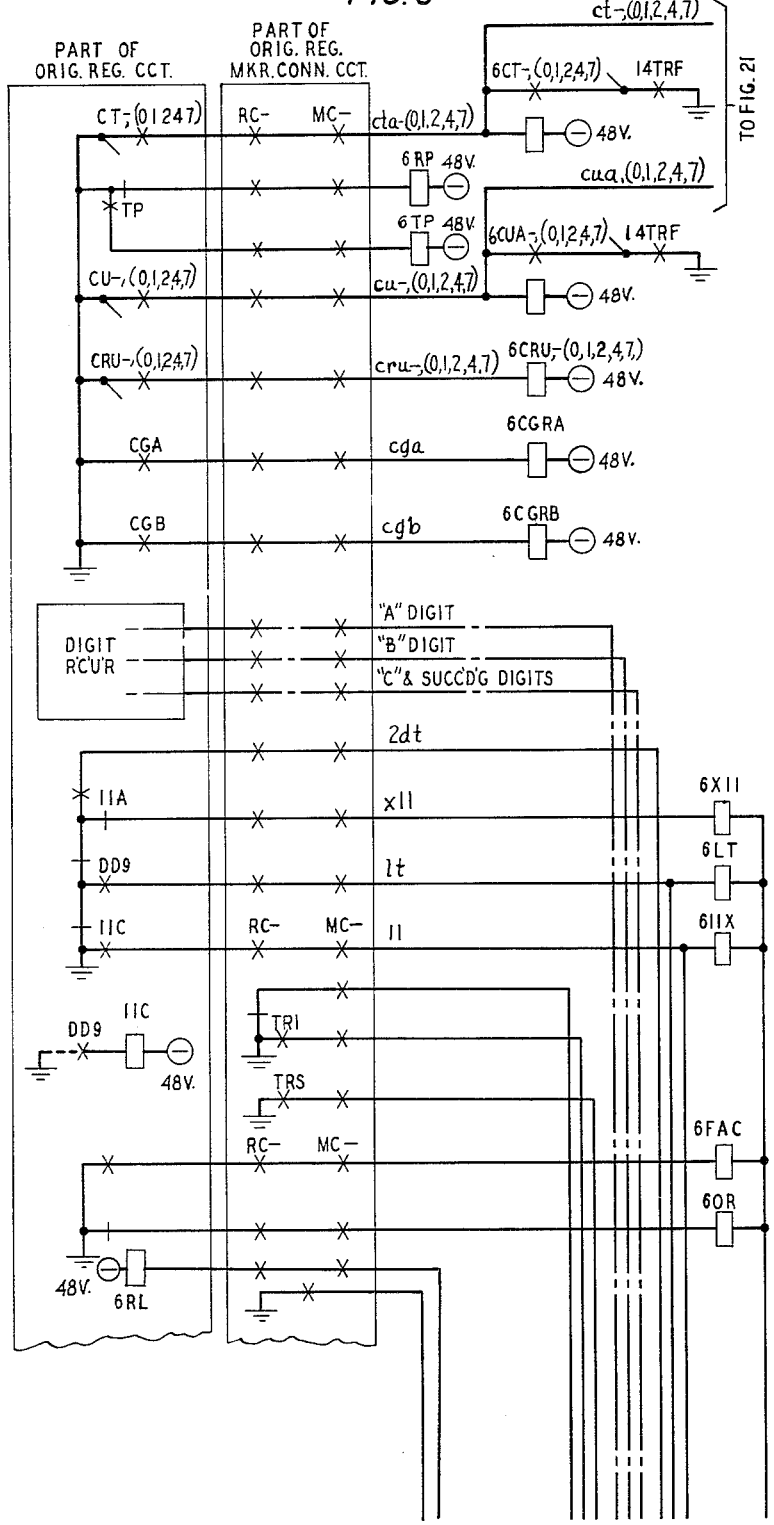
Figure 7:
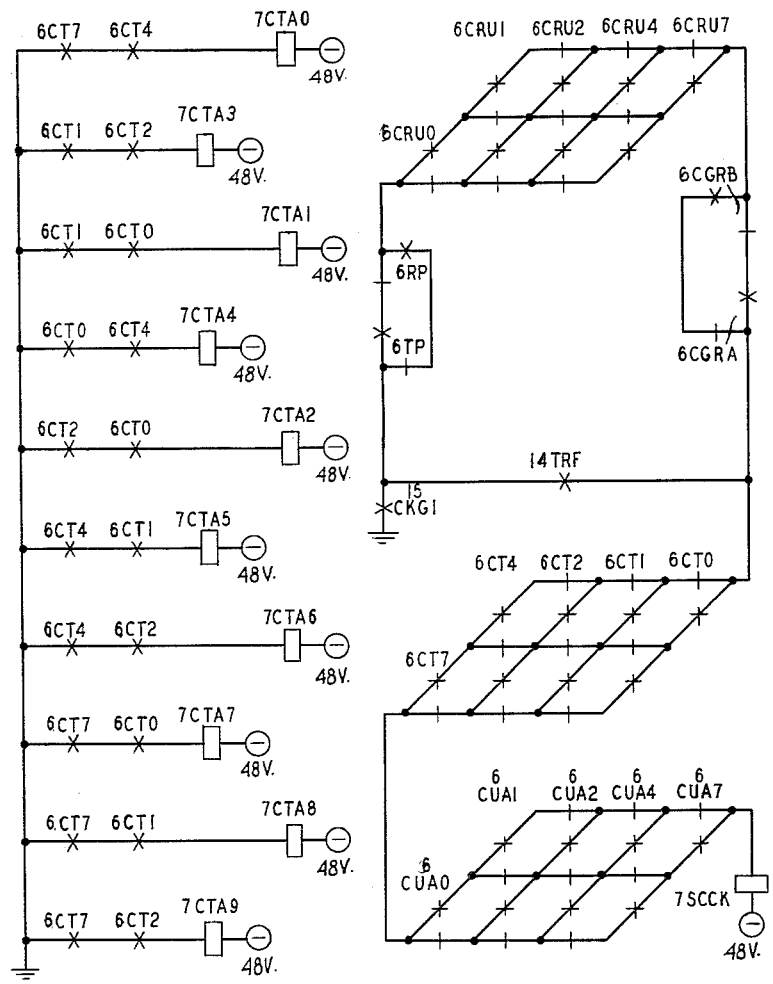

The contacts of the 5CST– and 5CSU– relays in FIG. 5 extend operating grounds to their associated punchings $cs00$ through $cs29$, $cst3$ through $cst9$, which punchings may selectively be cross-connected to operate any of relays 5CN, 5AOC, 5MR, or 5CGS. For convenience grounds available over contacts of the 5CST0, 5CST1, and 5CST2 relays are steered over contacts of relays 5CSU0 through 5CSU9 to provide thirty individual punchings $cs00$ through $cs29$, corresponding to the first thirty classes of service, whereas classes of service 30 through 99 are grouped ten at a time over punchings $cst3$ through $cst9$.

Since it has been assumed that the call incoming to the central office under consideration was for a line directly served by the central office and moreover that this line was a line of a customer group, viz., customer group 30, punchings $cst3$ (FIG. 5) is cross-connected to punchings $cgs$. Marker relay 5CGS is operated over the path from ground, make contacts 5CSK and 5CST3 to the winding of relay 5CGS. Relay 5CGS operated makes an operating ground available to the class of service verifying contacts of the 5CST– and 5CSU– relays in FIG. 20. This operating ground is forwarded by the 5CST– and 5CSU– contact circuits, and make contacts of relays 21RDI and 21RDIA (FIG. 21) to operate relays 26CT– and 26CU– (on a two-out-of-five basis) in the incoming trunk circuit, portions of which are shown in FIG. 22.

Figure 26:
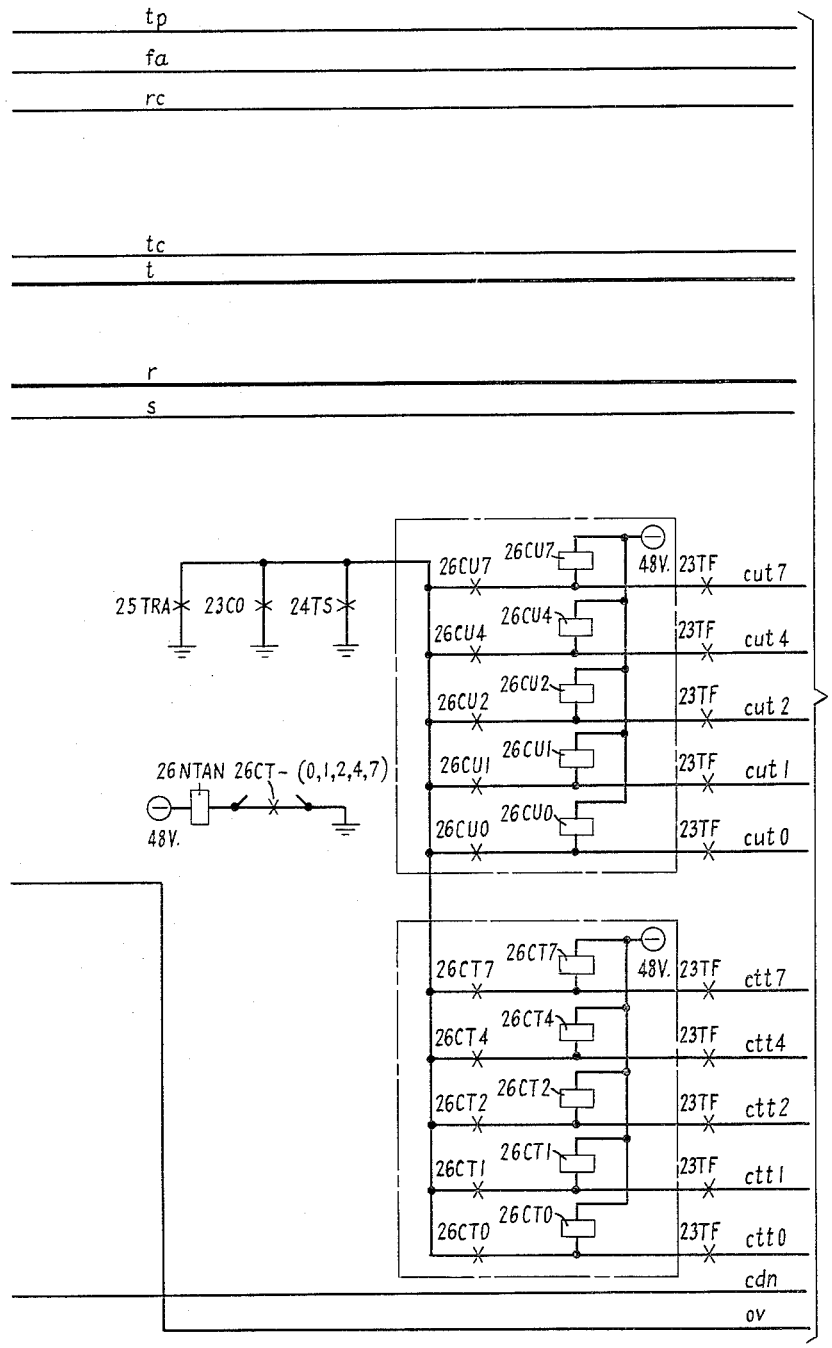

The aforementioned 26CT– and 26CU– relays in the incoming trunk lock and return ground (shown in FIG. 26)

over the CST– and CSU– verifying contacts and make contacts of relay 17RIK to operate class tens checking relays 20CTK1, 20CTK2 and class units checking relays 20CUK1, 20CUK2. Relay 17RIK operates a short time after being energized by the ground made available to its winding over a make contact of relay 5CGS, which time is adjusted to be sufficient to permit the application of ground to the 26CT– and 26CU– relays in the trunk.

If one or more of the 5CST– and of the 5CSU– relays were incorrectly operated, the ground provided their contacts would operate cross check relay 20XCS which would ground the xcs lead (FIG. 17) causing the marker to initiate the usual sequence of operations described in BUSCH for the occurrence of a "cross" condition. Relay XCS normal makes available an operating ground in FIG. 17 which is forwarded over off-normal contacts of relay 20CTK1, 20CTK2, 20CUK1, 20CUK2, 17RIK, and 21RDI to the winding of class tens and units check relay 17CTUK. Relay 17CTUK operated operates line-idle relay 17LI whose operating path was interrupted by the operation of relays 5CGS. Operation of line-idle relay 17LI enables the marker to continue its call completing functions. When the marker completes the communications switch linkage from the trunk link frame appearance of the incoming trunk to the link line frame appearance of the called line, the incoming register is released by the marker, as described in Busch 2,585,904 aforesaid. The aforementioned relays in the marker which are operated by the incoming register are accordingly released and the marker releases the trunk link and line link, allowing the communications linkage to be held by the sleeve ground (not shown), all of which are well known.

(b) *Transfer calls.*—The transfer of a call, that had been completed, as described above, to a called customer group station, is initiated by a switchhook flashing at the called or "transferring" station. The incoming or intra-office trunk associated with the call (details of which are shown in FIGS. 23–26 and 27–31, respectively) has, as mentioned above, stored the class of service of the switchhook flashing station. The trunk in response to switchhook flashing seizes an incoming register via an appearance of that trunk in the incoming register link. The incoming register seizes a marker without waiting for digit pulses and transmits to the marker the type of call. It does so advantageously by operating a trunk class relay 14TCA or 14TCB and one of the trunk operating class relays 14SC–, such as trunk operating class relay 14TSC0, the particular trunk class and trunk operating class relays operated being dependent upon a translation made in the incoming register of the transfer request signal furnished it by the incoming trunk. Since such translation may easily be accomplished with known incoming registers, for example, those shown in any of Patents 2,535,661 to Adam and Avery and 2,531,637 to C. G. Miller, the details of the incoming register are omitted from the drawing.

Relay 14TSC0 operated extends the ground made available over an off-normal contact of relay 14TCB to operate relay 14TRF in the marker. Relay 14TRF operated operates relays 14TRF1, 2, and opens the operating path for relay 12TCCK. The incoming register also transmits to the marker the trunk link frame location by operating an 18FG– and an 18TF– relay and transmits the trunk number of the incoming trunk by operating an HT–, a TT–, and a UT– relay (not shown). Relay 14TRF2 operated at its make contact in FIG. 18 makes available an operating battery to the 18FG– and 18TF– steering contacts over the path from battery, make contact 16TLC1, back contact 21RE, and make contact 14TRF2. This operating battery is steered over the 18FG– and 18TF– contacts to operate the marker preference relay MP– in the trunk line and connector circuit (FIG. 22) associated with the trunk storing the switchhook flashing line's class of service.

Figure 19:
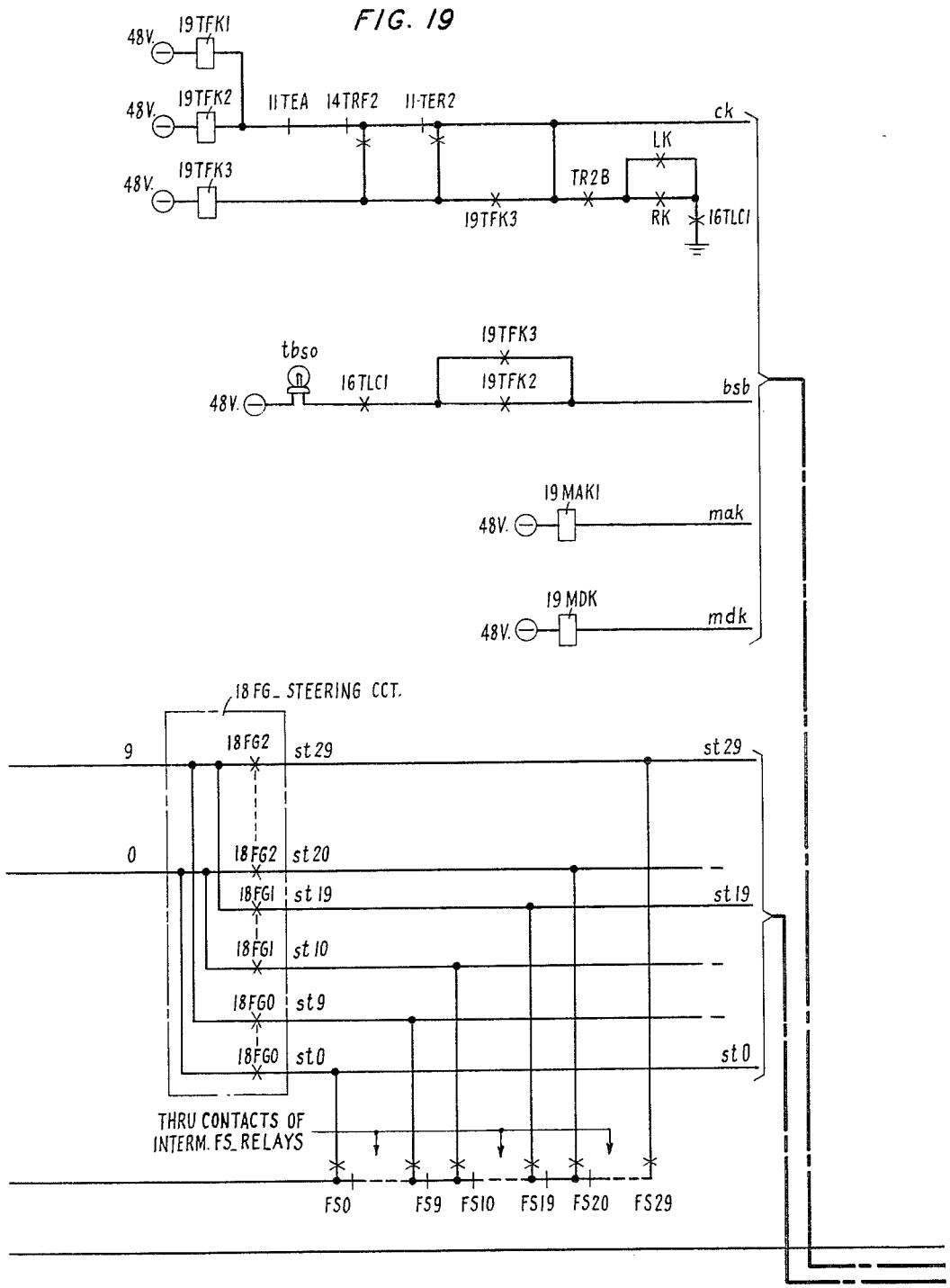
Figure 20:
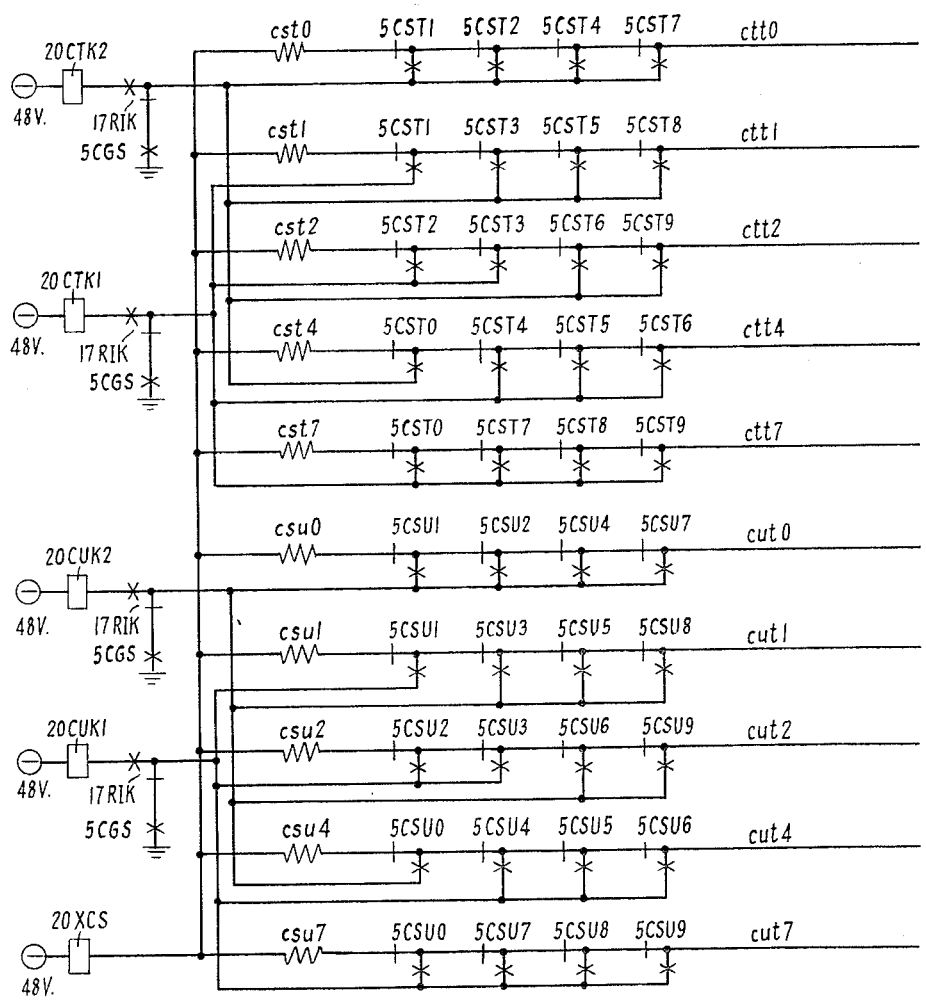

The marker preference relay MP– in the trunk link and connector circuit, at one of its make contacts, returns ground on lead ck to the marker which ground is steered by the contacts of relay 14TRF2 in FIG. 19 from the winding of relay 19TFK2 to the winding of relay 19TFK3. Relay 14TRF1 at one of its contacts in FIG. 18 transfers the f lead of the incoming register link, which lead is associated, for example, with the 23LF and 23TF relays in the incoming trunk (FIG. 23), from 48 volt low resistance battery and connects it to 130 volt high resistance battery to operate only the 23TF relay in the trunk. Marginal relay 23LF remains normal.

Relay 14TRF2 in the marker at one of its make contacts in FIG. 21 continues the ground made available over the back contact of release relay 21RE to the winding of relay 21RD0. Relay 21RD0 operated steers the grounds at the locked windings of the "CT–" and "CU–" relays in the trunk to the winding of the 6CT– and 6CUA– relays in the marker.

Marker relays CT– and CUA– operate to register the class of service of the switchhook flashing line received from the trunk. Relay 7SCCK operates in response to the registration of the class of service tens and units of the switchhook flashing line over the path (FIG. 7) made available from ground by the operation of the off-normal contacts of relays 15CKG1 and 14TRF, the latter contact bridging the checking contacts of the 6CRU– relays which contacts are not operated because no rate treatment has been stored in the incoming trunk. Relay 7SCCK operated completes the ground made available over an off-normal contact of relay 14TRF to the winding of release relay 21RE. Relay 21RE operated at its back contact in FIG. 18 removes operating battery from the marker preference relay MP– in the trunk line and connector circuit (FIG. 22). The marker releases the trunk which furnished the class of service of the switchhook flashing station.

The release of the trunk link and connector circuit removes the ground from the winding of relay 19TFK3 which releases.

Figure 12:
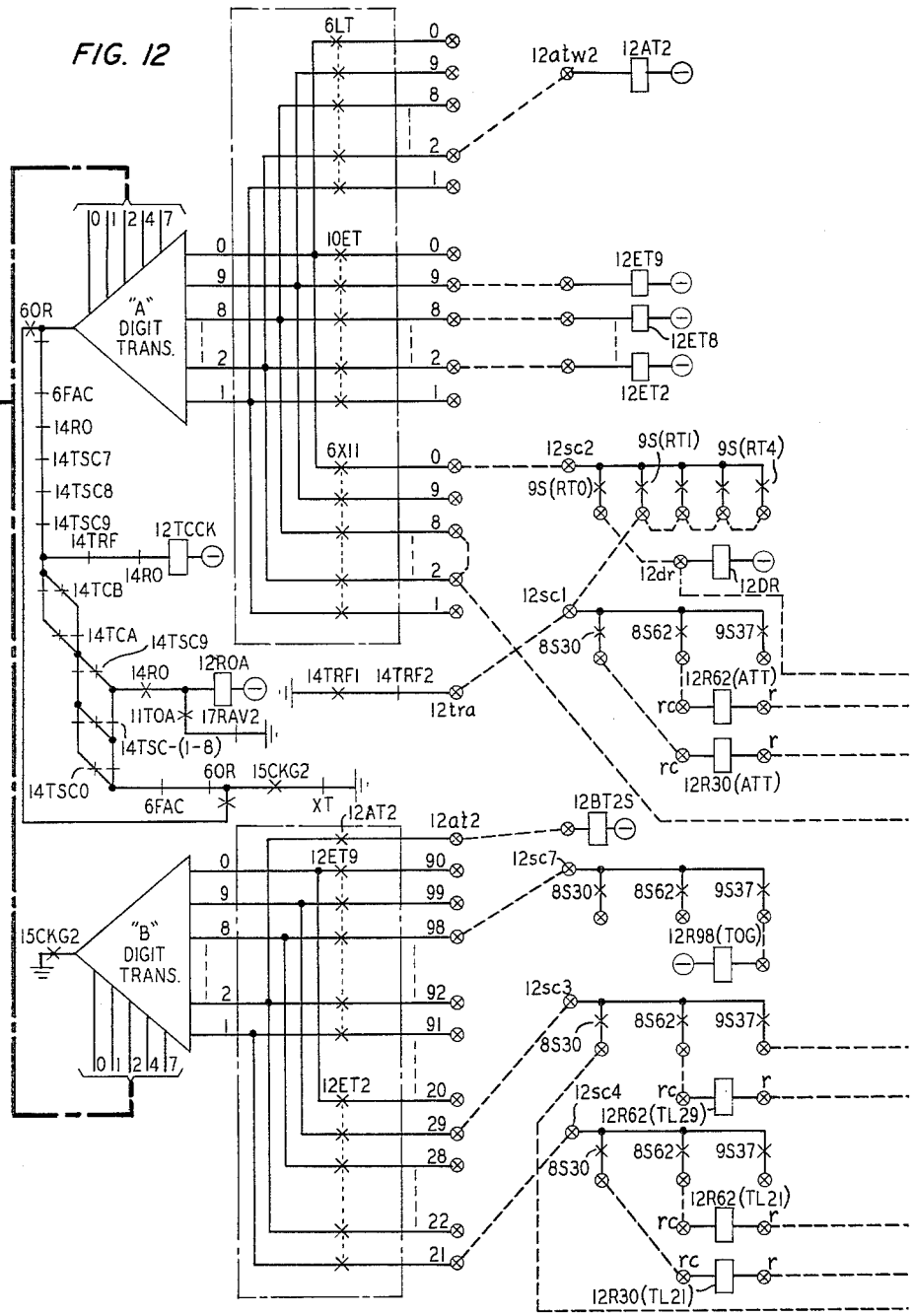

Relay 21RE operated at its back contact in FIG. 14 opens the ground operating path for relay 14TRF2 and relay 14TRF2 releases when its locking path is removed by the release of relay 19TFK3. Relay 14TRF1 remains operated, however, and applies over its make contact in FIG. 12 a ground that is completed over a back contact of relay 14TRF2 to the *tra* punching. Punching *tra* is cross-connected to service common punching 12*scl* and the ground applied to this service common punching is continued over a make contact of the screening relay 8S30. Screening relay 8S30, as shown in FIG. 8, is operated by the class of service of the switchhook flashing station that was entered on the marker's 6CUA4, 6CUA7, and 7CTA0 relays. The ground continued by the make contact of relay 8S30 in FIG. 12 is applied to the winding of route relay 12R30(ATT) which designates the group of attendant trunks appropriate to the customer group (30) in which the switchhook flashing station is included. A contact (not shown) of route relay 12R30(ATT) operates relay NS0 (some of whose contacts are shown in FIG. 11) to indicate that no sender is required on the call and to prepare a path to operate relays 11TRF3, 4. The marker does this by utilizing the ground provided by the incoming register (FIG. 10), which ground is continued in FIG. 11 over back contacts TR2, LR, RTST and make contacts NS0 and 14TRF1 to operate relays 11TRF3 and 11TRF4. Relay 11TRF4 in operating locks to ground over back contact 11TOA and make contact 15CKG2. Relay 11TRF3 operated extends a ground in FIG. 16 made available over an off-normal contact of relay 15CKG2 to the winding of relay 16FLG over back contact 15LK1.

Relay 16FLG operated initiates a sequence of operations described in Busch, which sequence includes the utilization of the trunk number of the incoming trunk that was registered on the HT–, TT–, and UT– relays (not shown) for the selection of a trunk number group. The marker receives from the trunk number group the line link appearance and ringing combination of the incoming trunk, and establishes a communications switch linkage from the trunk line frame appearance of the selected customer group attendant trunk to the line link appearance of the incoming trunk. While the marker is connected to the attendant trunk, (FIG. 22) lead *tp* is grounded by the make contact of relay 11TRF3, (FIG. 21) back contacts CDN and 11TER2. Lead *tp* grounded operates relays in the attendant trunk to inform the attendant that the attendant trunk has been seized on a transfer type call. The operation of this relay in the trunk returns ground on the *tp* lead to operate relay 21TPK in the marker. Relay 21TPK operated operates relay 16CLK informing the marker that the class of call has been correctly entered in the appropriate trunk. The operating path for relay 16CLK may be traced from ground, back contact CAA, make contacts 11TRF4 and 21TPK, back contact SON, and make contact NS0 to the winding of relay 16CLK.

(c) *Customer group directory number calls.*—The marker receiving a customer group directory number call from an incoming register will process the call as a terminating call, as described above under the caption Incoming Call, with the exception that when the marker connects to the number group the number group will furnish the marker a predetermined ringing combination which, in the illustrative embodiment, may be assumed to be ringing combination 4. The number group also furnishes the marker an equipment location designation as it would in the conventional operation described in the Busch Patent 2,585,904, aforesaid. Advantageously, however, no equipment is connected at the line link frame location corresponding to this designation furnished by the number group. This is so even though the attendant trunks have line link frame appearances which might be made to correspond to these designations. It is envisioned that each customer subscribing for Customer Group Service wil be furnished a plurality of attendant trunks rather than merely one, and thus, if a particular one of these attendant trunks were busy and had its line link appearance correspond to the equipment location designation furnished by the number group, a misleading busy indication would be returned to the marker even though there were other attendant trunks assigned to the called customer group that were idle. Of course, if there were only one attendant trunk for a particular customer group, the equipment location designation furnished by the number group might be furnished so as to correspond with the line link frame appearance thereof.

When the marker has received the line link location designation (and it will be hereinafter assumed that no equipment is connected at that location) and the ringing combination, the marker releases the number group in the manner described in Busch, aforesaid. The line link location designation, however, registered in the marker causes the marker to seize and connect to the corresponding line link frame (FIGS. 1 or 4 as determined by the operated FTT–, FUT– relays described in Busch, aforesaid). In so doing, the marker extends a ground over contact FTK1 (FIG. 5) to one of the *v*0 through *v*4 leads corresponding to the operated one of the VFT– (0–4) relays. This ground is continued over make contacts of the operated one of the 4VGB– (0–11), FIG. 4 (or 1VGB0–11 of FIG. 1), relays in the selected line link and frame connector circuit to one of the class of service crosspoints *cs*0 through *cs*9 and to one of the class of service crosspoints *cs*10 through *cs*19 corresponding to the class of service tens and units number of the "equipment location" for the called directory number. The grounded one of leads *cs*0 through *cs*9 and *cs*10 through *cs*19 operate a respective one of the 5CST0 through 5CST9 and 5CSU0 through 5CSU9 class of service tens and units registering relays in the completing marker (FIG. 5). Since it has been assumed that the called directory number is that of a customer group, contacts of the operated 5CST– and 5CSU– relays will extend an operating ground to one of the punchings such as *cst*6, *cst*3, or *cs*11–18 that are cross-connected to operate the 5CGS relay in the marker. Marker relays 21RDI and 21RDIA are operated over a make contact or relay 14INC, as on the above-described marker operation on incoming calls. The operation of the 5CST–, 5CSU–, 5CGS, 21RDI, and 21RDIA relays transmits ground over leads *ctt*(0, 1, 2, 4, 7) and *cut*(0, 1, 2, 4, 7) as described above to the incoming trunk to register the corresponding information therein.

Figure 15:
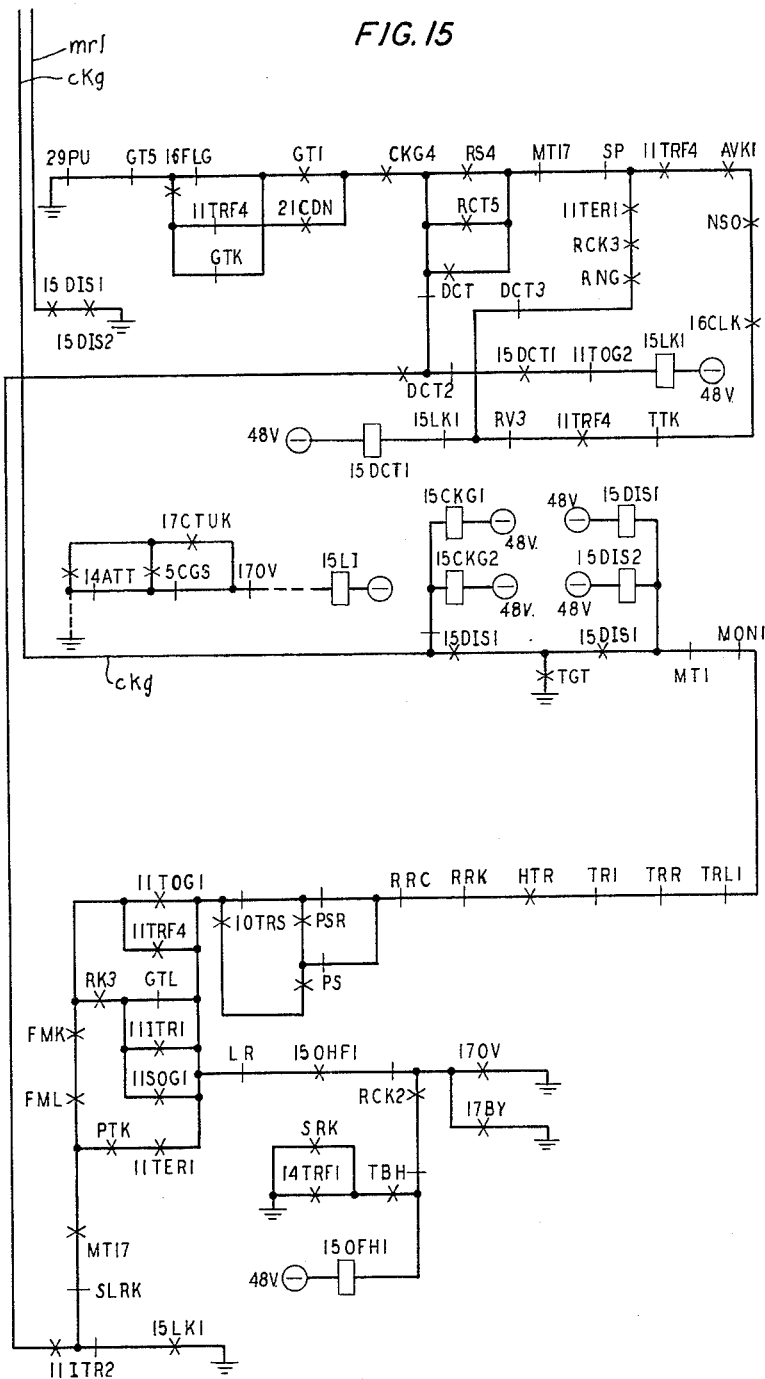
Figure 24:
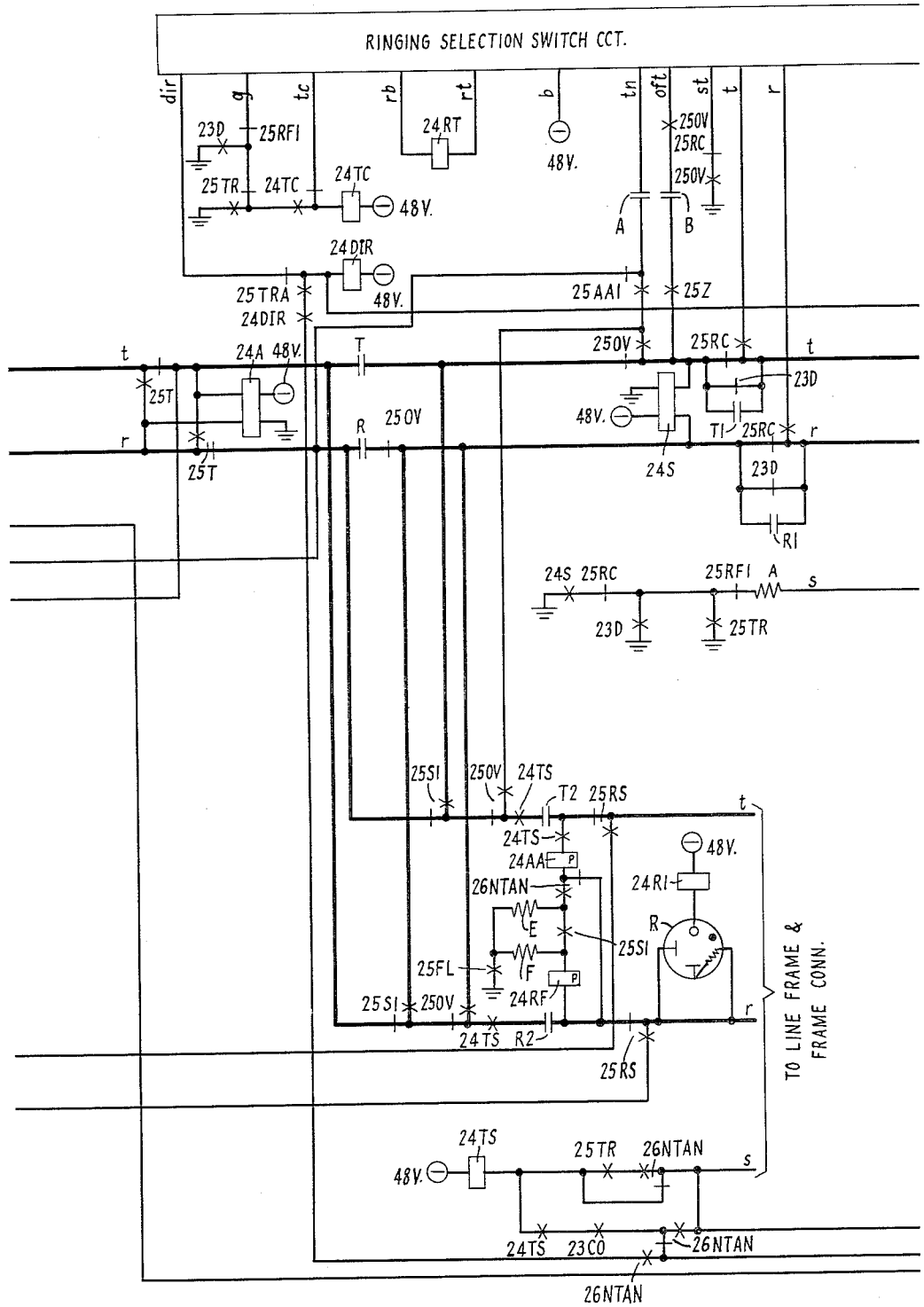

Although the marker while connected to the line link frame dictated by the number group and to the trunk link frame of the incoming trunk proceeds to select a channel between them, this channel is prevented from being established as follows. The marker forwards the ringing combination received from the number group to set the ringing selection switch associated with the incoming trunk. The ringing selection switch for the predetermined ringing combination operates relay 24DIR in the incoming trunk (FIG. 24). Relay 24DIR operated sets the incoming trunk to start a transfer call and grounds lead *cdn* (FIGS. 22, 21) to the marker to operate marker relay 21CDN. Marker relays 21CDN and RS4 (the latter, some of whose contacts are shown in FIG. 15, having been operated by the receipt of the predetermined ringing combination 4) complete a path to the winding of marker disconnect test relay 15DCT1. This path may be traced (FIG. 21) from ground, back contacts PU and GT5, make contact 16FLG, back contact 11TRF4, make contact 21CDN, make contact CKG4, make contact RS4, back contacts MT17 and SP, make contacts 11TER1, RCK3, and RNG, back contact DCT3, back contact 15LK1 to the winding of relay 15DCT1 which operates. When relay 15DCT1 operates it completes a path for the ground available over back contact DCT at the point in the last-mentioned chain of contacts after contact CKG4 to the winding of relay 15LK1. Relay 15LK1 operates making available an operating ground to relays 15DIS1, 2 which operate causing the marker to disconnect from the call, in the manner described in Busch. Relay 15DIS1 in operating also grounds lead *mr*1 to the incoming register causing the incoming register both to release the marker and to release from the incoming trunk.

After the incoming register has released from the incoming trunk, the incoming trunk seizes another incoming register for the transfer call. The transfer call is handled in the manner described above with the exception that the marker when seizing the incoming trunk on this call will receive ground on the *cdn* lead (FIG. 21) which will operate relay 21CDN in the marker. When the marker connects to the attendant trunk selected for the transfer call, the marker grounds lead *tc* to the attendant trunk (FIG. 22) operating a class relay in the attendant trunk that will function to inform the attendant that the attendant trunk has been seized on a directory number call. The ground path for lead *tc* may be traced from ground (FIG. 21) over make contacts of relays 14TRF3 and 21CDN and back contact 11TER2.

(d) *Attendant-completed calls.*—The attendant completed call is a call used by the customer group attendant to connect a transferred incoming call to another station in the customer group. The attendant starts the call by seizing an incoming register via her control of the incoming trunk which is made available over the attendant-to-incoming trunk linkage established by the transfer call previously described. The attendant keys at her console (disclosed in detail in FIGS. 38–45) the station line number into the incoming register and at the completion of pulsing the incoming register seizes and connects to the marker in the usual manner. The incoming register (FIGS. 6, 10, and 14) furnishes the marker the trunk link frame location of the incoming trunk, operates one of the called number translator selection relays 6LT, 10ET, 10FVD, etc., and transmits to the marker the called line's number. The incoming register also furnishes the trunk operating class by operating a 14TCA or 14TCB relay and one of the trunk operating class relays 14TSC0 through 14TSC9.

In the illustrative example it is assumed that the incoming register will operate relays 14TCB and 14TSC5. Relays 14TCB and 14TSC5 operated operate relay 14ATT. Relay 14ATT operated at one of its contacts in FIG. 21 operates relay 21RD0. The selected one of the marker called number translators grounds a code point determined by the number keyed by the attendant, and this code point is cross-connected to extend the ground to operate one of the local completion relays 13LPA, LPB, etc. Contacts (shown in FIG. 11) of the operated one of the local completion relays operates the marker 11TER1, 2 relays. The marker proceeds to process the call as a terminating call, described above under the caption Incoming Calls, with the exception that the contacts of the operated 21RD0 relay prepare a path from the contacts of the 26CT– and 26CU– relays in the incoming trunk (FIG. 22) to the windings of the 6CT– and 6CUA– relays in the marker so that the latter relays register the class of service that is stored in the incoming trunk. When the marker connects to the line link frame of the called line, the called line's class of service is registered on the marker's 5CST– and 5CSU– relays. The latter relays, when operated, extend over their contacts an operating path to the winding of relay 5CGS, it being assumed that the called line is a customer group line. The class of service registered on the marker 6CT– and 6CUA– relays provides grounds over back contacts of relays 21RDI and 21RDIA, which grounds are extended over make contacts of the operated ones of the 5CST– and 5CSU– relays and the make contacts of operated relay 17RIK to the windings of relays 20CTK1, 2 and 20CUK1, 2. The latter relays operate when the class of service registered on the 6CT– and 6CUA– relays corresponds to the class of service registered on the 5CST– and 5CSU– relays. In FIG. 17 contacts of relays 20CTK1, 2 and 20CUK1, 2 extend ground over make contacts 17RIK and 14ATT to the winding of relay 17CTUK. Relay 17CTUK operates, and one of its make contacts completes an operating path (opened by relay 5CGS) to the winding of relay 17LI. Relay 17LI operated, permits the marker to proceed with the establishment of the forward linkage (relay FLG operated) as described above.

Had the classes of service not matched, relay 20XCS would operate applying a ground over its make contact (FIG. 17) and those of relays 14ATT and 5CSK, back contact 17CTUK, and make contact 11TER2 to the winding of relay 17OV. Relay 17OV operates and grounds lead *ov* to the incoming trunk causing a corresponding relay 25OV in the incoming trunk to operate. The latter relay in operating grounds the *ov* lead (FIG. 22) and operates marker relay 22OVK. Relay 22OVK operated controls the marker to set the incoming trunk ringing selection switch to transmit the overflow signal.

Figure 3:
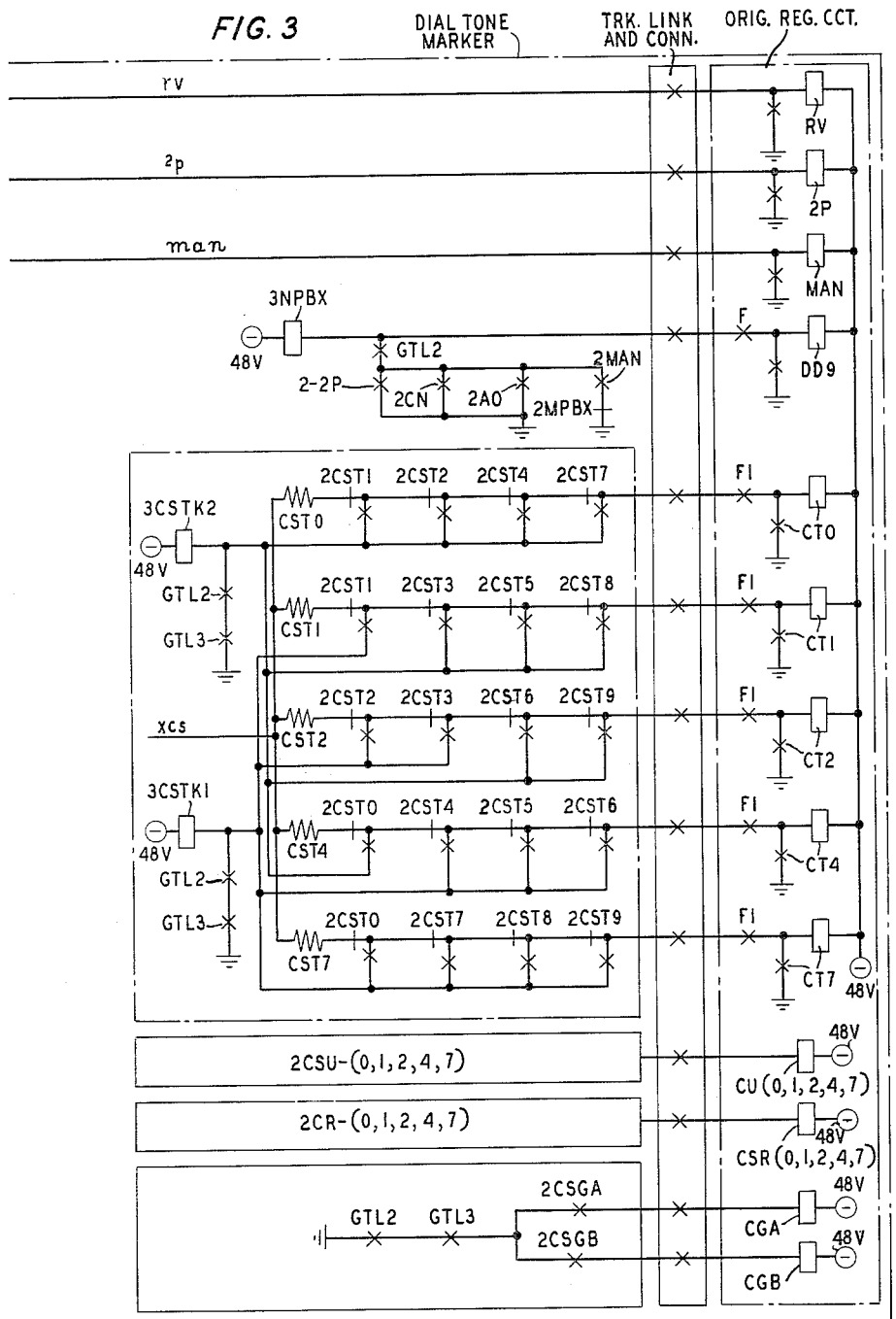

(e) *Intra-customer group and "ADS" calls (four-digit basis calls).*—Stations of a customer group, i.e., stations whose line link frame equipment locations are marked by the same customer group class of service designation, may call each other on a four or five digit basis because the originating register seized by the calling station is apprised of the fact that a station of a customer group is making the call. In the dial tone marker relay 2PBX is the only one of relays 2P, 2MAN, 2A0, etc. which does not have its contacts in FIG. 3 wired to operate originating register relay DD9. Relay DD9 is accordingly always operated when a station not belonging to a customer group initiates a call. In addition, the fact that the calling customer group station does not dial a directing digit "9" informs the originating register that it (at its appearance in FIG. 6) is to designate one of the local called number translators in the completing marker whose code points delineate the numbers of called customer group stations. In the illustrative example, it is assumed that the 6X11 translator is the one selected and it is operated by a ground applied to the *x*11 lead by the originating register.

In the originating register, which advantageously may be of the type disclosed in the copending application, Serial No. 799,260, of L. T. Anderson and E. G. Crane, filed March 13, 1959, now Patent 3,102,930 issued September 3, 1963, ground is applied over back contacts of relays 11C, DD9, and 11A to the *x*11 lead. In this path relay 11C is normal because it is assumed that in the central office under consideration telephone company service codes of the 11X type, and accordingly the directing digit "9," must have been dialed or relay DD9 must in some way have been operated in order to complete an operating path to the winding of relay 11C. Since it has been assumed that relay DD9 was not operated, the operating path for relay 11C cannot be completed. Relay DD9 is normal because the calling customer group station did not dial the directing digit "9." Had the call been initiated by a station not belonging to a customer group, relay DD9 would be operated by the originating register recognizing that the class of service of the calling line was "non-customer group" (relay 3NPBX operated). Since it has been assumed that the calling station belongs to a customer group and has not dialed directing digit "9," relay DD9 is normal. Relay 11A is normal because it is assumed that the calling customer group station has not dialed a 1XX tie line code. Had the calling customer group station dialed a 1XX tie line code, relay 11A would operate and ground lead 2*dt* (FIG. 6) to operate extra translator designating relay 10ET in the completing marker to select the called number translator having code points corresponding to called tie line codes. The completing marker processes the call as an intra-office call. In processing an intra-office call, the marker selects an intra-office trunk and connects one end of the trunk to the calling customer and the other end of the trunk to the called customer. (Intra-office trunks that are equipped for response to switchhook flashing have in addition to these two "ends," which both appear on the trunk link frame, an appearance on a line link frame so that a linkage may be established to the required attendant trunk. These trunks also have an appearance in an incoming register link.)

The intra-office call is described in detail in the above-mentioned patent to A. J. Busch 2,585,904. Briefly, however, the calling line's class of service, registered on the completing marker's 6CT– and 6CUA– relays, selects an "8S–" screening relay whose contacts in FIG. 12 extend the ground provided from the translator code point corresponding to the called line's number to a "12R–" or "13R–" route relay such as route relay 13R33(ITR) for intra-office trunks. A contact (not shown) of this route relay 13R33(ITR) operates the NSI relay (some of whose contacts are shown in FIG. 11) which satisfies the marker requirements for outgoing sender information, in this case, by informing the marker that no sender is required on this intra-office call. Relay NSI operated at its contacts in FIG. 11 operates relay 11–ITR1, 2. Relays 11–ITR1, 2 operate forward linkage relay 16FLG. Relay 21RDI is kept from operating on four-digit intra-customer group calls by relay 17X11A opening the operating path to relay 21RDI. Since it is assumed that the four-digit call is not being made to a customer group directory number the bridge across the back contact of relay 17X11A, that is provided by a make contact of relay 21CDN remains open-circuited.

When the marker has seized the line link frame of the called line, its class of service is registered on relays 5CST– and 5CSU–. Relay RDI being normal, a path is made available over the operated contacts (FIG. 20) of relays 6CT– and 6CUA– and the operated contacts of relays 5CST– and 5CSU– to operate relays 20CTK1, 2 and 20CUK1, 2 when the classes of service of the called and calling stations agree. In this manner, calls on a four-digit basis may be restricted for use only between stations of the same customer group. An exception to this exists when the calling station is permitted to make "ADS" calls, in which case the rate treatment of the calling station obtained from the originating register (FIG. 6) will be registered on completing marker relays 6CGRA or 6CGRB and on a 0, 1, 2, 4, 7 basis on relays 6CRU–. Assuming the classes of service fail to match and the calling station is provided with an "ADS" rate treatment, the rate treatment number registered on the contacts (FIG. 9) of the aforementioned 6CGRA and 6CGRB and 6CRU– relays will operate a "9S–" rate treatment screening relay 9S(RT4) which will complete a ground made available over a back contact (FIG. 17) of relay RCT9 to the winding of relay 17CTUK over a back contact of relay 21RDI. Relay 17CTUK permits the marker to proceed with the call in a similar manner to that described above for the incoming call. It should be noted that relay 17CTUK will be operated over this bypass path provided by the rate treatment 9S(RT4) relay as soon as the calling line's class of service has been registered on the completing marker relays. Relay 17CTUK operated opens the path to the *ova* lead preventing the subsequently occurring 20XCS relay's ground from precipitating a false overflow condition. When the linkage from the called appearance of the intra-office trunk on the trunk link frame is completed to the called line, relay 15LK1 operates enabling relays 26CB and CB1 to operate. Subsequent operations proceed as described in Busch, aforesaid.

(f) *Intra-office calls (seven-digit basis calls)*.—When a station of a customer group dials a directing digit "9," the originating register seized on the dial tone connection is apprised of this fact and also that the calling station belongs to a customer group. The originating register (FIG. 6) grounds lead 1*t* to operate completing marker local translator selection relay 6LT. The code points of the local translator for the code called are wire to a route relay for intra-office trunks of the type having transfer capabilities.

Assuming, for example, that the code digits of the called number are "9 A B C," the originating register absorbs the initial "9" and passes the "A B C" digits to the completing marker. Assuming the "A B C" digits to be 2, 2, and 6, respectively, the "A" digit translator (FIG. 12) will have the decimal 2 output bus ground steered over a make contact of called number translator relay 6LT to punching 12*atw*2 associated with relay 12AT2. Relay 12AT2 operates and at its make contact steers the ground appearing on the decimal 2 output bus of the "B" digit translator to the winding of relay 12BT2S. The digit 6 is entered in the "C" digit translator indicated in FIG. 10 and the decimal 6 output thereof is steered over a contact (FIG. 13) over relay 12BT2S to code point 226. Code point 226 is cross-connected to the *rc* punching for route relay 13R36(ITR–TRF). The other end of the winding of this route relay may be connected to battery over any one of a plurality of paths determined by the calling line's dialing privileges as indicated by the operated 9S(RT–) relays.

At this point it might be well to indicate the significance of the illustrated rate treatments which determine the calling line's dialing privileges. Rate treatment 0 (relay 9S(RT0) operated) is assigned for lines of a customer group which may only reach other stations of the same customer group. Rate treatment 1 (relay 9S(RT1) operated) in addition permits calls to the customer group atendant. Rate treatment 2 (relay 9S(RT2) operated) in addition permits calls to tie lines; (restriction to those tie lies assigned to the customer group being determined by the assigned customer group class of service number, relay "8S–"). Rate treatment 3 (relay 9S(RT3) operated) permits calls to be made within the local message unit area (local dial "9" calls). Rate treatment 4 (relay 9S(RT4) operated) in addition permits toll calls and "ADS" calls.

Returning now to the seven-digit call which resulted in the grounding of code point 226 (FIG. 13), the ground is continued by cross-connection to the winding of route relay 13R36(ITR–TRF). The other end of the winding of this route relay is cross-connected to service common punching 13*sc*61. According to the above assumed illustrative rate treatments, if the calling line has rate treatments 0, 1, or 2, the operated rate treatment screening relays 9S(RT0, 1 or 2) extend the ground to the winding of denied route relay 12DR. Relay 12DR operates, but being a high resistance relay does not permit route relay 13R36(ITR–TRF) to operate, and the marker initiates a sequence of operations described in Busch, aforesaid. On the other hand, if the calling line is assigned rate treatments 3 or 4, the operation of the associated rate treatment screening relays 9S(RT3 or 4) extend the ground to the winding of low resistance relay 13NCCN, which permits route relay 13R36(ITR–TRF) to operate.

Assuming the operated 9S(RT–) relays complete battery to the aforementioned route relay 13R36(ITR–TRF), a contact thereof (not shown) will complete an operating path to the winding of relay NSI which operates and one of whose contacts in FIG. 11 completes an operating path to relays 11–ITR1, 2. Since the local translator 6LT relay, rather than the 6X11 relay, was selected on the seven-digit call, a ground is made available incident to the establishment of the forward linkage, i.e., prior to the operation of relay 15LK1, to operate relay 21RDI. This ground may be traced (FIG. 21) over back contact 15LK1, back contact 17X11A, and make contact 11–ITR1. Relay 21RDI operated prepares a path to the 31CT– and 31CU– relays in the intra-office trunk so that the intra-office trunk may store the called line's class of service.

(g) *Intra-office calls, route advance*.—So far the selection of an ordinary type of intra-office trunk has been described in the case of a call made between stations of the same customer group, and the selection of an intra-office trunk having transfer capabilities has been described for the case of an intra-office call made on a seven-digit basis between stations of different customer groups. In addition, the four-digit "ADS" call has been described, which call has also made use of one of the conventional types of intra-office trunks. Since it is desirable because of their greater cost to provide only as many intra-office trunks having transfer capabilities as may be required by anticipated traffic conditions, conventional intra-office trunks will be employed as extensively as possible. Thus, in the above-described cases, it has been assumed to be unnecessary to provide transfer capabilities on calls between stations of the same customer group or between stations of different customer groups in the case where the calling station has "ADS" privileges.

When a call is made on an intra-office basis to a customer group directory number, however, it is desirable to employ one of the intra-office trunks having transfer capabilities so that the attendant may reuse the called appearance of the intra-office trunk on the trunk link frame to extend the connection to the desired station.

Assuming operations have been allowed to continue so that one of the conventional intra-office trunks (a route relay such as 13R33(ITR) having been operated) was selected, operations proceed up to the point where the intra-office trunk commences to establish the forward linkage (relay 16FLG operated). At this point, however, the ringing combination (combination 4) provided by the number group informs the marker that the called number corresponds to a customer group directory number. The ringing combination prevents the establishment of the "FLG" linkage in the manner described above for an incoming call to a customer group directory number. A path is provided in FIG. 17 from ground over make contacts of relays RCT4, 17X11A, RS4, and 17X11A to the *dn* lead and via the *du* lead to the winding of relay 21CDN in FIG. 21. Ground is also provided over make contacts RCT4 and 17X11A, back contacts GS through GS4, and make contact 11–ITR1 to the winding of relays 17RAV1, 2. Relays 17RAV1, 2 operate and indicate that the marker is to undertake a route-advance operation to select a different type of intra-office trunk, i.e., one having transfer capability. The route-advance operation undertaken initiates a sequence of operations involving the operation of relay GS1 and the release of relay RA1 (as described in Busch, aforesaid). Contacts (FIG. 13) of relays GS1 operated and RA1 released make available a ground to punching 13*ra*33 over make contact CKG6, back contact RA1, and make contacts GS1 and 13R33(ITR). The ground on punching 13*ra*33 is forwarded over a make contact of relay 21CDN to operate relay 13R33'(ITR–TRF) which is the route relay for intra-office trunks having transfer capabilities. Advantageously this route relay may designate the same group of infra-office-trunks-with-transfer as was designated by the operation of relay 13R36(ITR–TRF) described above. In this connection, it is desired to point out that if a route advance had been precipitated by other than the fact that the call was to a customer group directory number, relay 21CDN would be normal and would extend the ground from route-advance punching 13*ra*33 to punching 131*r* from which the ground would be extended over back contacts RV and LB to the winding of path-busy relay 13PBY. Relay 13PBY would operate and initiate the return of busy, etc. tones as described in Busch, aforesaid.

Figure 13:
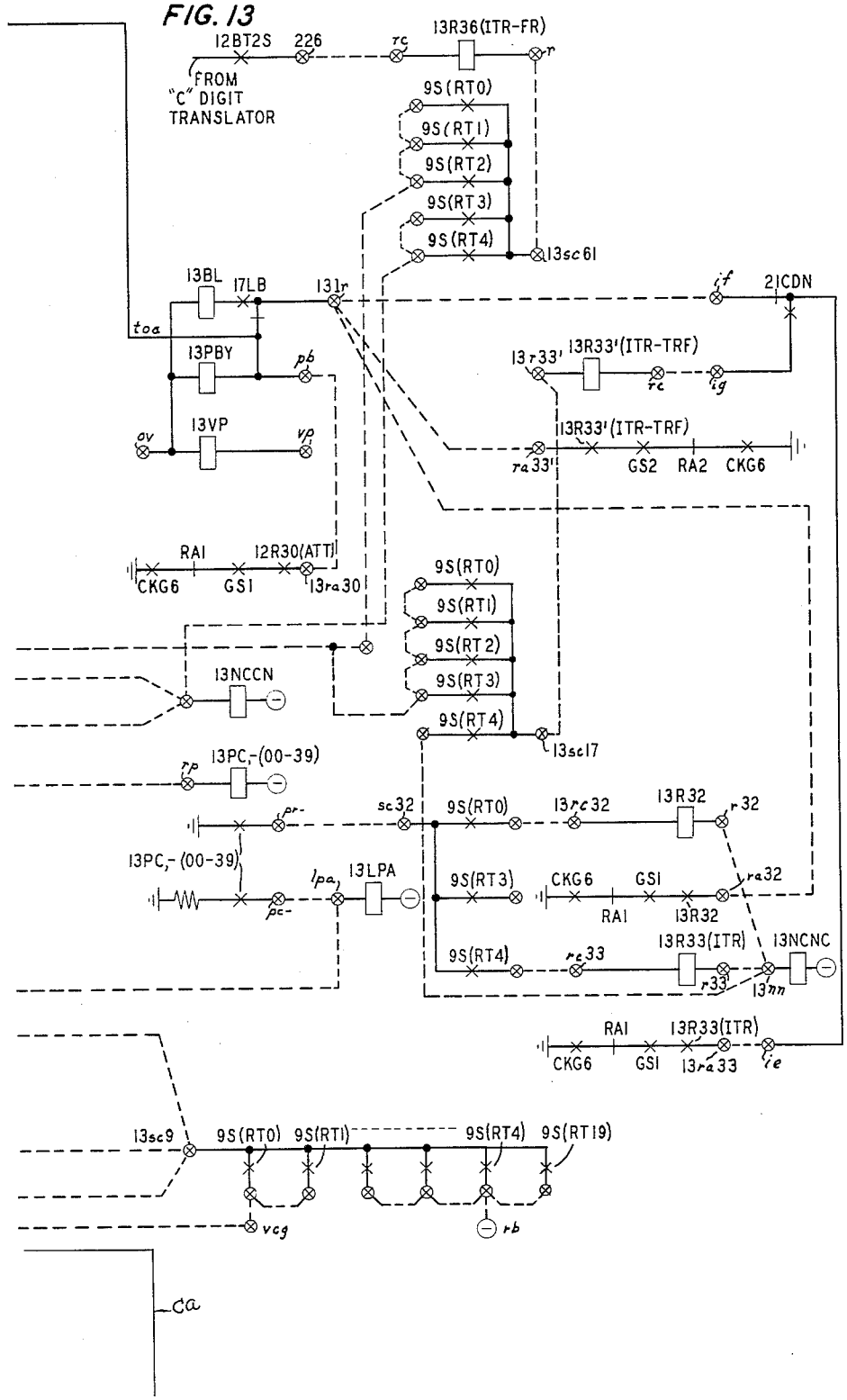

Assuming, however, that the ground in FIG. 13 was extended over make contact 21CDN to the winding of relay 13R33'(ITR–TRF), the operation of relay 13R33'(ITR–TRF) is determined by the paths made available by the 13*sc*17 punching cross-connected to the 13*r*33' punching at the opposite end of relay 13R33'(ITR–TRF) winding. In the illustrative embodiment, punching 13*sc*17 is shown associated with the make contacts of rate treatment screening relays 9S(RT0) through 9S(RT4). Assuming the route-advance from ordinary to intra-office trunks with transfer capabilities having been precipitated by a call to a customer group directory number from a calling station with "ADS" privileges (rate treatment 4), the ground made available at service common punching 13*sc*17 is continued over a make contact of rate treatment screening relay 9S(RT4) to battery at the 13*nn* punching associated with no-charge, non-coin relay 13NCNC. The path so extended permits relays 13R33'(ITR–TRF) and 13NCNC to operate in series. On the other hand, had the calling line not been permitted "ADS" calls, the route-advance operation would have proceeded to the point where ground was made available at service common punching 13*sc*17, whereupon the operation of any of rate treatment screening relays 9S(RT0) through 9S(RT3) would continue the ground to the 12*dr* punching associated with the winding of denied-route relay 12DR. The latter relay operates, but being of a high resistance type, prevents sufficient current in the path from operating route relay 13R33'(ITR–TRF) which is a marginal type relay. Operation of denied-route relay 12DR initiates a sequence of operations as described in Busch, aforesaid.

II. *Incoming trunk circuit (FIGS. 23–26)*

(a) *Incoming call.*—The incoming trunk circuit is activated by a calling condition impressed thereon as the result of the closure of the trunk conductors by the distant signaling office 2300. Trunk relay 24A operates over the calling bridge. Relay 24A operated applies resistance battery over the path (FIG. 23) including back contact 23CO, make contact 24A, back contacts 23CO, 25TRA, 25AA1, and 25T to the "*st*" lead of the incoming register link. Assuming that the remote signaling office associated with this particular trunk transmits dial pulses, a ground provided to the trunk circuit by the incoming register link over the *pr* lead is continued over back contact 25TRA and the *pra* lead to the incoming register link to cause the link to associate a dial pulse register. At the same time a ground provided by the incoming register link over the *tpc* lead is returned to the incoming register link over a back contact of relay 25TRA via the *cla* lead to operate class relays of the incoming register (not shown) that indicate to the marker the class in which the incoming trunk is operating at this time.

The incoming register link functions to seize an incoming register. Once the incoming register is conditioned the ground is transmitted back to the trunk over the *co* lead (FIG. 23) from the incoming register link. Relay 23CO operates, releases relay 24A, and grounds the *bl* lead to inform the register that relay 24A has been released. When the winding of the 24A relay is removed from the circuit, the battery and ground applied by the connected incoming register to the tip and ring leads are opposite to that formerly provided over the winding of the 24A relay and the distant office 2300 is thereby signaled to commence pulsing. When pulsing is completed the incoming register applies ground to the *d* lead through the incoming register link to operate trunk relay 23D. Relay 23D operated reoperates relay 24A provided the calling bridge continues to be maintained by the remote signaling office 2300.

The incoming register after the completion of pulsing selects a marker and the marker applies 48 volt resistance battery (FIG. 18) to the *f* lead of the incoming trunk over the path in the marker including back contact 14TRF1, make contact 19TFK3, back contact 15DCT1, make contact 16TLC1, back contact 150FH1, and lead *f*, operating relays 23TF and 23LF in the incoming trunk.

When the marker is seized by the incoming register on a transfer call, positive 130 volt resistance battery (FIG. 18) is applied over back contact ROA and make contact 14TRF1 in series with 19TFK3, 15DCT1, 16TLC1, and 150FH1, aforesaid to the *f* lead of the incoming trunk. The 130 volt high resistance battery causes sensitive relay 23TF to operate but the resistance is too high to permit marginal relay 23LF to operate. Relay 23TF remains operated during the transfer call until the marker has established linkage between the transferring station and the attendant trunk and releases.

Figure 25:
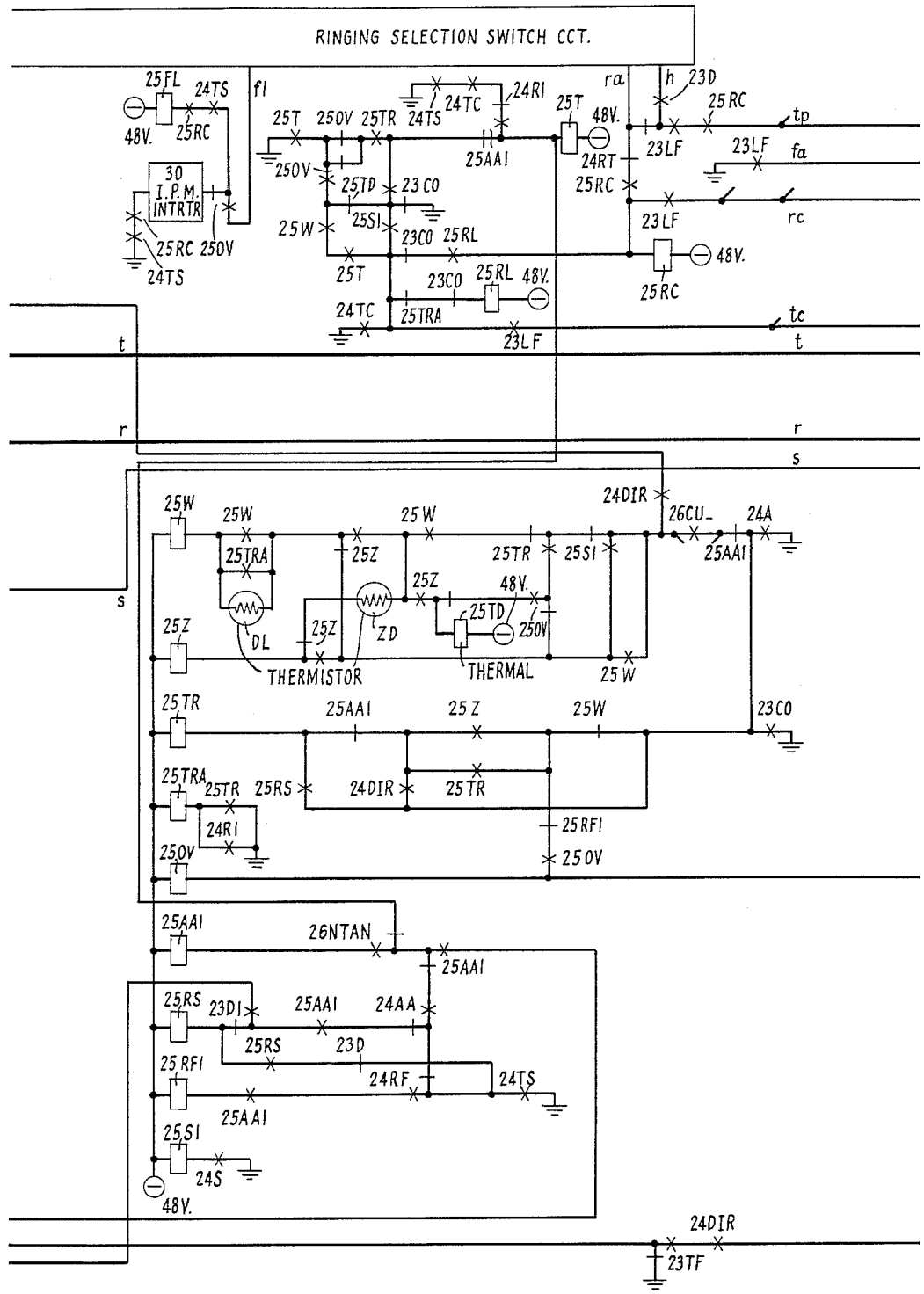

Relay 23LF operated at one of its make contacts in FIG. 25 grounds lead *fa* to the trunk link frame and frame connector circuit causing the trunk link frame to steer the ringing switch control leads *tp, rc,* and *tc* from the marker through the trunk link to this trunk and ringing selection switch. The marker then sets up a line-busy or overflow condition in the ringing selection switch. The ringing selection switch in response to the setting up of this condition applies tone to the *tn* lead (FIG. 24) which is continued over capacitor A and back contact 25AA1 to the grounded side of the winding of the 24A relay, thereby allowing tone to be transmitted to the calling party at the remote office informing him that some condition exists which prevents the connection from being established. The marker in response to ringing combination information obtained from the number group grounds appropriate ones of the aforementioned leads to the ringing selection switch circuit and applies ground over the *rc* lead via the trunk link circuit to operate trunk relay 25RC. Trunk relay 25RC operates and connects the *tp* lead to operate the ringing selection switch holding magnet over make contacts 23LF, 23D, and the *h* lead of the ringing selection switch circuit. As determined by the particular ringing combination set in the ringing switch, ground will be selectively returned over lead *tc* to operate trunk relay 24TC. Ground will not be returned if the called line is a free number line, busy, or if an overflow condition exists.

In addition to the foregoing, for predetermined ringing combinations set therein by the marker the ringing switch will return (over the *dir* lead, FIG. 24) the ground provided to it by the incoming trunk on lead *g*. For the purposes of illustration, it may be assumed that *ce* ringing combination which will return ground on lead *dir* is ringing combination 4. When ringing combination 4 is set the connections internal to the ringing selection switch that are established are different than for other ringing combinations in that the ringing switch crosspoints (not shown) for the level corresponding to ringing combination 4 are not connected to the ringing generator but are instead left open.

When the line link frame appearance of a customer group station is seized by the marker and the class of service obtained therefrom is entered in the incoming trunk's class of service registering relays, a ground operating path is provided over one of the contacts of the trunk 26CT- relays to the winding of relay 26NTAN. Relay 26NTAN operates and inserts the E and F resistance–25S1 contact–24RF relay bridge in circuit with the winding of the 24AA relay that will be across the tip and ring conductors at the line link frame appearance of the incoming trunk when relay 24TS is operated.

In addition, relay 26NTAN operated opens a possible holding ground path from back contact 23TF (FIG. 25), back contact 26NTAN, make contacts 23CO, TS, and back contact 26NTAN to the sleeve terminal of the line link appearance of this incoming trunk. Relay 26NTAN operated at one of its make contacts (FIG. 24) also renders available to the marker over the *cdn* lead (FIG. 26) the locking ground applied to the winding of the 24DIR relay.

Relay 26NTAN will, of course, not be operated when the incoming trunk is required to establish a local connection to a non-customer group station and in this event, the line link frame appearance of the incoming trunk is not used. On the other hand, relay 26NTAN also will be non-operated when a tandem outgoing type call is being made (marker relays 11TOG1, 2 operated). The line link frame appearance of the incoming trunk (which will be used for the extension of a connection to an outgoing trunk) is therefore rendered free of the aforementioned supervisory circuits by the normal contact (FIG. 24) of relay 26NTAN.

If the marker, upon seizing the called line link frame, determines that the called number corresponds to a customer group line, operation of the marker 21RDI relay causes the class of service obtained from the called line equipment location to be registered on relays 26CU0, 1, 2, 4, 7 and 26CT0, 1, 2, 4, 7 in the incoming trunk on a two-out-of-five basis. Thereafter the operating path prepared to the winding of relay 25RC over make contact 23LF is energized by the marker via the trunk link circuit causing relay 25RC to operate. Relay 25RC operated transfers the tip and ring of the incoming trunk's trunk link frame appearance to the ringing selection switch (FIG. 25). When the ringing combination is registered in the ringing switch, it applies ground to lead *ra* (FIG. 25), which ground is continued over back contact 24RT and make contacts 25RC and 23LF to lead *rc*, informing the marker that the ringing selection switch circuit has been set. Relay 24TC operating grounds the *tc* lead to the marker via the trunk link circuit to inform the marker that the charging information has been obtained from the ringing selection switch. The marker in response to the foregoing check signals allows ringing current to be applied through the ringing selection switch and the incoming trunk circuit to the called line.

Relay 24RT (FIG. 24) is the ringing trip relay and operates in series with the tip and ring in response to ringing current when the called subscriber answers. Relay 24RT operated at one of its break contacts in FIG. 25 releases relay 25RC and relay 25RC released, at one of its set of back contacts in FIG. 24, connects the winding of relay 24S to the tip and ring of the called line. Relay 25RC released, in restoring the *t* and *r* leads to the winding of the 24S relay, opens the operating path for relay 24RT which restores to normal. Relay 24S operated applies an additional ground (FIG. 24) to maintain the linkage from the trunk link frame appearance of the incoming trunk to the called line, the holding ground being applied over make contact 24S, back contact 25RC, back contact 25RF1, and the A resistor to the sleeve. Relay 24S operates relay 25S1 over whose make contact (FIG. 25) a ground, made available over a make contact of relay 24TC is applied to operate trunk relay 25T. The path may be traced over make contacts 25S and 23C0 and back contact 25AA1 to the winding of relay 25T. Relay 25T operated reverses, at its contact in FIG. 24, the battery and ground provided over the winding of the 24A relay to the distant station indicating that charging is to commence on the call.

(b) *Transfer call.*—If a class of service has been registered on relays 26CT- and 25CU-, the circuit is primed to respond to switchhook flashing. When the first off-hook condition was established by the customer group station in answering the call, relay 25S1 was operated by relay 24S. An operating ground made available in FIG. 25 over make contacts 24A (or 23C0), normal contact 25AA1, and a make contact of one of the 26CU relays is continued over a make contact of relay 25S1 and a back contact of relay 25Z to the DL thermistor which allows relay 25W to operate after a suitable delay such that any inadvertent jitter of the switchhook occasioned by answering the call would have passed. When the customer group station thereafter flashes his switchhook to initiate a call transfer, the first on-hook condition releases relay 24S which releases relay 25S1. Relay 25S1 released (with relay 25W operated and relays 25Z and 25TR normal) extends the above-mentioned operating ground to the winding of relay 25Z in series with the ZD thermistor causing relay 25Z to operate after a delay of approximately one-half second. The one-half second delay is considered sufficient to prevent the operation of relay 25Z by any inadvertent on-hook signal generated, for example, during the manipulation of a hold key at the customer group station.

Relay 25Z operated, with relay 25W operated, extends the aforementioned operating ground to thermal relay TD, which after a suitable delay such as two to five seconds, would open-circuit auxiliary holding path for relay 25T provided by make contacts 25W, 25T and back contact TD across the previously released make contact of relay 25S1. The period of two to five seconds is considered sufficient to distinguish between a switchhook flash for transfer and a permanent on-hook condition signifying a disconnect.

Assuming that the switchhook is released before thermal relay TD so operates, relay 25T remains operated and the 25S1 relay in reoperating removes the ground from the winding of the 25W relay causing it to release. Relay 25Z remains operated during the continuance of the transfer condition until the attendant has answered the call. Relay 25Z operated (with relay 25W normal) completes an operating path in FIG. 25 from ground, contacts 24A or 23C0, and back contact 25AA1 to operate relay 25TR which in turn operates relay 25TRA. Relay 25TR operated at one of its make contacts forms a bridge including a back contact of relay 25OV across the transfer contacts of relay 25S1 so that subsequent switchhook flashing (relay 25S1 released) will not effect the release of relay 25Z unless relay 25OV has operated.

Relay 25TR operated at one of its back contacts in

Figure 23:
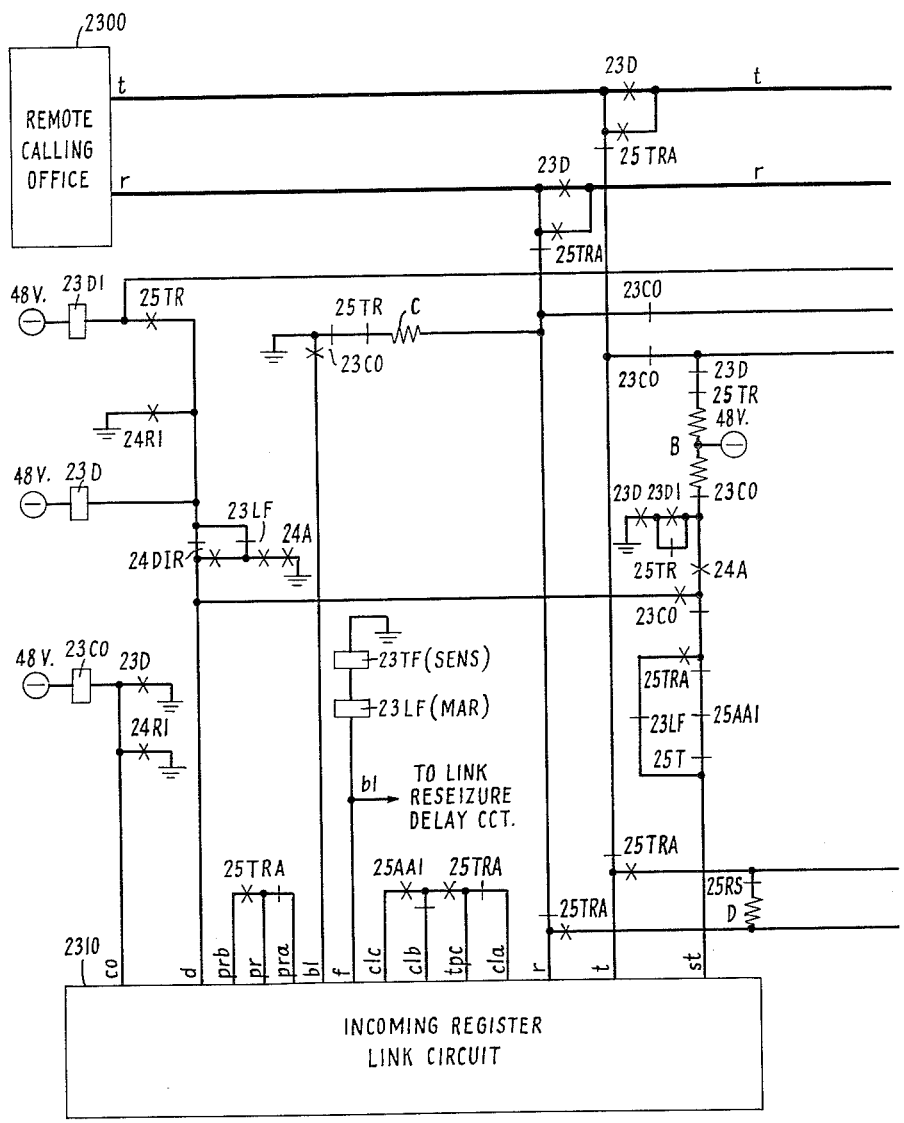
FIGS. 23 through 26 show the incoming trunk circuit in relation to the ringing selection switch and incoming register link circuits.

FIG. 23 opens the locking ground for relay 23D. Relay 23D, in releasing, removes ground from lead g thereby releasing the ringing selection switch hold magnet. Relay 25TRA operated provides an alternate path in FIG. 23 around the now opened contacts of relay 23D to maintain relay 24A connected to the tip and ring towards the distant office 2300. Relay 25TR operated at one of its make contacts in FIG. 25 also provides a supplemental holding path (and make contact 25T, back contact 25OV, make contact 25TR, back contact 25AA1) to the winding of relay 25T to maintain this relay operated after relay 25S1 is released when the transferring station is satisfied that the call is in the process of being transferred and restores his receiver on-hook. Relay 25TR operated at one of its make contacts in FIG. 24 also provides a supplemental holding path for relay 24TC after relay 23D has been released. Relay 24TR also prepares an operating path in series with operated make contact 26NTAN from the s lead of the line link frame appearance (FIG. 24) of the incoming trunk to the winding of relay 24TS. Relay 25TR operated also provides a supplemental holding ground (FIG. 24) in series with back contact 25RF1 to the sleeve lead of the incoming trunk's trunk link frame appearance. Relay 25TRA operated provides an auxiliary locking ground (FIG. 26) for the 26CT– and 26CU– relays. Relay 25TRA operated as its transfer contacts in FIG. 23 applies the D resistance bridge across the t and r leads to the incoming register link circuit 2310. Relay 25TRA operated also completes a path for the application of resistance battery to the start lead "st" of the incoming register link. This path may be traced in FIG. 23 from battery back contact 23C0 (relay 23C0 having been restored to normal by the release of relay 23D) make contact 24A, back contact 23C0, make contact 25TRA, back contact 23LF. (Relays 23LF and 23TF were restored to normal during the incoming call when the marker, after receiving ground on leads rc and tc released the incoming register link thereby removing marker battery from the f lead.)

Relay 25TRA also transfers the ground (FIG. 23) appearing on class lead tpc to lead clb to indicate to incoming register that this is a transfer class call and that the register should immediately (i.e., without waiting for the receipt of digit signals) seize a marker upon verifying that the trunk number has been received from the incoming register link. At the same time contacts of the incoming trunk relay 25TRA will transfer the ground appearing on the pr lead to the prb lead to the incoming register link which ground will cause the link to seize a multifrequency incoming register that is compatible with the type of signaling set used by the customer group attendants. The selected incoming register upon being furnished the indicated (transfer) class information will immediately seize a marker and operate marker relays 14TCB and 14TSC0. The selected incoming register causes the link to re-operate relays 23C0 and 23D. Trunk relay 23D1 is thereupon operated over the path completed by a make contact of relay 25TR.

Figure 32:
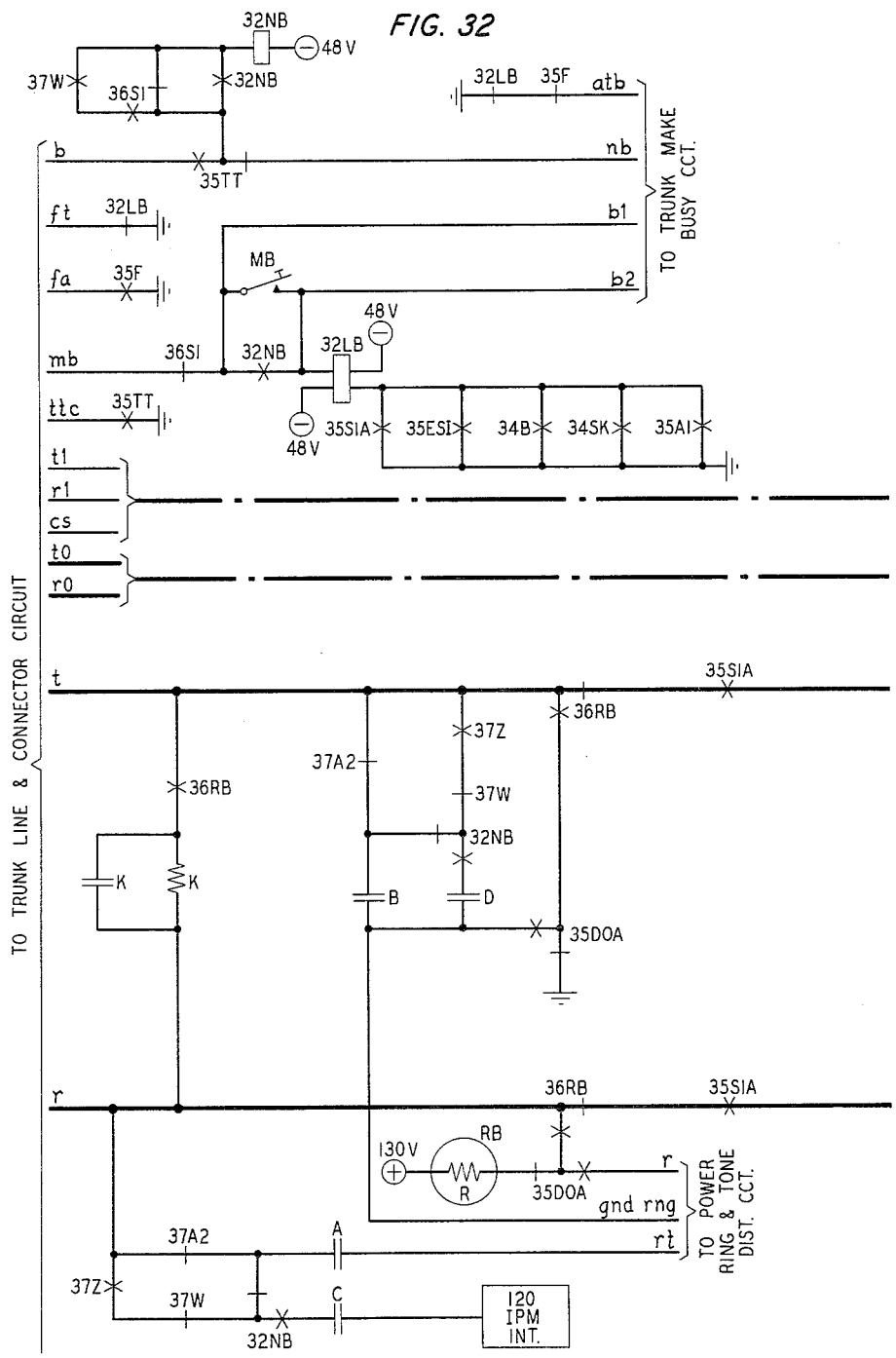
FIGS. 32 through 37 show the attendant trunk circuit.
Figure 33:
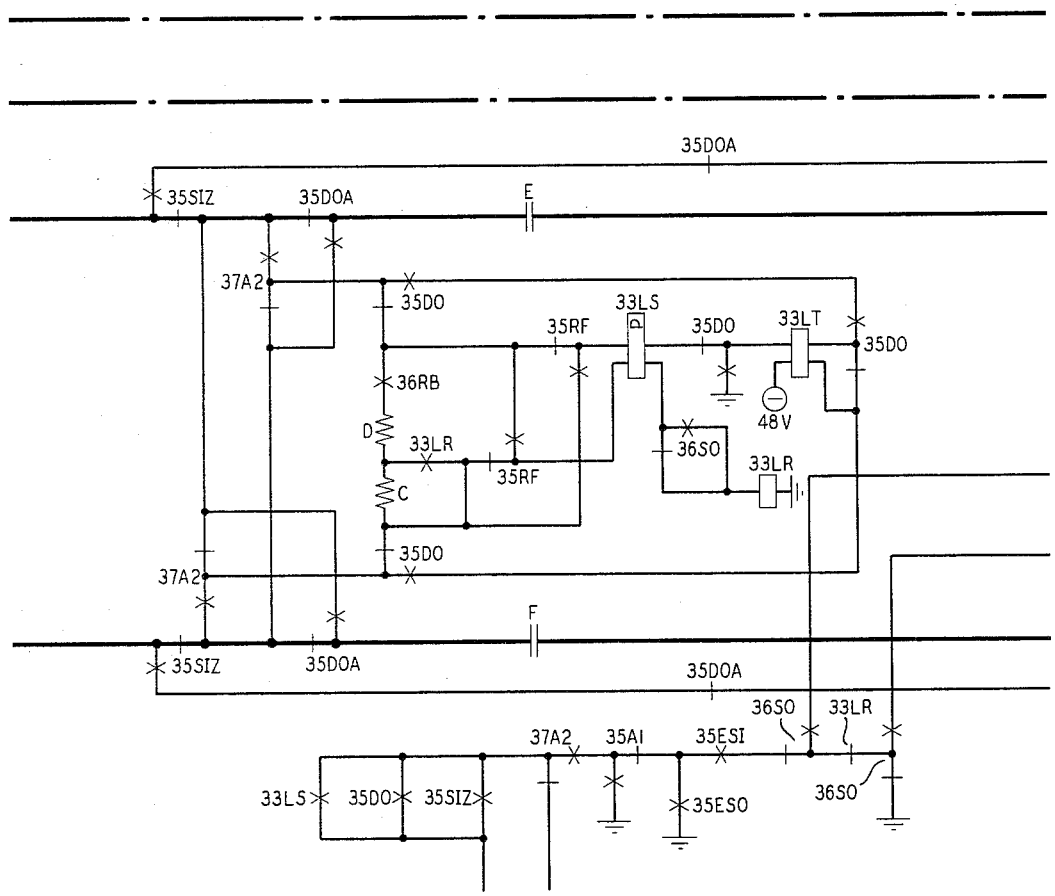

Relays 14TCB and 14TSC0 in the marker operate relay 14TRF which causes positive 130 volt high resistance battery to be applied by the marker to the f lead via the incoming register link. The high resistance battery operates only relay 23TF. The class of service stored on the 26CT– and 26CU– relays is registered in the corresponding relays 6CT and 6CUA of the marker over the leads through the trunk link frame and frame connector. In response to the foregoing, the marker selects a switch route to the group of attendant trunks serving the customer group of lines whose class of service has been transferred to the marker from the incoming trunk. The marker establishes a communications linkage from the line link frame appearance (FIG. 24) of the incoming trunk to the trunk link frame appearance (FIG. 32) of an idle trunk in the selected group of attendant trunks. The marker in so doing operates incoming trunk relay 24TS by applying ground to the sleeve of the linkage which ground is thereafter maintained by the attendant trunk. Relay 24TS operates and connects signaling relays 24AA and 24RF across the tip and ring of the incoming trunk's line link frame appearance (FIG. 24) to the supervisory relay 33LR, 33LT, and 33LS of the attendant trunk. Relay 25S1, which remains operated during the off-hook condition of the transferring station, at one of its make contacts (FIG. 25) connects together the windings of trunk relays 24AA and 24RF in series with make contact 26NTAN and short-circuits resistors E and F.

If in the meantime the transferring station had restored his telephone to the on-hook condition, relay 24S would release, releasing relay 25S1, which in turn would place resistors E and F in series with the windings of relays 24AA and 24RF. The high resistance thus placed across the t and r leads releases relays in the attendant trunk which signal the attendant that she is connected only with the calling party at the remote office 2300 and that the transferring station is on-hook.

The attendant trunk when seized by the low resistance 24AA–24RF calling bridge, applies ringing tone to the incoming trunk which is heard both by the calling party at the remote office and by the transferring customer group extension. Relay 24TS operated also prepares a path to lock the 25T relay once the attendant has answered. Relay 24TS in operating also extends the tip and ring leads of the line link frame appearance (FIG. 24) of the incoming trunk, via make contacts of relay 25S1, to the tip and ring associated with the trunk link frame appearance of the incoming trunk. Relay 24TS in operating renders an operating ground available over one of its make contacts in FIG. 25 to the transfer contacts of relays 24RF and 24AA. This operating ground may thereafter be extended to operate any of relays 25AA1, 25RS, or 25RF1.

When the attendant has answered the transfer call, the attendant trunk reverses battery and ground to the 24AA–25S1–24RF calling bridge operating relay 24AA. Relay 24AA operated operates relay 25AA1 over the path from ground, (FIG. 25) make contact 24TS, back contact 24RF, make contact 24AA, and back contact 25AA1 to the winding of relay 25AA1 (relay 24RF having released in response to the reverse battery signal received from the attendant trunk). Relay 25AA1 operates and locks to the ground appearing on the sleeve of the communications linkage to the attendant trunk. Incident to the receipt of reverse battery from the attendant trunk, incoming trunk relays 24TR, 25TRA, and 23DI are released.

(c) *Attendant completed call.*—When the attendant after conversing with the transferring station and/or the party at the remote office has obtained sufficient information to enable her to key the number of the new station, she operates a release-forward key at her console which restores the idle battery and ground potentials to the t and r leads of the incoming trunk. This causes the relay 24AA to release and relay 24RF to operate, which in turn operates relay 25RF1. Relay 25RF1 in operating at its back contact removes holding ground from the sleeve of the incoming trunk's trunk link frame appearance (FIG. 25) which causes the communications linkage between the trunk link appearance of the incoming trunk and the line link appearance of the transferring station to be released. After the attendant releases the release-forward key, she will depress a start-in key at her console which removes the supervisory relays in the attendant trunk from the tip and ring leads toward the incoming trunk to provide a clear pulsing path. The removal of the attendant trunk supervisory relays from the tip and ring lead causes relay 24RF to release. Relay 24RF released operates relay 25RS over the path from ground (FIG. 25), make contact 24TS, back contact 24RF, back contact 24AA, make contact 25AA1, and back contact 23D1 to the winding of the relay 25RS.

Relay 25RS in operating completes a path from ground and make contact 23C0 to operate relay 25TR. Relay 25TR operated initiates a register seizure sequence (previously described) involving the application of battery to the *st* lead in FIG. 23. However, this time ground from the incoming register link on the lead *tpc* is forwarded over a make contact of relay 25TRA and a make contact of relay 25AA1 back to the register link over lead *clc*. Ground on lead *clc* operates class relays in the selected incoming register which causes the register to operate relays 14TCB and 14TSC5 in the marker. These in turn operate marker relay 14ATT signifying an attendant key-back call. Relay 25TR also operates relay 25TRA whose transfer contacts switch ground from the incoming register *pr* lead to the incoming register *prb* lead causing the multifrequency incoming register to be seized. Relay 25RS in operating connects the tip and ring at the line link frame appearance of the incoming trunk to the incoming register and disconnects these leads from the transmission path to the remote office 2300 so that any tones pulsed by the attendant into the incoming register cannot be heard at office 2300.

If for any reason a register is not available within a reasonable time, the attendant may cancel the register request signal initiated by the incoming trunk by operating END key at her console before key-pulsing any digits. Under these circumstances a positive 130 volt potential is applied to the ring and ground to the tip lead by the attendent trunk which causes the tube R (FIG. 24) in the incoming trunk to conduct and operate relay 24R1. Relay 24R1 in operating at its make contacts in FIG. 23 applies operating ground to relays 23D, 23D1, and 23C0. Relay 23D at its break contact in FIG. 25 releases relay 25RS. Relay 25RS in releasing, releases the relays 25TR and 25TRA, which in turn removes battery from the *st* lead to the incoming register. Relay 25RS released transfers the tip and ring leads at the line link frame appearance of the incoming trunk from the incoming register link to the tip and ring leads associated with the remote office 2300.

Upon receipt of an incoming register seizure, i.e., relay 23C0 operated, the incoming register will apply battery and ground to the tip and ring leads which are continued over make contacts 24TRA (FIG. 23) and 25RS (FIG. 24) via the line link frame appearance of the incoming trunk to the attendant trunk operating a polar relay therein which lights a ready lamp at the attendant's console. Upon recognition of this signal the attendant will key-back the number of the extension to which the call is to be transferred and then depress the END key at the console. Operation of the END key restores supervisory relays in the attendant trunk to their location between the *t* and *r* leads. The incoming trunk responds to the presence of these supervisory relays by reoperating the relay 24AA.

The completing marker seized by the incoming register effects a connection established between the trunk link appearance of the incoming trunk and the line link appearance of the called station, as previously described. When the ringing selection switch connection is established and relay 25RC operates, an operating ground is applied over contacts 24TS and 25RC (FIG. 25) to the 30 IPM interrupter circuit which in turn operates relay 25FL. Relay 25FL operated at its make contact in FIG. 24 applies ground to the midpoint of the E and F resistive bridge between the 24AA and 24RF relays causing the 33LT relay of the attendant trunk to operate in unison with the ground pulse applied by the 25FL relay. This relay in the attendant trunk operates a flashing lamp at the attendant console notifying the attendant that the line is ringing.

When the called party answers, relay 25RC will release, as previously described, allowing the relay 24S to operate over the answering station loop. Relay 24S operates relay 25S1. Relay 25S1 in operating short-circuits the E and F resistive bridge applied between the 24AA and 24RF relays allowing the 33LR relay in the attendant trunk to operate. Unless the attendant depresses a hold key, the operation of the 33LR relay in the attendant trunk will remove ground from the sleeve lead of the connection between the incoming trunk and the attendant trunk, thereby releasing this linkage.

In the event that the attendant has called a busy station, the marker in establishing this connection will recognize this condition when it establishes the line-busy condition on the ringing selection switch connection and will also apply a ground over the *ov* lead through the trunk link connector circuit to operate the relay 25OV in the incoming trunk. Relay 25OV in operating, at its transfer contacts, switches the winding of the relay 25FL from the 30 IPM circuit to the *fl* lead of the ringing selection switch. Relay 25OV in operating at its back contacts in FIG. 24 isolates the calling office 2300 transmission path from the trunk link frame appearance of the incoming trunk so that this tone may not be transmitted back to remote calling office 2300. Under these conditions the attendant would be required to operate her release-forward key to remove the tone and re-establish the transmission path.

(d) *Attendant signaling of toll operator.*—In the event that the incoming call was originated by a toll operator and the called station requires the toll operator's assistance, the called station will flash in the switchhook causing a transfer to the called station's attendant, as just described. When the attendant is connected she may, by operating the ring key at the console, cause the attendant trunk to apply positive 130 volt battery to the ring and ground to the tip lead thereby operating relay 24R1 in the incoming trunk via tube R. Relay 24R1 operates and releases in step with the operation and release of the ring key, while relay 25T is released and operated in step with the operation and release of the relay 24R1. Relay 25T released at its transfer contacts (FIG. 24) restores the on-hook battery and ground polarity provided over the winding of the relay 24A to the trunk incoming from the toll operator notifying the toll operator that she is required on the call.

(e) *All attendant trunks busy.*—When a transfer is attempted at a time when all the attendant trunks for a customer group are busy or when all trunks have been deliberately made busy, for example, in the case of night closing, the marker upon recognizing this condition (marker relay TBTA, not shown, operated) will operate marker relay 17OV or marker relay 17BY. Either of these relays operated extends an operating ground to the winding of relay 22OVK and 25OV over a back contact of relay 21CDN, resistor *or,* make contact 14TRF1 through the winding of marker relay 22OVK to the winding of incoming trunk relay 25OV. Incoming trunk relay 25OV operates and at its make contact applies a ground in series with back contact 25RC to the *st* lead of the ringing selection switch (FIG. 24). The *st* lead of ringing selection switch so grounded causes the return of 120 IPM tone on the lead *oft*. The 120 IPM tone is continued over a make contact of relay 25OV and capacitor B and a make contact of relay 25Z to the tip lead of the trunk and to the station attempting the transfer. This tone cannot be heard by the calling party at remote central office 2300 because the break contacts of the relay 25OV interrupt this transmission path. The transferring station upon recognizing the 120 IPM tone may reflash his switchhook. The reflashing of the switchhook releases relay 25Z and reoperates relay 25W, thereby releasing relays 25TR, 25TRA, and 23D1, restoring the transfer initiating circuits of the trunk to normal.

If the transferring station should disconnect after having initiated a switchhook transfer and relay 25OV has operated as described above, incoming trunk relay 25T will release because its locking path is broken by relay 25OV and the release of relay 25S1 precluded the application of the operating ground available over the make contact of relay 24TC.

(f) *Directory number call.*—If the calling party has dialed the listed directory number of a customer group served by the central office under consideration, the ringing combination returned to the marker by the number group informs the marker that no linkage is to be set to the equipment location furnished by the number group. The marker sets up the ringing combination indicated by the number group, (which in the illustrative example may be assumed to be any of ringing combinations 4, 5, or 14) and the ringing selection switch at its cross points (not shown) corresponding to any of these ringing combinations returns a ground on lead *dir* (FIG. 24) to the incoming trunk. The ringing switch is wired so that the ringing generator which is normally connected to all levels of the ringing switch is not connected to levels 4, 5, and 14. Lead *dir* grounded operates relay 24DIR over a back contact of relay 25TRA. Relay 24DIR operated locks to the ground provided over one of the contacts (FIG. 25) of relays 26CU– and at another of its make contacts in FIG. 25 extends the ground provided over make contacts 24A or 23C0 to the winding of relay 25TR in series with a back contact of relay 25AA1. Relay 25TR operates, as described above, to initiate the transfer sequence. In addition, relay 25TRA, operated by relay 25TR, extends the locking ground at the winding of relay 24DIR to the *cdn* lead, thereby informing the marker that transfer has been initiated. The marker in response thereto releases from the call. The incoming trunk then functions as described above for the transfer call except that the marker in releasing removes resistance battery from the *f* lead causing relays 23LF and 23TF to release. Relay 23D is released and in turn releases the ringing selection switch by removing ground from lead *g*. In addition, when obtaining the class of service information from the 26CT– and 26CU– relays of the trunk the marker also receives the aforementioned ground on the *cdn* lead. When relay 14TRF in the marker has been operated by the incoming register furnishing the marker trunk operating class "0," ground on the *cdn* lead (when the class of service is read out of the incoming trunk) indicates to the marker that the marker should operate a directory number class relay in the selected customer group attendant trunk. In the marker, trunk service class relay 14TSC0 was operated by the incoming register seized on a transfer call. The incoming register grounded the lead for operating relay 14TSC0 in response to the class relay in the incoming register that was selected by the ground from the incoming trunk on lead *clb*.

In the event that all the attendant trunks were found to be busy by the marker, the ground provided by marker relays 17OV or 17BY is disconnected from the *ov* lead by the off-normal contact of relay 21CDN.

III. *Intra-office trunk circuit*

Figure 29:
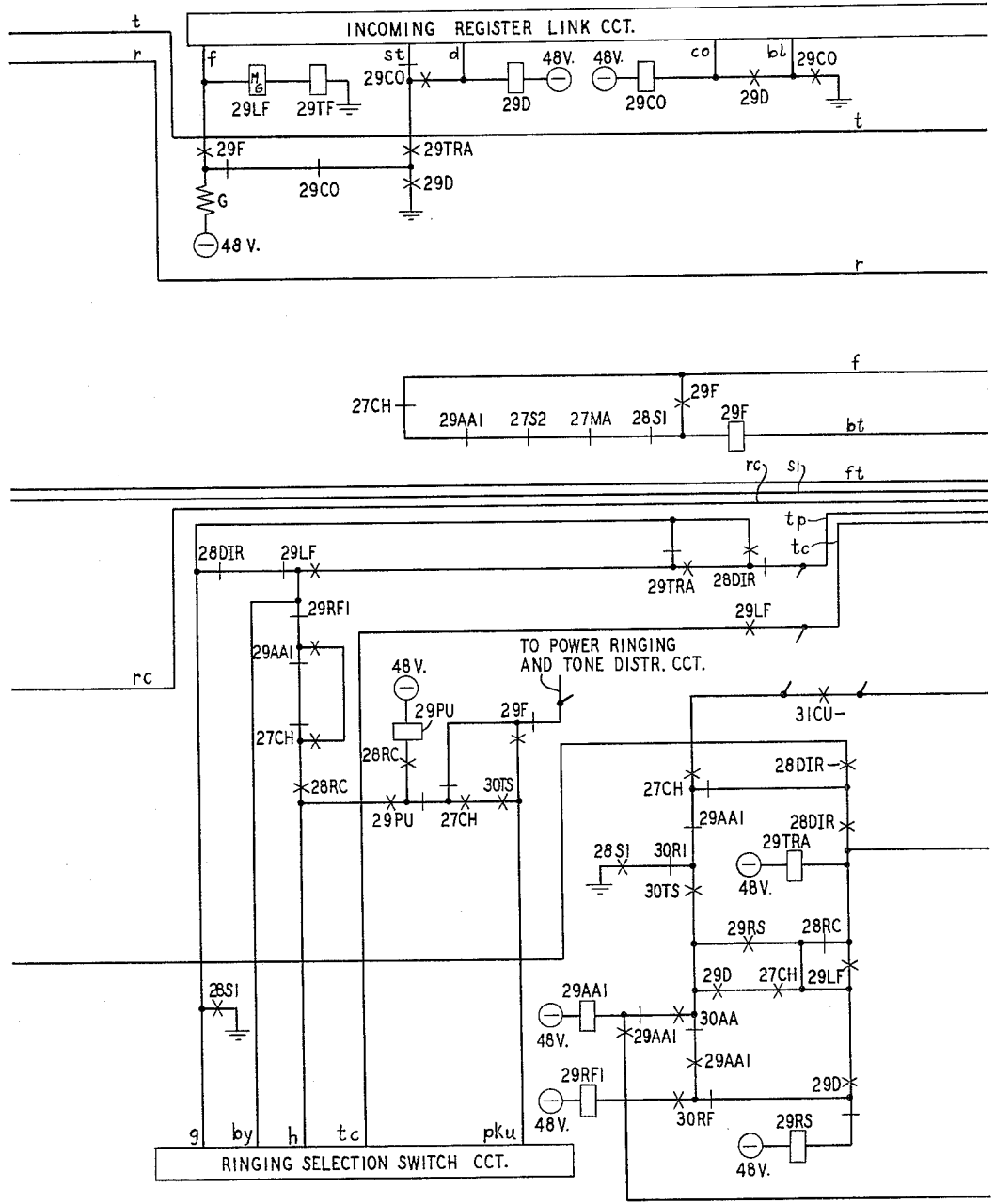
Figure 30:
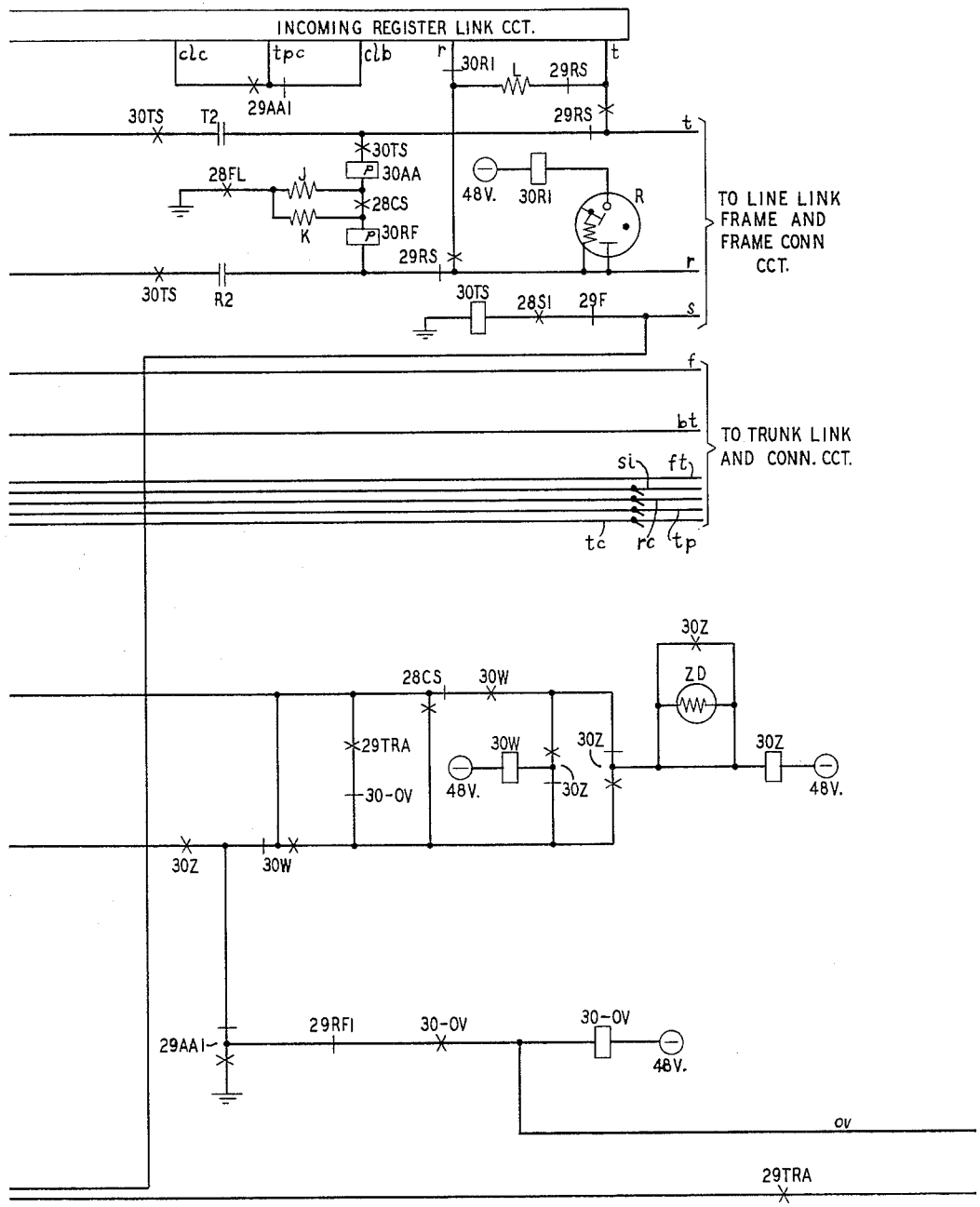
Figure 31:
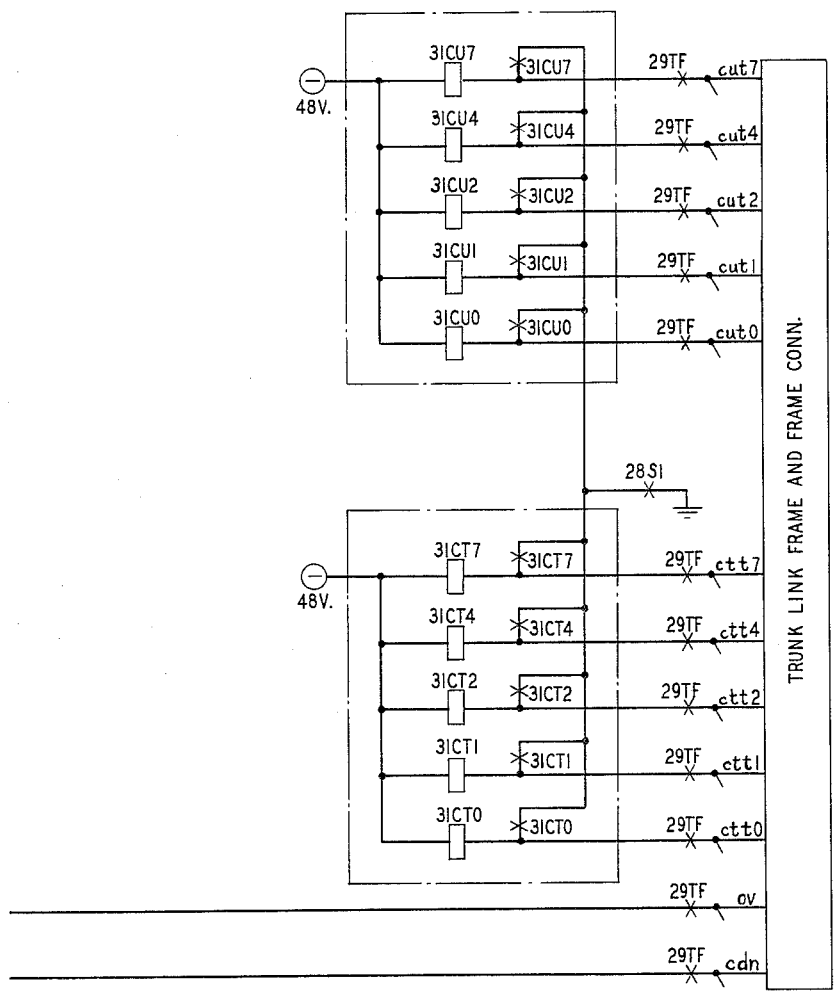

When this trunk is seized by the marker, relay 29F is operated from the marker via the trunk link and connector circuits over leads *f* and *bt* (FIG. 29). Relay 29F operated grounds the *fa* lead of the trunk link appearance (FIG. 27) of the intra-office trunk associated with the calling end of the connection. Relay 29F operated also applies resistance battery to operate both relays 29LF and 29TF. Relay 29LF operated grounds the *fa* lead of the trunk link frame appearance (FIG. 28) of the intra-office trunk associated with the called end of the connection. At this point it should be observed that the *fa* lead (FIG. 27) associated with the calling end of the connection is marked by the operation of the 29F relay directly, whereas the *fa* lead (FIG. 28) associated with the called end of the connection, which end may thereafter be used for the connection thereto of a transferred-to station, is marked by the operation of the relay 29LF. Accordingly, distinction is made between the two appearances of the intra-office trunk on the trunk line frame.

After the aforementioned intra-office trunk relays have operated, connections are established for the intra-office call, as described in the above-mentioned Patent 2,585,904 to A. J. Busch. If the called station is a station of a customer group, the class of service of the called station is registered on the 31CU0, 1, 2, 4, 7 and 31CT0, 1, 2, 4, 7 relays of the intra-office trunk. In the event that the called line was busy the marker, in the manner described in the above-mentioned Busch patent, would advance, drop the intra-office trunk and connect the calling line to a tone trunk.

If a call was made on an intra-office basis to a customer group directory number, the ringing selection switch would ground the *dir* lead (FIG. 28) in response to the operation of the ringing switch cross-points for the ringing combination associated with the directory number calls and operate relay 28DIR in the intra-office trunk. Relay 28DIR operated operates relay 29TRA from the ground provided by the ringing selection switch and locks relay 29TRA over the path to ground including contacts make 28DIR, back contacts 27CH, 29AA1, 30R1 and make contact 28S1. Relay 29TRA operated extends the ground applied to the winding of the 28DIR relay to lead *cdn* operating the 21CDN relay in the marker. Operation of marker relay 21CDN informs the marker not to establish any forward linkage from the line link frame appearance of the listed number to the called appearance of the intra-office trunk on the trunk link frame. The marker, nevertheless, advances to establish the call-back linkage from the calling appearance (FIG. 27) of the intra-office trunk on the trunk link frame to the calling line. Relay 27S operates at the calling appearance of the intra-office trunk. Relay 27S operates and remains operated as long as the calling party remains off-hook.

As soon as the call-back linkage is established the marker releases from the call releasing relay 29F. Relay 29F released applies resistance battery over its back contact to the start lead *st* of the incoming register, link FIG. 29, over the path including the back contacts of relay 29C0 and the make contact of relay 29TRA. With the selection of the incoming register, ground provided by the incoming register link on lead *tpc* (FIG. 30) is returned over back contact 29AA1 to lead *clb*, enabling the selected incoming register to register a class indicating that the register should call in a marker without waiting for pulses. The register when attached grounds the *co* lead through the incoming register link, operating relay 29C0 which returns ground to the register on lead *bl*. The register in response to the receipt of the no-pulsing class signal grounds lead *d* (FIG. 29) to operate intra-office trunk relay 29D. Relay 29D operates and locks in series with the make contacts of relays 29C0, 29TRA, and 29D to ground. When the marker seizes the intra-office trunk on this seizure, high resistance battery is applied to the *f* (FIG. 29) lead by the marker through the incoming register link operating only relay 29TF. Relay 29TF operated enables the marker to read out the class of service stored in the 31CU– and 31CT– relays. The marker then establishes the communications linkage from the line link frame appearance of the intra-office trunk to the appropriate attendant trunk, as described above in connection with the description of the operation of the incoming trunk on transfer calls. When the marker has established this linkage it releases from the call, releasing the 29TF relay and the incoming register link, relays 29D and 29C0 remaining locked until the 29TRA relay is released by the operation of relay 29AA1 when the attendant answers. Relay 29AA1 operated also releases relay 28DIR.

Figure 27:
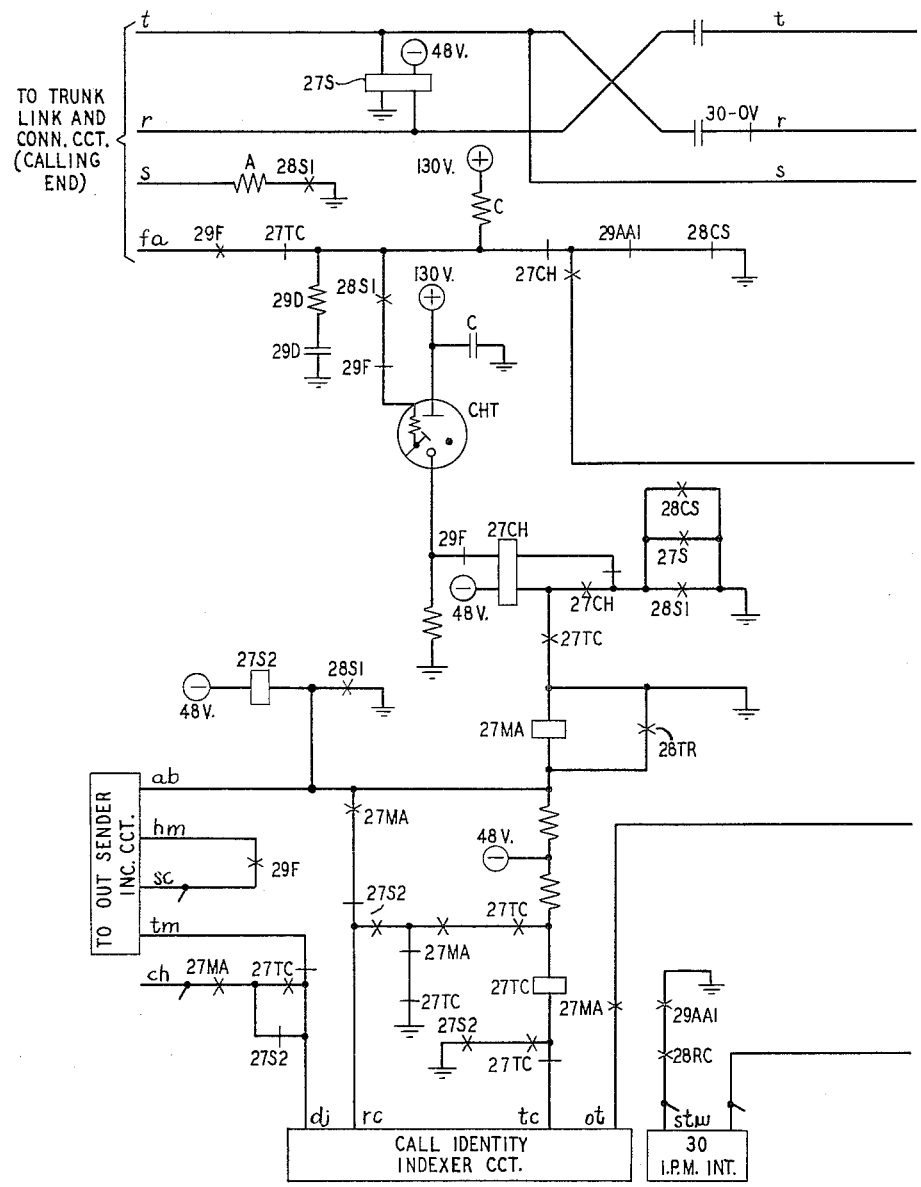
FIGS 27 through 31 show the intra-office trunk circuit in relation to the ringing selection switch and incoming register link circuits.
Figure 28:
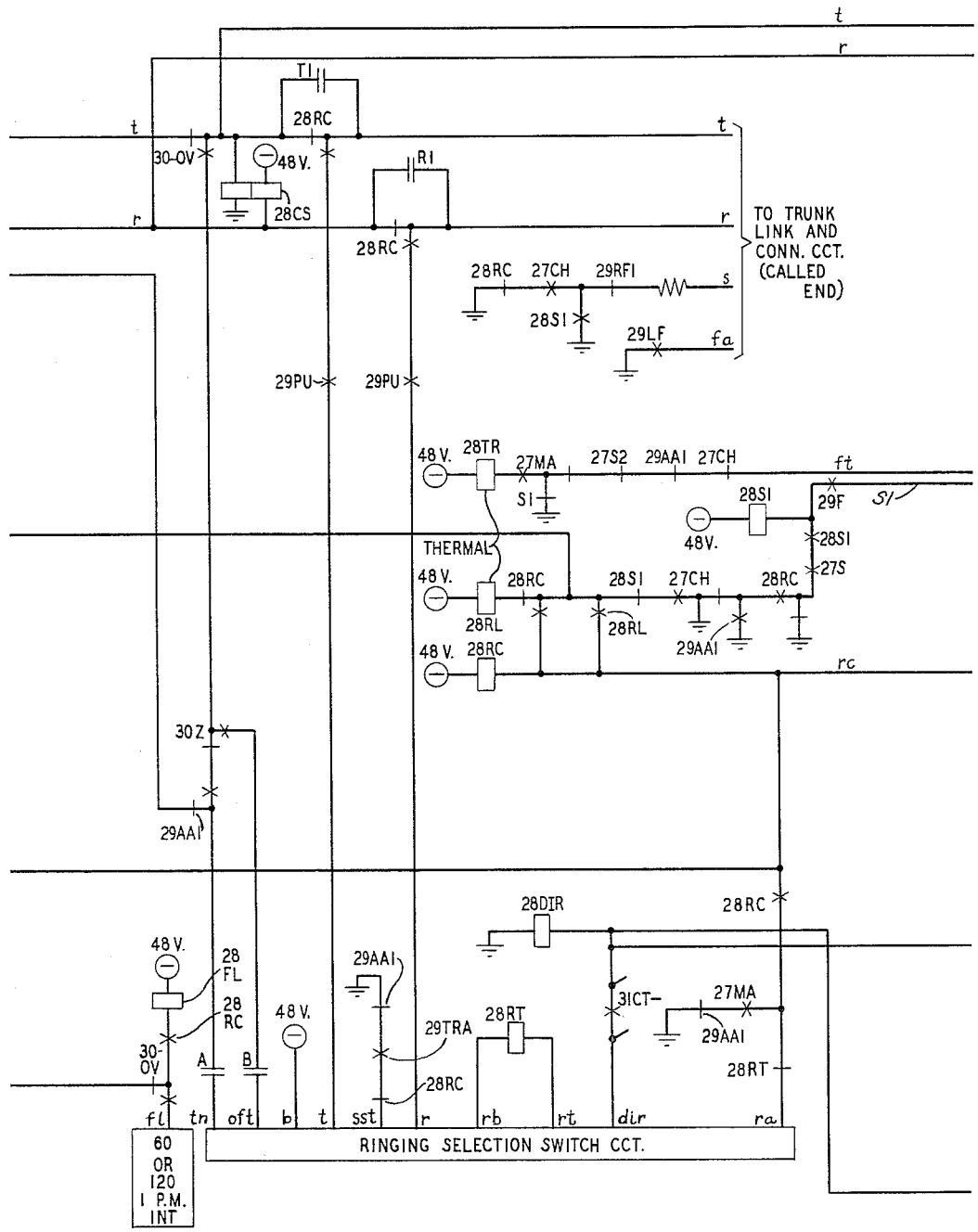

When the attendant answers she performs functions similar to that which she performed when her trunk was seized by a call routed to her via an incoming trunk with the exception that the charging condition is established somewhat differently. It will be recalled that in establishing the transfer condition to reach the attendant trunk on the directory number call no forward linkage was set from the called appearance on the trunk link frame of the intra-office trunk to the equipment location on the line link frame furnished by the number group. Since this linkage was not established no operating path was available for the charging relay 27CH. This path is completed only after the transfer condition has been established and the attendant has answered on a directory type call. When the attendant answers, relay 29AA1 operates at its off-normal contact removing the ground from resistor 27CH, allowing resistance battery to be applied through resistor CH, off-normal contact 28S1 and back contact 29F to the starting anode of the charging tube CHT (FIG. 27). Charging the tube CHT conducts and provides a current path from the positive 130 volt battery, anode and cathode of charging tube CHT, normal contact 29F, primary winding of relay 27CH, normal contact 27CH, and off-normal contact 27S to ground. Relay 27CH operates in response to the energization of its primary winding and locks to ground over its secondary winding in series with the 27S contact aforesaid. Relay 27CH operates and performs the usual charging functions. If all attendant trunks were busy when the marker attempted to establish the communications linkage to the attendant trunk, the marker would perform in similar fashion to that in which it operated when all attendant trunks were found to be busy on a listed call being handled by an incoming trunk, as described above. The ground provided by the intra-office trunk to the *g* lead (FIG. 29) of the ringing selection switch over the make contact of relay 28S1 is returned by the ringing selection switch over lead *by* and continued over back contacts 29RF1, 29AA1, 27CH, and off-normal make contact 28RC to the *h* lead of the ringing selection switch to maintain the ringing selection switch hold magnet operated. The hold magnet in the ringing selection switch is maintained so that busy or reorder tone will be returned to the calling line. Tone is applied over the *tn* lead, capacitor A, back contact 29AA1 to the primary winding of relay 27S. The winding of relay 27S operates as an autotransformer and applies the tone between the tip and ring toward the calling line.

The remaining operations of the intra-office on the transfer call and the subsequent attendant call are similar to those described for the incoming trunk with the following exceptions. In the incoming trunk when the incoming register is seized through the incoming register link, the incoming register operated relay 23C0 and operated relay 23D upon the completion of pulsing (or upon the receipt of a class signal having the same effect). In the incoming trunk, relays 23C0 and 23D remained operated even after the register had been released incident to the initial incoming call and to the establishment of the transfer call and the attendant completion call. In the intra-office trunk, however, relays 29C0 and 29D are released when the attendant has answered on a transfer or listed number call and these relays are released when ringing has been set on the attendant completion call. The 29C0 and 29D relays in the intra-office trunk may be released sooner than their counterparts in the incoming trunk because in the intra-office trunk these relays are employed merely to satisfy incoming register functions, whereas in the incoming trunk they are required in addition to provide supplemental off-normal functions.

IV. *Attendant trunk and loop, position and console circuits*

When the attendant trunk is seized by the marker through the trunk link frame and trunk link connector, relay 35F and relay 36SI are operated by the marker, as described in Busch 2,585,904, aforesaid. In addition, the marker operates relay 35ESI by applying ground to the *tp* lead which ground is made available in the marker over a make contact of relay 11TRF3, a back contact of relay 21CDN, and a back contact of relay 11TER2. Relay 35ESI in the attendant trunk indicates to the attendant trunk that it has been seized on a transfer type call. When relay 35ESI operates, it returns ground to the *tp* lead from a make contact of relay 35S1A over back contacts of relays 35RF and 35ES0 to the *tp* lead, locking relay 21TPK in the marker. Relay 21TPK so locked informs the marker that the class has been correctly registered in the trunk and the marker thereupon initiates a sequence of operations described in Busch culminating in the release of the relay 35F in the attendant trunk which enables the marker to release from the trunk link frame and trunk link connector. Audible ringing tone is applied to the tip and ring of the attendant trunk and can be heard both by the calling and called parties. The line link frame appearance of the incoming trunk includes at this time a calling bridge (relays 24RF and 24AA) across the tip and ring leads which operates relays 33LS, 33LT, and 33LR in the attendant trunk. Relay 36SI operated operates relay 35S1A, which in turn operates local busy relay 32LB. Relay 32LB operated removes ground from the *ft* lead to the trunk link and connector circuit (FIG. 32) and opens the operating path for relay 35F. The removal of ground from the *ft* lead removes one of the possible grounds for an FTC–relay (not shown) in the marker. All of the attendant trunks on a given trunk link frame, which attendant trunks are for the same customer group, supply ground to the same FTC–relay in the marker while they are idle. Accordingly, when all the attendant trunks for a given customer group, which trunks are on the same trunk link frame, are busy the FTC–relay in the marker for this customer group is released and the marker will have to look to another trunk link frame which has at least one idle trunk for this customer group. If all the FTC–relays in the marker associated with trunk link frames having attendant trunks for the same customer group are busy, a sequence of operations is initiated, as described in Busch, aforesaid, for the condition when all routes to a given destination are busy causing the marker to route advance.

When the marker route advances, ground is applied to the *ra* punching (FIG. 13) of the route relay associated with the group of attendant trunks for the customer group. For example, ground on the punching 13*ra*30 (FIG. 13) is continued over a cross-connection to the *pb* punching and lead *toa* to operate relay 11TOA over the path (in FIG. 11) including back contact 17RAV2 and a make contact of relay 11TRF3. Relay 11TOA operated at one of its contacts in FIG. 12 completes an operating ground (made available over back contact 17RAV2) to the winding of relay 12ROA, which operates. Relay 12ROA operated continues a ground in FIG. 11 made available by the incoming register marker connector to operate terminating class relays 11TER1, 2. Relay 11TER1 operated at one of its contacts in FIG. 17 completes an operating path to the winding fo relay 17OV which may be traced from ground, make contacts of relays 12ROA and 11TER1, and back contact of relay 17LB to the winding of relay 17OV.

Relay 17OV operated extends a ground (FIG. 22) over a back contact of relay 21CDN and 20 ohm resistor *or*, make contact 14TRF1 through the winding of relay 22OVK to the *ov* lead and through the trunk link connector circuit to operate either relay 30OV in the intra-office or relay 25OV in the incoming trunk which initiated the transfer call connections.

Assuming, however, that the illustrated trunk has been found to be idle and is seized, after the release of the relay 35F in the attendant trunk, relay 35SA is operated over the path including back contacts of relays 37W, 32NB, and 35F, make contact 35S1A, and back contact 35TT. Relay 35SA operated connects the winding of the 37GT relay to the *gt* lead of the call distribution circuit. The call distribution circuit will operate relay 37GT if there is an idle occupied position. A description of the call distribution circuit suitable for use in this connection appears in the copending applications of O. H. Williford, Serial No. 135,913, and V. J. Matthews, Serial No. 135,914, filed September 5, 1961, now Patents 3,180,941 and 3,180,942, respectively.

The call distribution circuit operates and connects the attendant trunk to an idle loop (FIGS. 40–44). Resistance battery applied by the attendant trunk operates a 40CT–relay in the selected loop circuit after the trunk finder and position finder cut through. The 40CT–relay operated operates a 40CT–relay in the selected loop. The 40CT1–relay operated extends a ground to the sc–lead (FIG. 40) over the path from ground, back contact 40DK–, back contact 40CT2–, and make contact 40CT1. Ground on the sc–lead is forwarded over a path through the trunk finder and position finder to operate relay 34SK in the attendant trunk. Relay 34SK operated releases relay 37GT. Relay 40CT1–operated opens the ground operating path for relay 45PA which releases, rendering the position unavailable to the call distribution circuit. 40CT1–back contacts for each of the loop circuits associated with a position form a chain so that the selection of any thereof by the trunk finder and position finder renders the position unavailable. Relay 40CT1–operated operates relay 41AS which applies an audible signal to the attendant console. Relay 45PA released operates relay 45LB. Relay 45LB will also be operated in the event that all loops associated with the attendant position are busy in which case a ground is applied over make contacts of the 40CT–relays associated with each of the busy loops to the winding of relay 45LB. Relay 45LB operated furnishes a signal to the call distribution circuit informing it that the position is busy, as described in Williford and Matthews, aforesaid.

Figure 34:
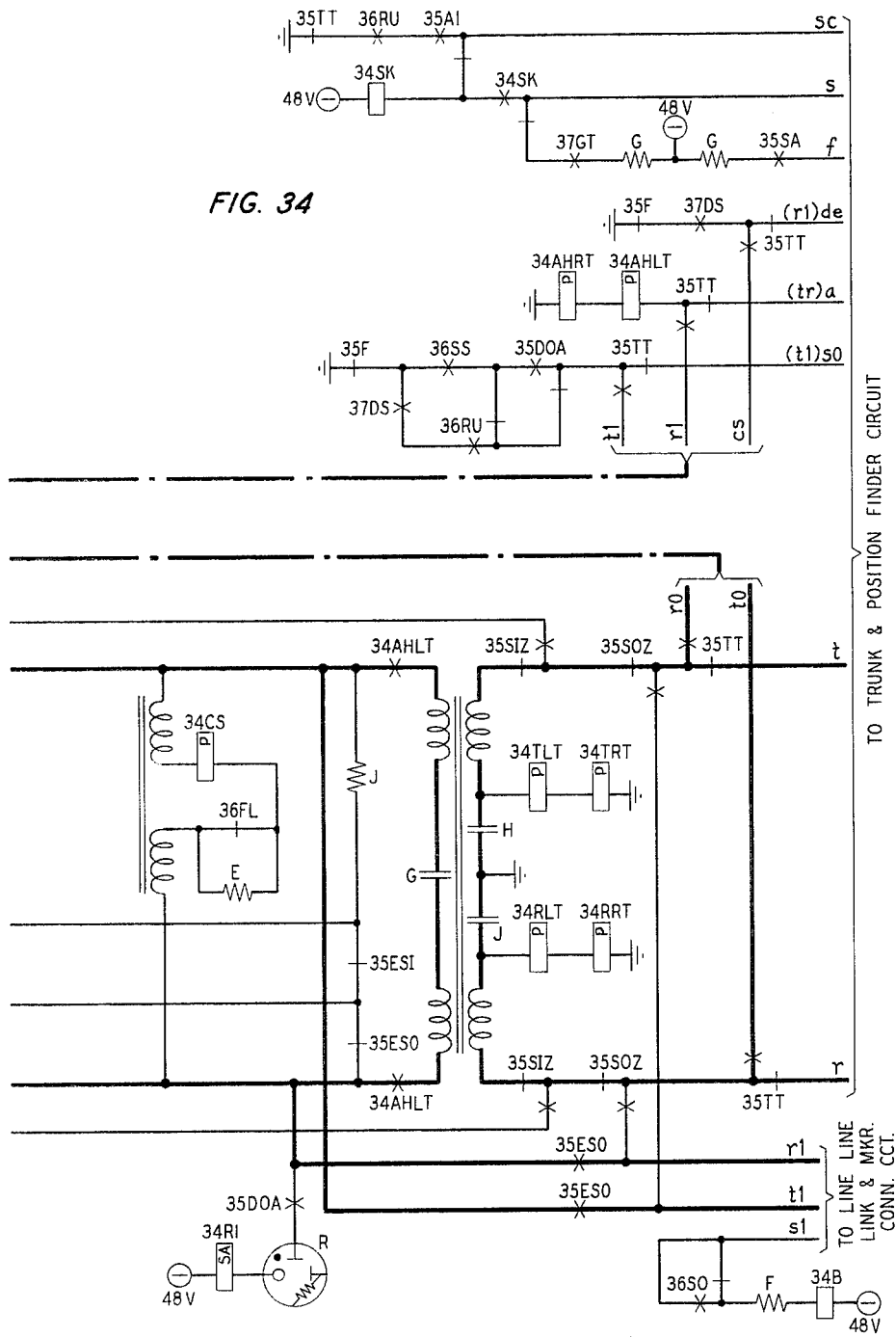
Figure 36:
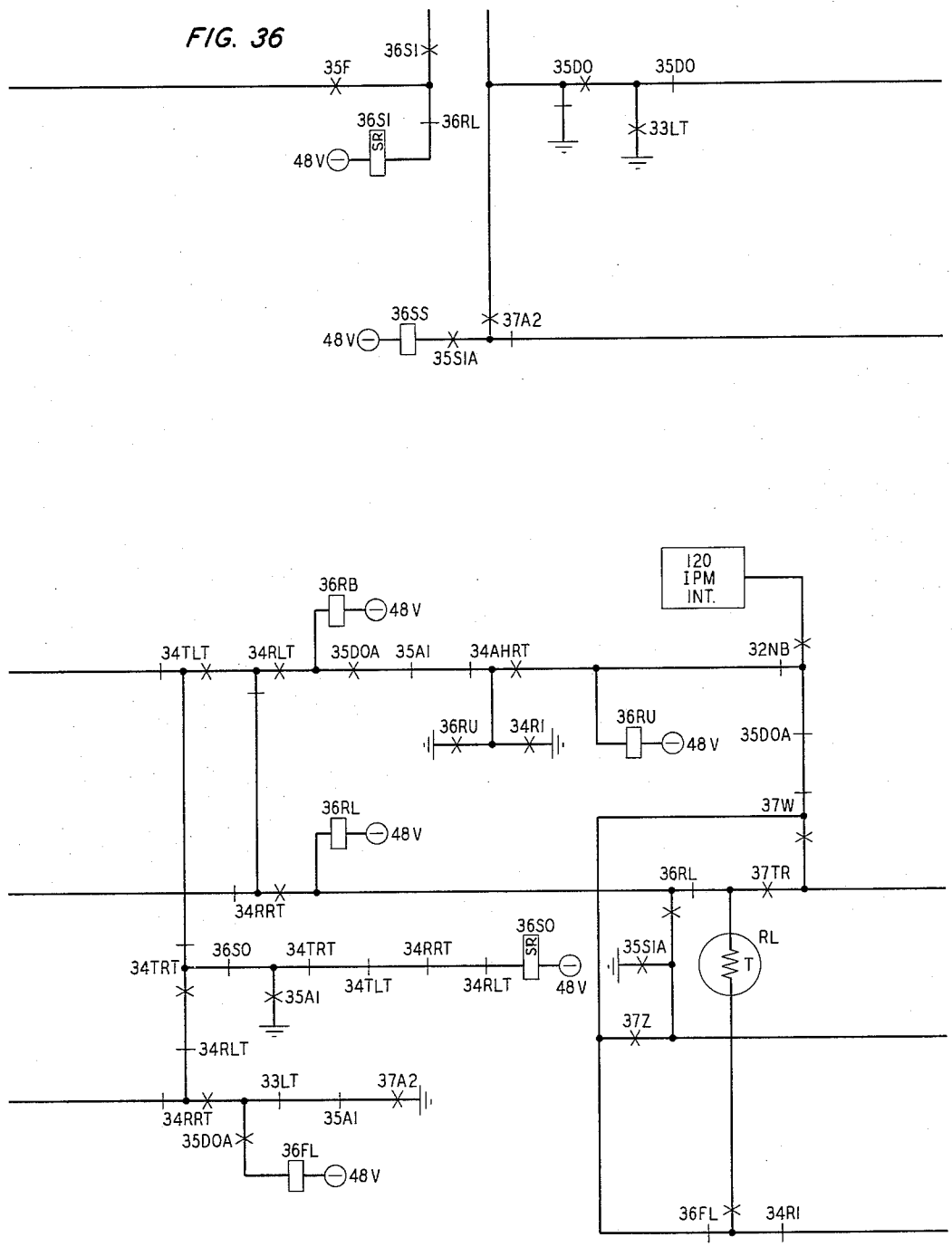
Figure 37:
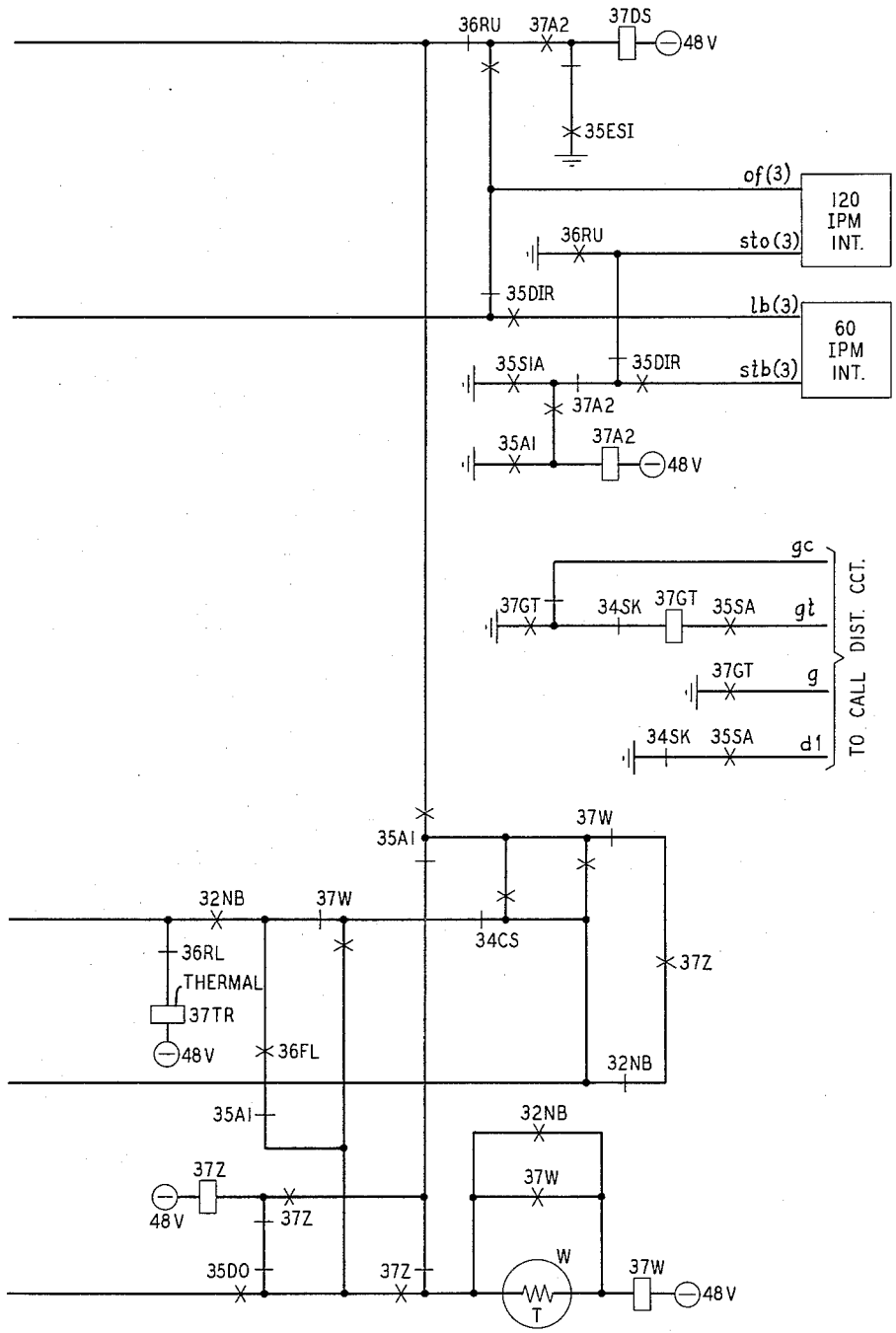
Figure 38:
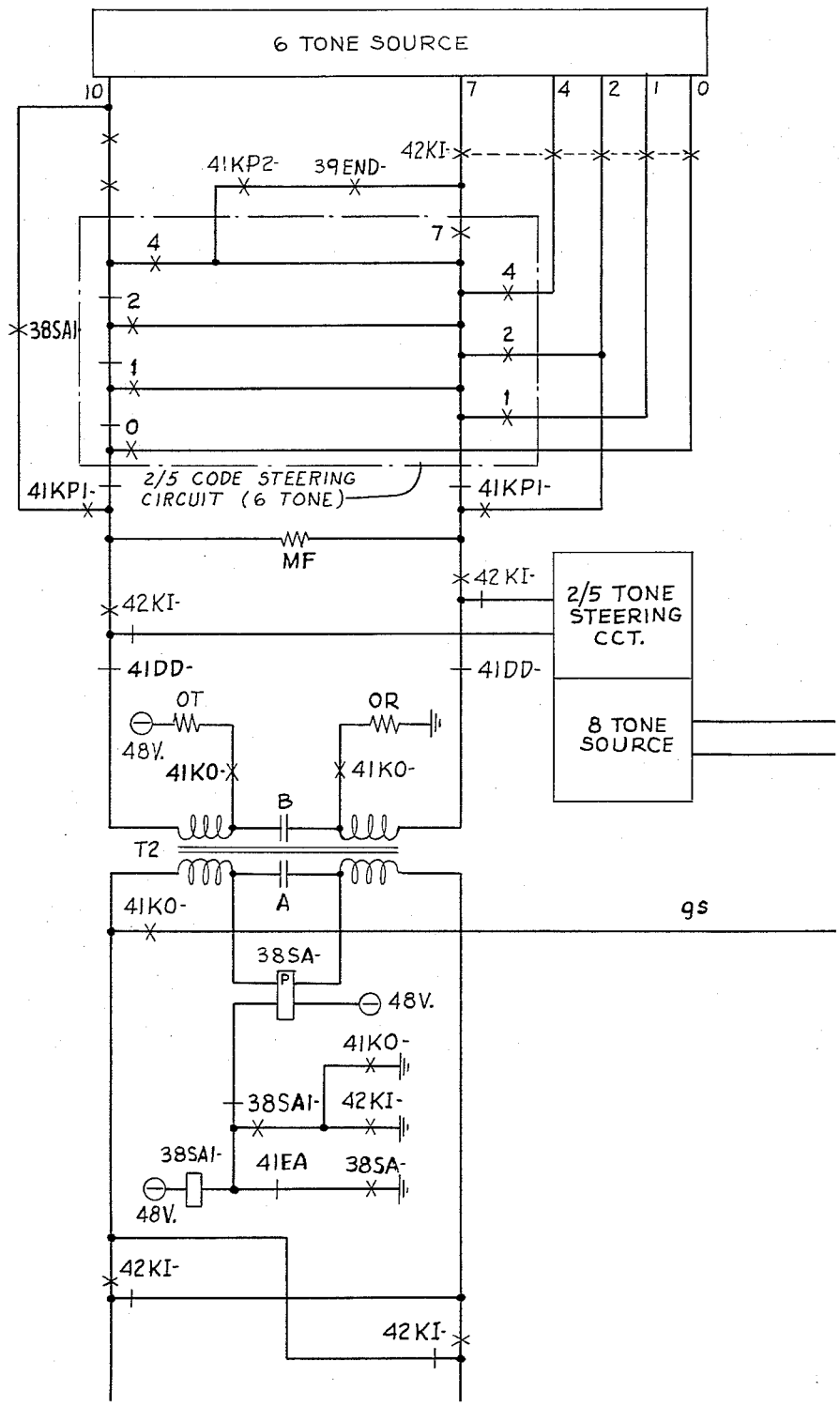
Figure 42:
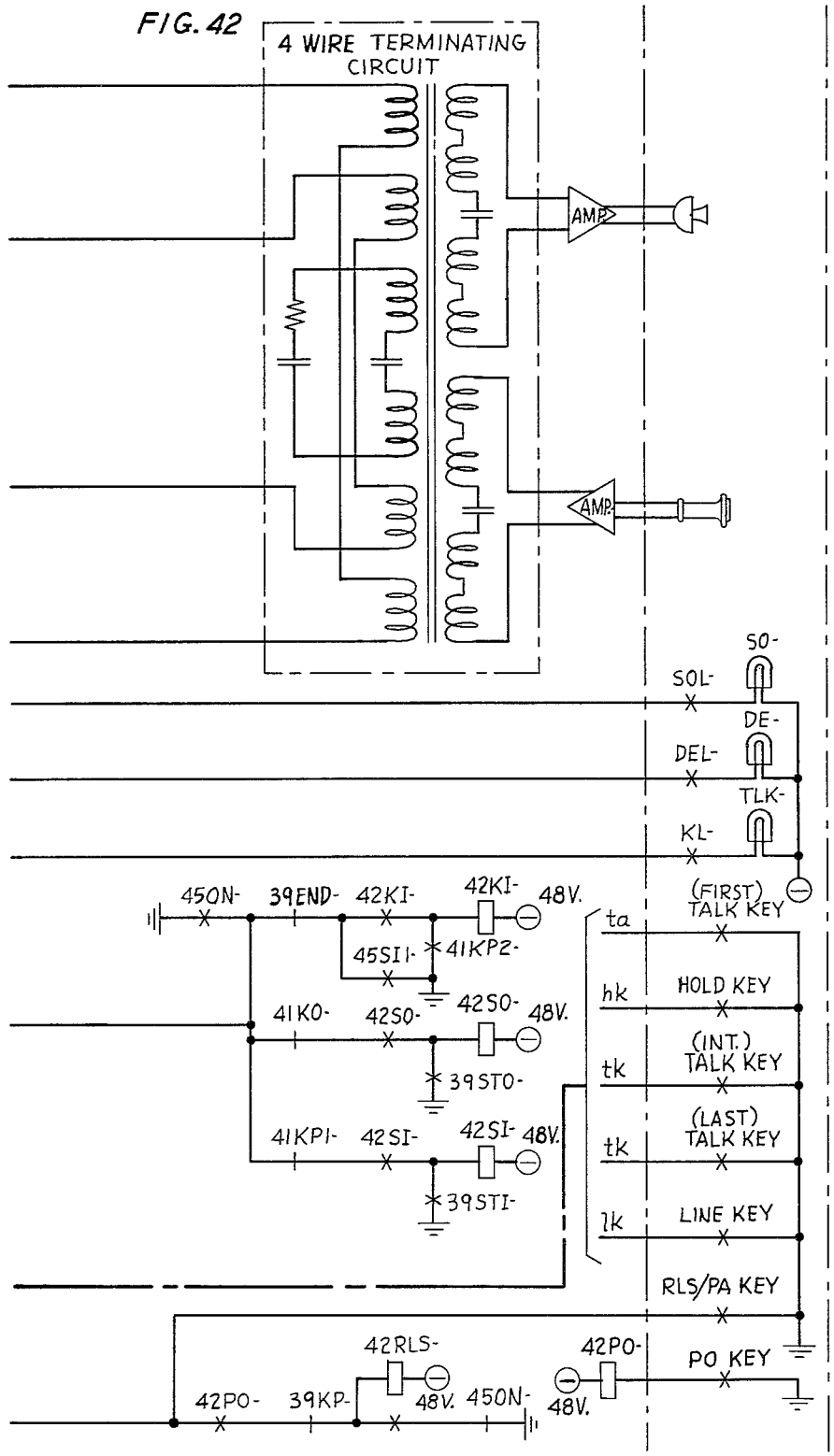
Figure 43:
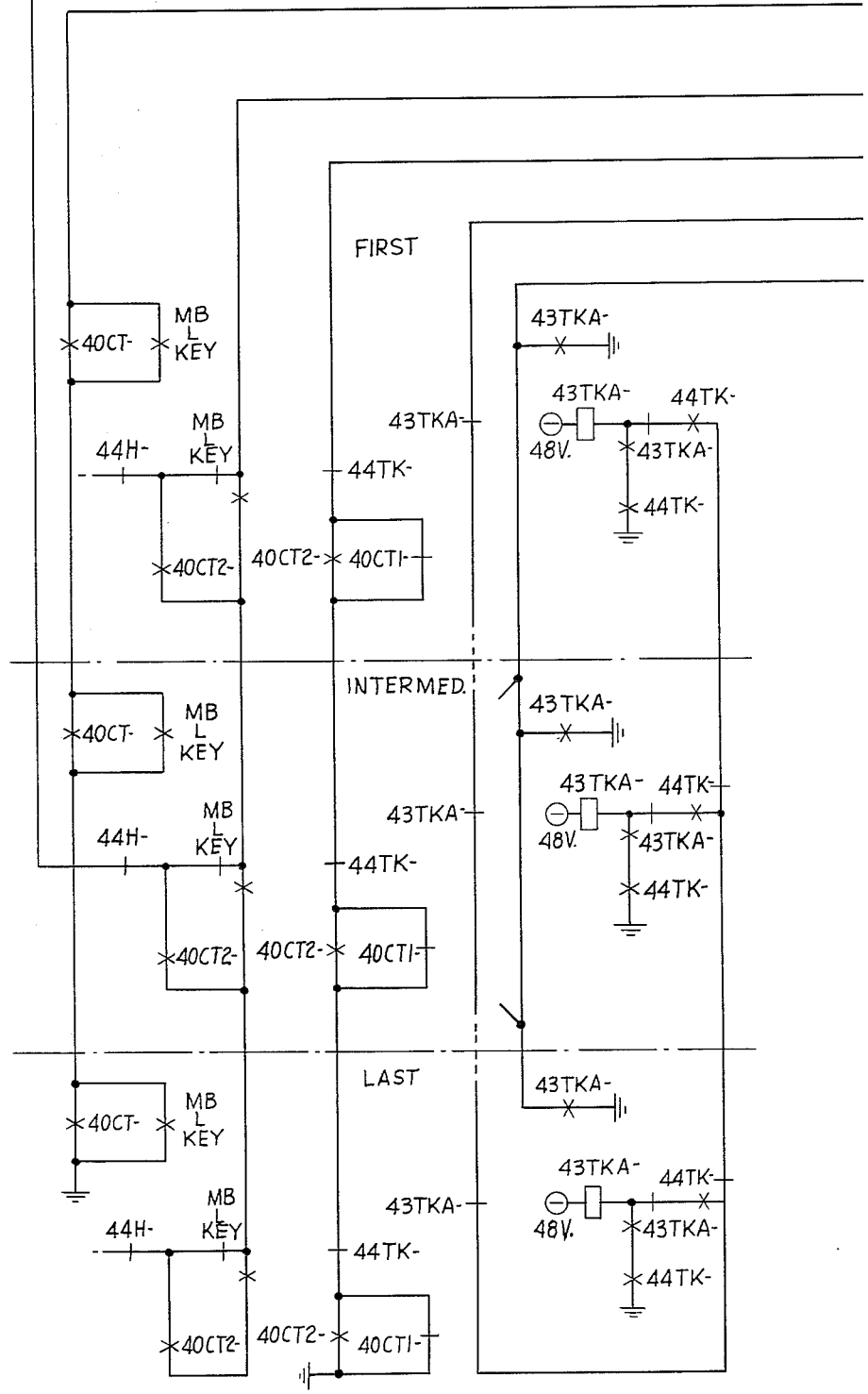
Figure 44:
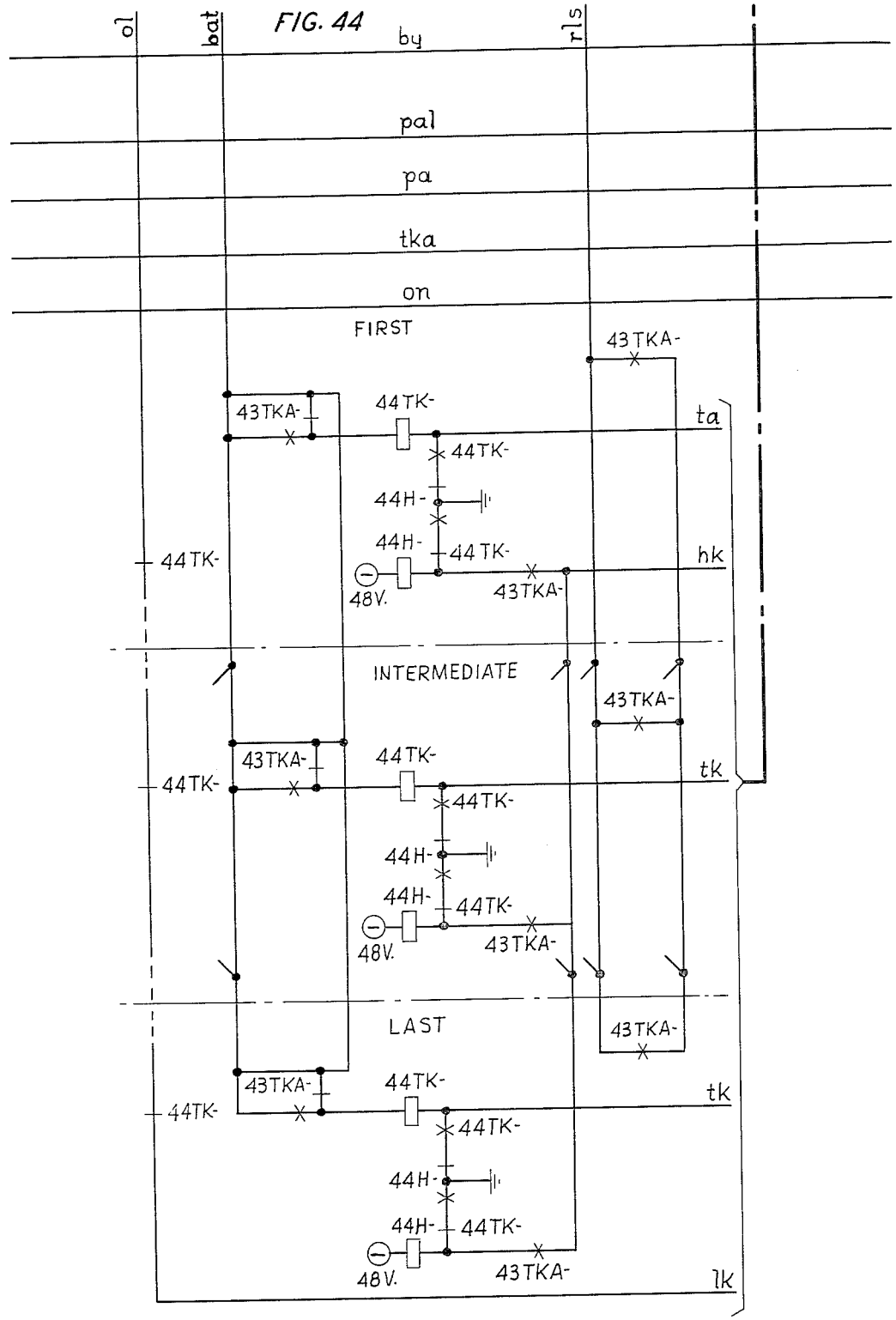
Figure 45:
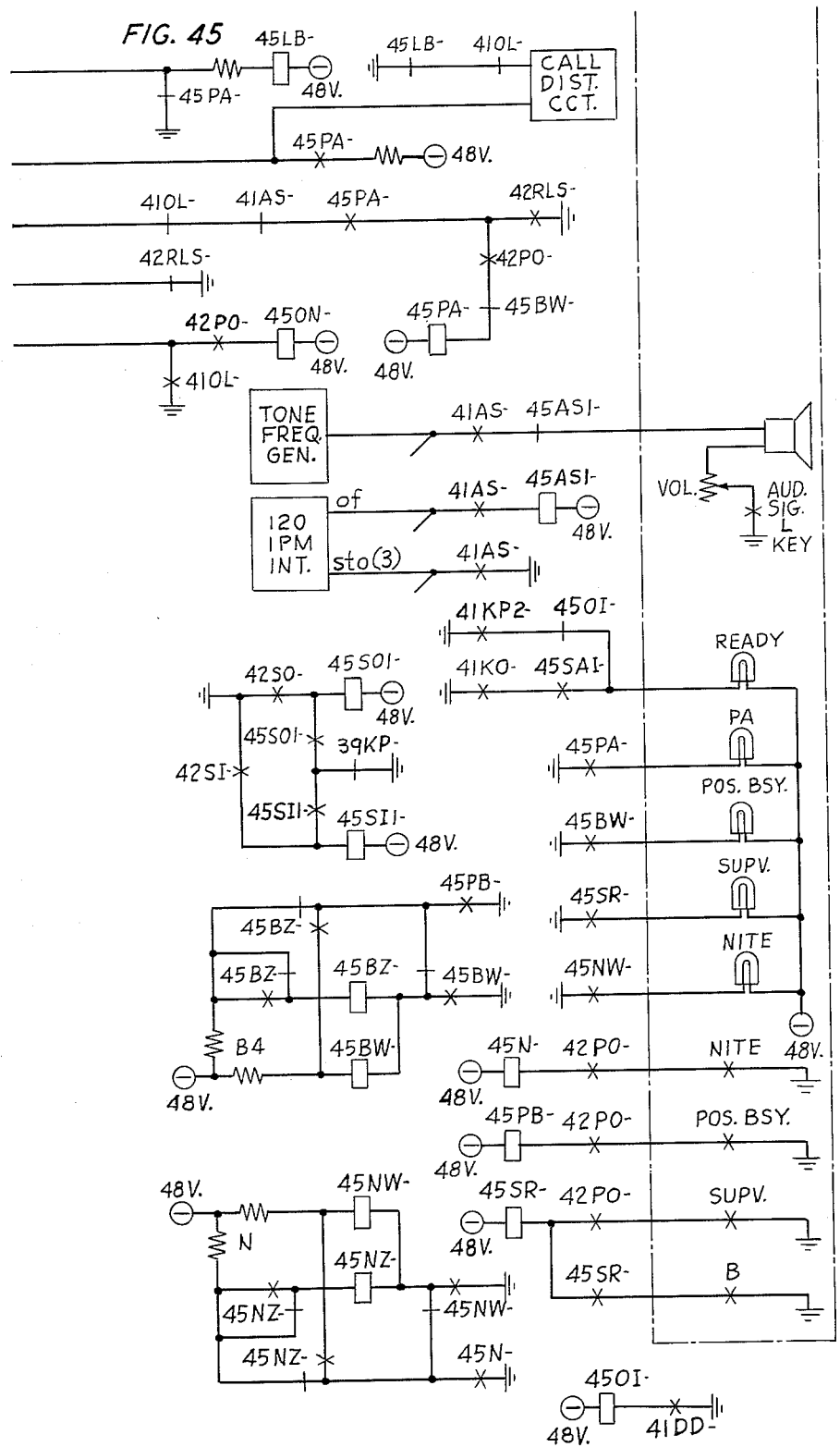

Since the attendant trunk has been assumed to have been seized on a transfer call, ground is applied to the start lead of the 120 IPM interrupter circuit by the attendant trunk over the path from ground including make contact 35S1A, back contacts 37A2 and 35DIR to the sto(3) lead (FIG. 37). The interrupter circuit in response thereto returns 120 IPM ground on lead of(3) which is forwarded over back contacts of relays 35DIR and 37A2 (FIG. 36) and make contacts 35S1A to the winding of relay 36SS which operates in step with the 120 IPM flashing. Relay 36SS operating in step with the 120 IPM flashing extends 120 IPM ground to the so lead over the path from ground (FIG. 34), back contact 35F, make contact 36SS, back contacts 36RU, 35DOA, and 35TT. Lead so is forwarded by the cut-through connections of the trunk finder and position finder to the loop circuit and from the loop circuit to the SO–lamp of the attendant console (FIG. 42). Lamp SO–flashes at 120 IPM.

In the attendant trunk (FIG. 37) relay 37DS is operated over the path from ground, make contact 35ESI and back contact 37A2. Relay 37DS operated extends a ground to lead de (FIG. 34) which lead is forwarded over the cut-through connection of the trunk finder and position finder to the loop circuit which continues the lead to the DE– lamp of the attedant console (FIG. 42). Lamp DE– lighted and lamp SO– flashing at 120 IPM informs the attendant that a transfer call is waiting to be answered by her. The attendant momentarily depresses the talk key next to the flashing SO– lamp. The talk key applies a momentary ground to the winding of the associated 44TK– talk relay which locks to ground in series with a back contact of a 44H– relay. The 44TK– relay operated also operates an associated 43TKA– relay for the selected loop over the ground made available in the position circuit over a back contact in FIG. 45 of relay 42RLS. The 43TKA– relay operates and locks to ground in series with an operated make contact of the associated 44TK– relay. The talk key which was momentarily depressed is illuminated by the operation of the TLK lamp, (FIG. 42) which lamp is operated from a ground made available over a make contact of the associated 43TKA– relay. The 43TKA– relay extends an operating ground to the winding of relay 45ON in the position circuit which operates and at its break contact opens the operating path for relay 41AS which releases silencing the audible signal.

Simultaneously with the operation of the 44TK–, relay 40CT2– in the loop circuit is operated over make contacts of relays 40CT1– and 44TK– associated with the selected loop. Relay 40CT2– at its break contact releases relay 41AS. Relay 43TKA– operated extends negative 130 volt battery from the position circuit through the loop circuit to the a– lead (FIG. 40) of the cut-through connection between the attendant trunk and the loop circuit, the path in the position circuit (FIG. 41) being traced from negative 130 volt battery, back contacts 45SO1, 45SI1, 39KP, and 39END to a 43TKA– make contact in the loop circiut (FIG. 40) and thence over lead a– through the cut-through connection of the trunk finder and position finder to the a lead of the attendant trunk (FIG. 34) operating relay 34AHLT. Relay 34AHLT completes a path over one of its make contacts from ground and back contacts of relays 35SIW, 35SOW to the winding of relay 35A1 which operates. Relay 35A1 operated operates relay 37A2 and also operates relay 36S0 over back contacts 34TRT, 34TLT, 34RRT, and 34RLT. Relay 37A2 at its break contact removes the starting ground from lead sto (3) of the 120 IPM circuit. Relay 37A2 operated also removes audible ringing tone from the tip and ring and transfers the winding of the 36SS relay from the 120 IPM circuit to ground available over a back contact of relay 35D0. Relay 36SS maintained operated in turn maintains source lamp SO–, (FIG. 42) associated with the selected loop, steadily illuminated. Relay 37A2 operated also transfers the winding of relay 37DS from the ground available over the make contact of relay 35ESI to the ground available over back contacts 36RU, 35D0, and make contact 33LT. The winding of relay 37DS was transferred to the circuit including the make contact of relay 33LT because relay 33LT is controlled by the condition of the transferring station's switchhook. When the transferring station goes to the on-hook condition, supervisory relay 24S1 in the incoming trunk releases causing a high resistance to be inserted in the 24AA–24RF calling bridge of the incoming trunk. This bridge, as mentioned above, controls the 33LT, 33LS, and 33LR supervisory bridge in the attendant trunk circuit. The high resistance inserted by the incoming trunk when the transferring station is in the on-hook condition causes relays 33LT and 33LR in the attendant trunk to release. Relay 33LT released would release relay 37DS extinguishing the destination lamp (FIG. 42), thereby informing the attendant in this case that the transferring station is in the on-hook condition.

Assuming, however, that the transferring station remains on-hook, the attendant may converse with the party at the transferring station to obtain information sufficient to enable her to ascertain the number of the station to which the call should be transferred. The talking path from the transferring station may be traced from the incoming trunk line link appearance to the attendant trunk link frame appearance through the attendant trunk and the trunk finder and position finder circuit cut-through connections, make contacts of the 43TKA– relay associated with the selected loop, the tip and ring leads of the position circuit to the four-wire terminating circuit (FIG. 42). The four-wire terminating circuit functions to connect the tip lead of the position circuit to the a lead of the position circuit and the ring lead of the position circuit to the b lead of the position circuit. The four-wire terminating circuit inductively couples the tip and ring of the position circuit via repeaters to the transmitter and receiver of the attendant's telephone set at the attendant console. The purpose of the four-wire path between the four-wire terminating circuit and the attendant's transmitter and receiver is to enable the position circuit to be located at a considerable distance from the attendant's telephone set and maintain adequate transmission characteristics such as are advantageously best provided by a four-wire transmission path.

Figure 39:
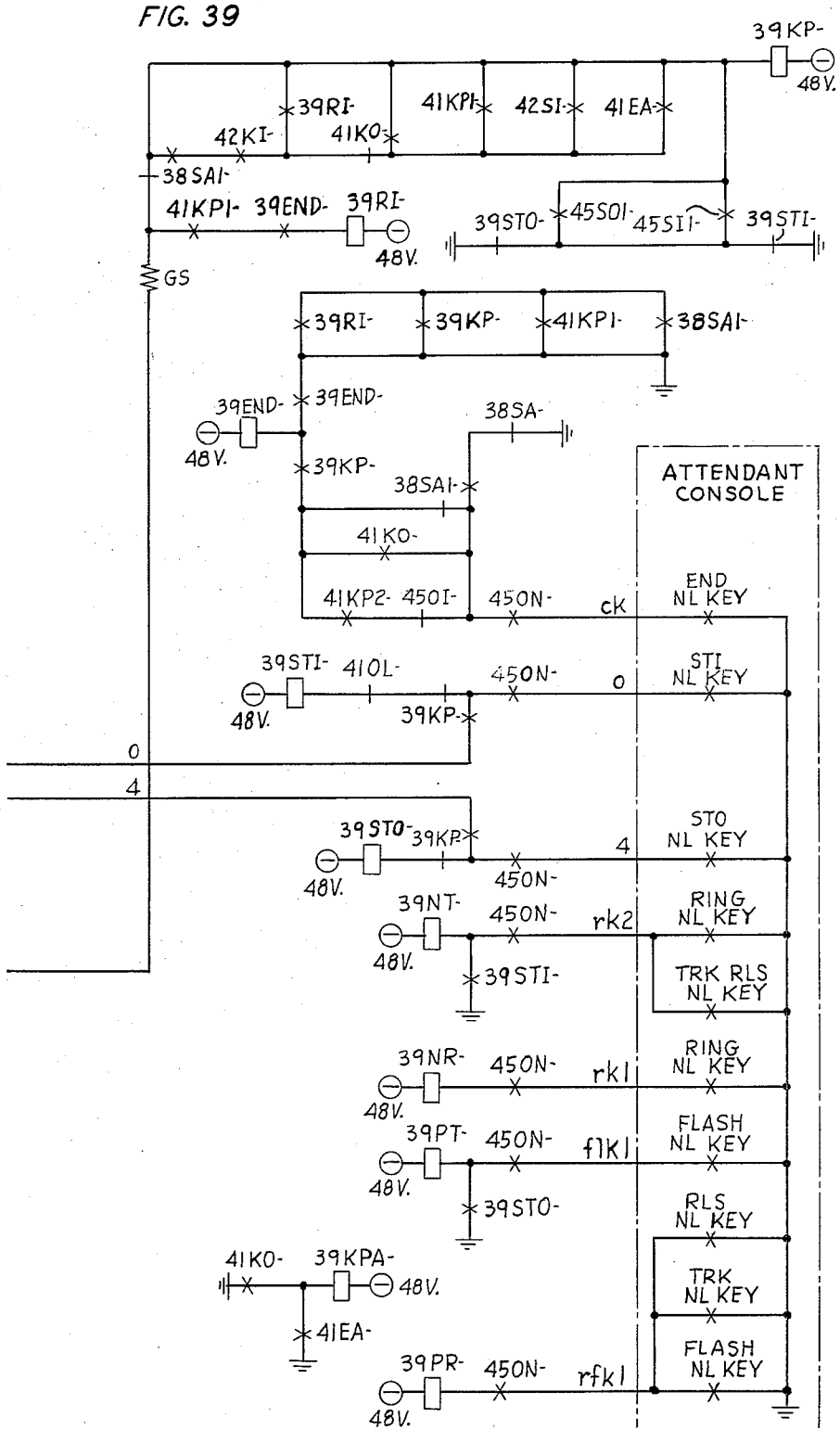
Figure 40:
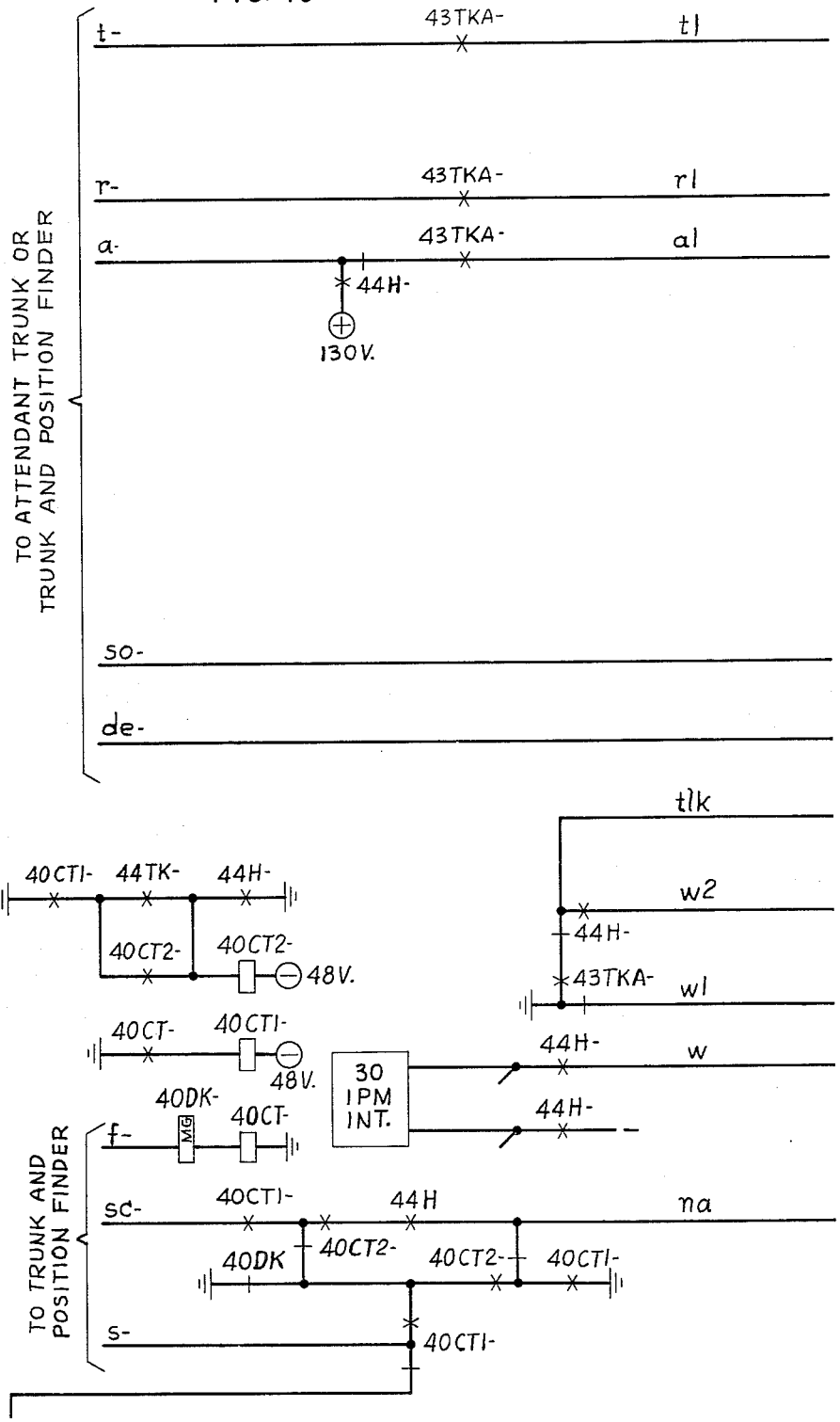

When the attendant has obtained sufficient information, she momentarily depresses the RLS key (FIG. 39). The release-forward key completes an operating ground over a make contact of relay 45ON to relay 39PR which operates temporarily for a slightly longer period than that during which the RLS key is operated. The temporary operation of relay 39PR completes a temporary path for the application of positive 130 volt battery (FIG. 41) to the *b* lead of the position circuit which is continued by the four-wire terminating circuit to the ring lead of the position circuit through the position circuit and the trunk finder and position finder cut-through connection to the attendant trunk, operating relay 34RRT in the attendant trunk. Relay 34RRT operated at one of its break contacts releases relay 36S0 which released operates relay 35RF over the path from ground, make contact 35A1, back contacts 36S0, 34TRT, and 34TLT, and a make contact of relay 34RRT. Relay 35RF operated reverses the battery and ground available over the winding of relay 33LS to the tip and ring of the attendant trunk circuit toward the line link frame appearance of the incoming trunk. Reversal of the battery and ground at these leads causes the release of relay 24AA and the operation of relay 24RF in the incoming trunk. In response to the release of relay 24AA and the operation of relay 24RF, the incoming trunk initiates a sequence of operations described above, culminating in the removal of ground from the sleeve lead of the connection between the transferring station and the trunk link appearance of the incoming trunk. This connection then releases.

When the attendant releases the RLS key (FIG. 39), relay 39PR releases causing the removal of positive 130 volt battery from the ring lead of the attendant trunk, thereby releasing relay 34RRT in the attendant trunk. Relay 34RRT released releases relay 35RF which restores the battery and ground polarity priorly existing at the windings of relay 33LS in the attendant trunk. The restoration of the original polarity at the windings of relay 33LS causes relays 24AA and 24RF in the incoming trunk to be respectively reoperated and released. When the transferring station has been released from its connection to the trunk link appearance of the incoming trunk, supervisory relay 24S1 in the incoming trunk releases inserting a high resistance in the 24AA–24RF calling bridge of the incoming trunk. As described above, the insertion of this high resistance causes relays 33LT and 33LR in the attendant trunk to release, of which relay 33LT releases relay 37DS, thereby extinguishing the destination lamp (FIG. 42). The attendant is thereby apprised that the transferring station has been successfully disconnected.

Thereupon the attendant may depress her start-in key STI (FIG. 39) to cause the incoming trunk to bid for an appropriate type of incoming register compatible with the type of key-pulsing equipment furnished at the position circuit for this attendant. More particularly, the momentary operation of start-in key STI provides an operating path to the winding of relay 39STI. Relay 39STI operates relays 39NT and 45SI1 in the position circuit. Relay 45SI1 locks and operates relay 42KI. The operation of the aforementioned 45STI and 39NT relays prepare the appropriate tone-pulsing circuits (not shown) for operation in transmitting tone pulses to the incoming register selected by the incoming trunk. In addition, relay 39NT operated at its make contact in FIG. 41 applies negative 130 volt battery to the *a* lead of the position circuit which is continued by the four-wire terminal circuit to the tip lead of the position circuit and the cut-through connections of the trunk finder and position finder circuit to the attendant trunk operating relay 34TLT therein. Relay 34TLT operated releases relay 36S0 which being a slow release relay allows sufficient time for the application of a possible additional potential to the ring lead to operate either relay 34RLT or relay 34RRT, as will be hereinafter more particularly described. When relay 36S0 releases, ground is made available over make contact 35A1 and back contacts 36S0 and 34TRT, back contacts 34RLT, 34RRT, 35ES0, 35SIW, and 35ESI to the winding of relay 35SIW. Relay 35SIW operates and applies holding ground to relay 35A1 so that relay 35A1 will remain operated when relay 34AHLT is thereafter released, infra. When the attendant releases the STI key (FIG. 39), relay 39STI releases which in turn releases relay 39NT. Release of relay 39NT removes negative 130 volt battery (FIG. 41) applied to the *a* lead of the position circuit and the removal of this potential causes the release of attendant trunk relay 34TLT. Attendant trunk relay 34TLT restored to normal reoperates relay 36S0. In addition, relay 39STI released completes a path (FIG. 39) over a make contact of relay 45SI1 to operate relay 39KP. Relay 39KP operated operates relay 41KP1 and removes negative 130 volt battery from the *a*1 lead of the loop circuit and the cut-through connection of the trunk-finder, position-finder releasing relay 34AHLT in the attendant trunk. Relay 34AHLT at its back contact applies a ground which is continued over a back contact of relay 35SIZ and a make contact of relay 35SIW to the winding of relay 35SIZ. Relay 35SIZ operates and transfers the tip and ring leads of the trunk link frame appearance of the attendant trunk from the supervisory circuits, including relays 33LS, 33LR, and 33LT, to the tip and ring leads associated with the cut-through connection of the trunk-finder, position-finder. The tip and ring are made available through the loop circuit and are extended over make contacts of relay 39KP, back contacts of relay 39RI, and make contacts of relay 42KI, and through the winding of repeat coil T2 to the primary winding of polar relay 38SA. When the incoming trunk has selected a multifrequency incoming register, the battery and ground applied by the selected register to the tip and ring leads is the battery and ground applied to the primary winding of relay 38SA. Relay 38SA operates in response to this battery and ground polarity. Relay 38SA operated operates relay 38SA1. Relay 38SA1 operated releases relay 41KP1, which slow releases, and when released permits relay 41KP2 to operate. Relay 41KP1 is made slow release in order that the MF oscillator may have had sufficient time to apply, over the make contacts of relays 41KP1 and 38SA1, a combination of tones to the tip and ring lead so that the incoming multifrequency register will be conditioned to respond to tone-pulsing, i.e., the incoming register will be instructed to remove its talk-off protection features. When relay 41KP1 is released, it restores the tip and ring from the incoming multifrequency register to the attendant's key-pulse circuits. Relay 41KP1 released also operates relay 41KP2. Relay 41KP2 operated lights the ready lamp at the attendant console (FIG. 45) informing the attendant that she may key-pulse the digits of the desired station. If the ready lamp had not been illuminated within a sufficient time, the attendant may depress the END key (FIG. 39) to initiate a sequence of operations that will cause the incoming trunk to cancel its request for an incoming register. The operation of the END key operates relay 39END, which operates relay 39RI in series with a make contact of relay 41KP1 and a back contact of relay 38SA1 (relay 38SA1 remaining normal because relay 38SA had not been operated by any battery and ground polarity made available by a selected register). Relay 39RI operated applies positive 130 volt battery (FIG. 41) over a make contact of relay 39KP to the ring, and ground to the tip, of the leads connected to the incoming trunk causing cold cathode tube R and relay 24R1 in the incoming trunk to operate. Operation of the 24R1 relay in the incoming trunk is described above.

Assuming the ready lamp to have been illuminated, the attendant key-pulses the four digits of the desired extension and thereafter depresses the END key, operating relay 39END. Relay 39END operates and releases relay 41KP2. Relay 41KP2 is slow release so that before releasing it completed a path made available by the operation of the 39END relay to a source supplying a combination of tones to indicate to the selected incoming register that key-pulsing has been completed. When relay 41KP2 releases, the ready lamp is extinguished. Relay 41KP2 released reapplies negative 130 volt battery (FIG. 41) to the *a1* lead, which reoperates relay 34AHLT in the attendant trunk. Relay 34AHLT operated operates relay 35ESI. Relay 35ESI operated releases relay 35SIW which in turn releases relay 35SIZ. Relay 35SIZ releases and restores the 33LS, 33LR, and 33LT supervisory circuits to the tip and ring leads. In addition, relay 41KP2 released causes the release of relays 42KI, 39KP, 38SA, 38SA1, and 39END in sequence.

Figure 35:
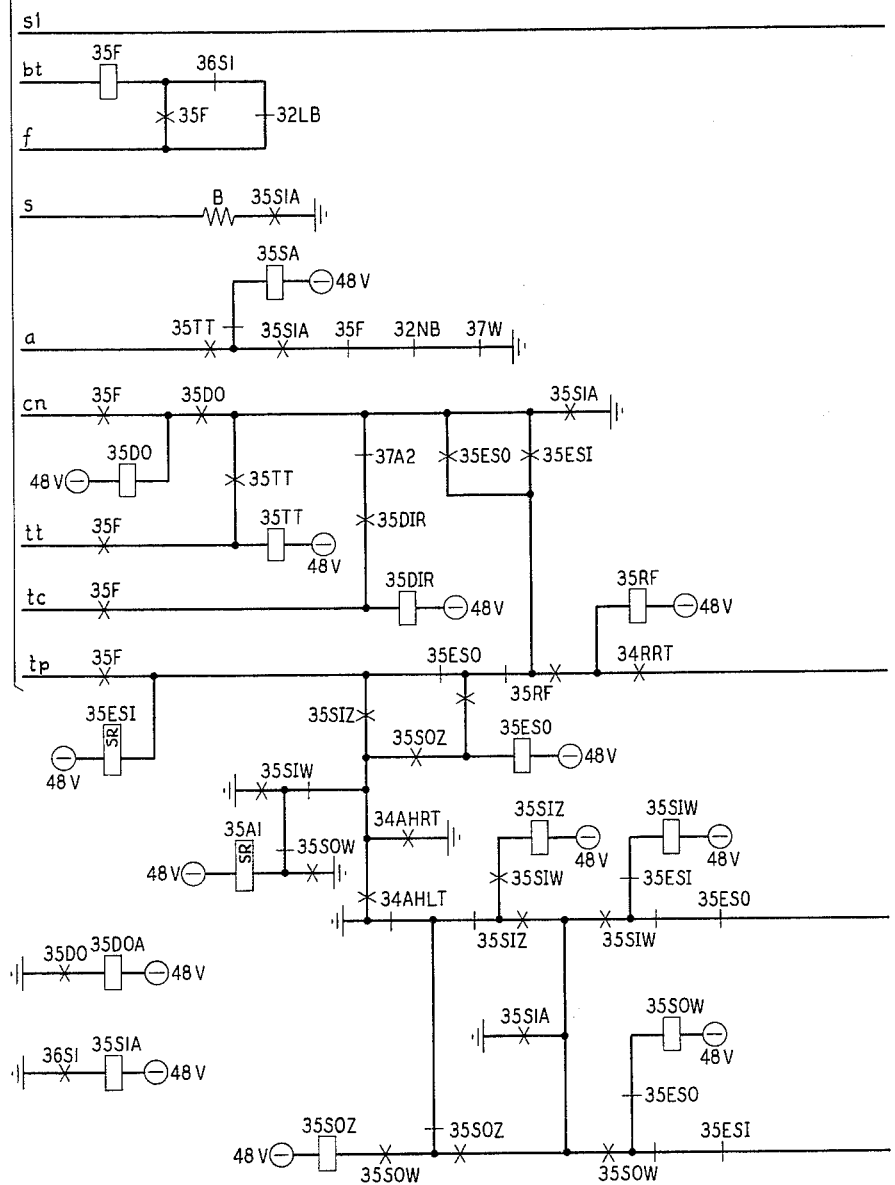

While the called line is ringing, an interrupted signal indicative thereof is applied by the 25FL relay of the incoming trunk to the tip and ring leads, causing relay 33LT to operate in unison. Relay 33LR does not operate in response to the application of ground to the tip and ring leads because its winding, which is connected to the ring lead over make contact 36S0, the primary winding of relay 33LS, back contact 35RF, back contact 35D0, make contact 37A2, back contact 35SIZ, make contact 35S1A, and back contact 36RB, merely sees the interrupted ground applied by the incoming trunk. Relay 33LT, operating in unison with the flashing signal, relays the signal to relay 37DS which in turn flashes destination lamp DE– (FIG. 42) at a rate indicating to the attendant that the called line is ringing. When the attendant recognizes the ringing signal at the destination lamp, she may release the call from her console by depressing the release key RLS/PA (FIG. 42). Relay 42RLS is thereby operated which in turn operates relay 45PA and releases the 44TK– relay of the selected loop circuit. This relay in turn releases the 43TKA– relay of the selected loop circuit, which in turn releases relays 45ON and 42RLS in sequence. The 43TKA– relay released removes negative 130 volt battery from the *al* lead causing relay 34AHLT in the attendant trunk to release, which in turn releases relays 35A1 and 36S0 in sequence. When the called station answers, relays 24S and 25S1 in the incoming trunk operate removing the flashing ground from the tip and ring and substituting the 24AA–24RF supervisory bridge. The application of the 24AA–25S1–24RF supervisory bridge provides a low resistance path for operating relays 33LR, 33LS, and 33LT in the attendant trunk. Relay 33LR operated opens the operating path for relay 36S1 which was initially operated when the call was directed to the attendant trunk causing relay 36S1 to release. Relay 36S1 released releases all the relays previously operated. Relay 36S1 released also effects the removal of battery from the *f* lead (FIG. 35) of the cut-through connection of the trunk-finger, position-finder causing the release of this circuit.

V. *Attendant trunk operation, tie line calls*

Since tie lines most usually appear on trunk link frames, when a call is transferred to an attendant trunk it will be necessary to utilize the line link frame of the attendant trunk to extend a connection to the trunk link frame appearance of the tie line trunk.

When a call has been transferred to the attendant trunk, operations may be assumed to have continued up to the point, described above, just before the attendant's operation of the start-in key. The attendant momentarily depresses the start-out key ST0 operating relay 39ST0. Relay 39ST0 operates operating relay 39PT which applies positive 130 volt battery (FIG. 41) to the *a* lead of the four-wire terminating circuit, which extends the potential to the tip lead operating relay 34TRT in the attendant trunk. Relay 34TRT operates, and releases relay 36S0 which, when released, completes an operating path to the winding of relay 35SOW. Relay 35SOW operates and applies an additional holding ground to the winding of the 35A1 relay. Relay 39ST0 in operating also operates relays 42S0, 45SO1, 41K0, and 39KPA in sequence. When the attendant releases the ST0 key, relay 39ST0 releases permitting relay 39KP to operate and removing negative 130 volt battery from the *al* lead associated with the attendant trunk, thereby releasing relay 34AHLT therein. Relay 34AHLT released completes a path to operate relay 35SOZ. Relay 35SOZ operated transfers the tip and ring leads from the trunk-finger, position-finger, which leads were formerly associated with the incoming trunk circuit through the attendant trunk circuit, to the line link frame appearance of the attendant trunk. The position circuit applies a calling bridge across the tip and ring leads and grounds the ring lead to cause the line link frame appearance of the attendant trunk to initiate a service request. When the dial tone marker, in response to the service request, obtains access to the line link frame having the line link appearance of the attendant trunk, the rate treatment assigned to the attendant trunk (in the illustrative embodiment, rate treatment 14) is cross-connected to operate relay 3RV in the dial tone marker. When the marker selects an originating register, the ground applied to operate dial tone marker relay 3RV is extended to operate relay 3RV in the selected originating register. Relay 3RV operated causes the originating register to reverse the battery and ground normally provided by the originating register to a calling line. The reversed battery and ground polarity, applied at the line link frame appearance of the attendant trunk, signals the supervisory circuits in the position circuit that an originating register is attached. The operating path may be traced from the line link appearance through the attendant trunk, through the cut-through condition into the position circuit, through the operated 39KP relay, back contacts of relay 39RI, back contacts of the 42KI relay, T2 repeat coil, to the primary winding of the 38SA relay. In addition, a path is provided by the operated 41K0 relay through a 226 ohm resistance, through the back contact of the 38SA1 relay, make contacts of the 39KP relay, to ground.

The tip and ring polarity provided to the winding of the 38SA relay causes the 38SA relay to operate, which in turn operates relay 38SA1. Relay 38SA1 operated completes an operating ground made available over a make contact of relay 41K0 to light the ready lamp at the attendant console. The illuminated ready lamp informs the attendant that a register is attached and that she may proceed to key-pulse the called number. Assuming the attendant to key-pulse tie line code 121 (plus four additional digits corresponding to the number of the called station at the distant end of the tie line), the originating register will respond to the class of service indicated by the calling line link frame appearance of the attendant trunk and translate the called code to ground the 2dt lead to the completing marker. Lead 2dt grounded operates the 10ET called number translator. Relay 10ET operates, inter alia, steering the decimal output digit buses of the "A" digit translator to operate relay 12ET2. Relay 12ET2 operates and steers the decimal digit output buses of the "B" digit translator, inter alia, to ground service common point 12*sc*4. Since it has been assumed that the class of service assigned to the calling line link frame appearance of the attendant trunk is the same as that of the customer group with which the attendant trunks are associated, the ground applied to service common point 12*sc*4 will be extended over a make contact screening relay 8S62 to operate route relay 12R62(TL21) in series with a make contact of relay 9S(RT19). In this operating path rate treatment relay 9S(RT19) was operated by the rate treatment number assigned to the calling line link frame appearance of the attendant trunk. The marker proceeds to establish the linkage to the tie line trunk indicated by the operation of route relay 12R62(TL21) in the usual manner. When the linkage is established from the line link frame appearance of the attendant trunk to the selected tie line trunk, the battery and ground applied by the selected trunk will cause the release of relay 38SA in the position circuit. Relay 38SA released extends ground over its back contact and a make contact of relays 28SA1, 41K0, and 39KP to the winding of relay 39END. Relay 39END operates and releases relays 41K0, 38SA1, 39KP, and 39KPA in sequence and extinguishes the ready lamp, whereupon relay 39END is released. However, incident to the operation of relay 39END, negative 130 volt battery was reapplied to the *al* lead of the loop circuit, which negative battery potential effected the reoperation of relay 34AHLT in the attendant trunk. Relay 34AHLT reoperated operates relay 35ES0, which in turn will release relays 35SOW and 35SOZ in sequence.

The attendant may at this time depress the RLS–PA key (FIG. 42) to disassociate the position circuit from the loop circuit so that the attendant may be available to serve other calls requiring her assistance. When the called party at the remote end of the selected tie line answers the call, the tie line trunk reverses the battery and ground potentials applied to the winding of relay 34CS, which being a polar relay operates in response thereto. Relay 34CS operated completes an operating ground to the winding of relay 37W over the path from ground, make contact 35S1A, make contact 34CS, back contacts 35A1 and 37Z, and thermistor W to the winding of relay 37W. Thermistor W allows relay 37W to operate after a short interval sufficient to assure that the ground was not caused by an inadvertent operation of the switchhook in answering the call. Relay 37W operates and releases relay 35SA, which in turn effects the release of the trunk-finder, position-finder circuit by removing battery from the *f* lead, causing the release of 40CT– relay in the selected loop circuit.

The called party at the distant end of the tie line may be flashing his switchhook to have the call transferred either to another station at his remote end of the tie line or to another station directly served by the central office under consideration. In response to the on-hook condition of the switchhook flash, relay 34CS temporarily releases, temporarily providing an operating path over its back contact, make contact 37W, and back contacts of relays 35D0 and 37Z to the winding of relay 37Z, causing relay 37Z to immediately operate. Relay 37Z operated transfers the winding of the 37W relay to a holding path which may be traced over make contacts 37Z and 37W, back contact 34CS, and make contact 35S1A to ground. On the release of the switchhook, relay 34CS is reoperated and open-circuits the aforementioned holding path for relay 37W. Relay 37W releases and operates relays 36RU and 35SA. Relay 35SA reoperated makes available the winding of the 37GT relay to the call distribution circuit. Relay 37GT operates and signals the call distribution circuit to assign a trunk finder and position finder to connect the attendant trunk with an idle loop. When the cut-through connection is established from the attendant trunk to the selected loop, the attendant is informed that she is being recalled by a party at the remote end of a tie line. Relay 36RU in the attendant trunk, which was operated by the release of relay 37W, conditioned the 120 IPM circuit to apply 120 IPM ground to the *of*(3) lead. This 120 IPM ground is applied over make contacts of relays 36RU and 37A2 causing relay DS to operate in step. Relay 37DS at one of its make contacts flashes the destination lamp at 120 IPM. In addition, relay 37DS completes a ground to flash a source lamp at 120 IPM. The source and destination lamps both flashing at 120 IPM inform the attendant that a tie line recall condition exists. The attendant thereafter depresses the talk key and converses with the parties on the line. When she has determined to whom the call should be transferred, she pushes the RLS–D key (FIG. 39). Operations continue as described above for the operation of the RLS key up to the point where relay 35RF is operated. Relay 35RF operated under these circumstances, however, opens the holding path for relay 35ES0 which releases. Relay 35ES0 released removes the 34CS relay holding bridge from the tip and ring of the attendant trunk's line link frame appearance, releasing the previously selected tie line trunk. The release of the tie line trunk enables the attendant to extend the connection from either the line link frame appearance of the attendant trunk or the trunk link frame appearance of the incoming trunk, in the manner previously described.

On the other hand, had the attendant trunk initially been seized by the marker because a directory number of a customer group attendant had been dialed, the marker, upon seizing the attendant trunk, would operate relay 35DIR. The operating path for relay 35DIR may be traced from ground in FIG. 21, make contact of relay 14TRF3, make contact of relay 21CDN, back contact of relay 11TER2 and lead *tc* to the winding of relay 35DIR in the attendant trunk. Relay 35DIR operated extends a ground to condition the 60 IPM circuit to apply 60 IPM ground to lead 1b(3) (FIG. 37) which is extended over a make contact of relay 35DIR, a back contact of relay 37A2, and a make contact of relay 35S1A to the winding of relay 36SS. Relay 36SS applies over its make contact a 60 IPM flashing ground to the source lamp, which signal informs the attendant that her assistance is required on a directory number call. The attendant may thereafter extend the call by depressing the start-in or start-out key, as described above.

VI. *Dial "0" call to customer group attendant*

The attendant may also be reached by a station of a customer group dialing "0." When a dial "0" connection is established, a communications switch linkage is extended from the line link frame appearance of a calling station to the trunk link frame appearance of the attendant trunk. Since neither an incoming trunk nor an intra-office trunk is as yet involved in the connection, the attendant is not provided with access to an incoming register into which called number digits could be entered by depressing the start-in key. Accordingly, calls extended by an attendant trunk, when seized on a dial "0" call, may only be made via the line link frame appearance of the attendant trunk. When the calling station dials "0," the originating register (FIG. 6), responding to the fact that the calling extension is a station of a customer group, grounds the *x*11 lead to operate the 6X11 called number translator relay in the marker. The 6X11 relay operated steers the ground appearing on the "0" digit output bus of the "A" digit translators to service common punching 12*sc*2. The ground appearing on service common punchings 12*sc*2 is extended over an operated make contact of any one of screening relays 9S(RT1) through 9S(RT4) to service common punching 12*sc*1, and over a make contact of the screening relay brought up by the class of service indicating the calling station's customer group. Assuming the station initiating the dial "0" call to be in customer group 62, the ground applied to service common punching *sc*1 is extended over make contact 8S62 to operate route relay 12R62(ATT) in series with no charge coin relay 13NCCN. Relay 12R62(ATT) designates the route to the group of attendant trunks serving the calling station's customer group. The marker then functions to establish a communications linkage from the line link frame appearance of the calling station to the trunk link frame appearance of a selected attendant trunk. When the marker seizes the trunk link frame, a ground in FIG. 21 is extended over a back contact of relay 21TRF3, through a make contact of relay 13NCCN, through the winding of relay 21CNK to the *cn* lead, operating relay 35D0 in the attendant trunk. Relay 35D0 operated removes the 33LS–33LR relays from the attendant trunk supervisory circuit and inserts the windings of relay 33LT across the tip and ring of the attendant trunk toward the calling station. When the cut-through condition is established from the attendant trunk to a selected loop, the source lamp is operated at 120 IPM by contacts of the 36SS relay. The attendant answers the call by depressing the talk key for the selected loop and converses with the calling station. The attendant may thereafter extend the call by depressing her start-out key, as described above.

Assuming that the attendant desires to reach the telephone company operator, she will key the directing digit "9" followed by the "0" operator digit. The originating register (FIG. 6) responds to the directing digit "9" to ground the lt lead to the completing marker. The operated 6LT relay steers the "0" output bus of the "A" digit translator to the winding of a route relay (not shown) for telephone company operator trunks, and the marker thereafter functions to establish a communications linkage from the line link frame appearance of the attendant trunk to the trunk link frame appearance of the telephone company operator trunk (not shown). The telephone company operator responds to the customer group attendant's call in the usual manner, and when the attendant is satisfied that the telephone company operator has sufficient information, she may depress the HOLD key (FIG. 42) at her console. The operated 43TKA– relay for the selected loop steers the ground provided by the operated HOLD key to the winding of a 44H– relay associated with the selected loop. The 44H– relay operates and releases the associated 44TK– and 43TKA– relays of the selected loop and locks in series with a back contact of relay 44TK–. Relay 44H– in operating activates the 30 IPM circuit to apply 30 IPM ground to the winding of the 41W relay in the position circuit, and relay 41W at one of its make contacts interrupts an operating ground to the TLOK lamp at a 30 IPM rate to inform the attendant that the call on the selected loop has been placed in the hold condition. Relay 44H– operated removes negative 130 volts from the a lead that was provided by the position circuit and applies positive 130 volts to the a lead, releasing relay 34 AHLT and operating relay 34 AHRT in the attendant trunk. When the telephone company operator desires to obtain access to the customer group attendant, for example, to supply time and charge information on the call, the telephone company operator will apply A.C. ringing signal to the tip and ring operating relay 34R1 through the R1 tube in the attendant trunk. Relay 34R1 over one of its make contacts applies ground to operate relay 36RU over a make contact of relay 34AHRT. Relay 36RU operates and conditions the 120 IPM circuit to apply 120 IPM ground to the winding of relay 37DS, which in turn flashes the destination lamp at 120 IPM. The destination lamp flashing at this rate informs the attendant that she is being recalled by the telephone company operator. The attendant then redepresses the talk key releasing the associated 44H– relay of the selected loop circuit. Relay 44H– released removes positive 130 volt battery and reapplies negative 130 volt battery to the a lead of the attendant trunk, releasing relay 34AHRT and operating relay 34AHLT. Relay 34AHRT releases relay 36RU which removes the 120 IPM flashing signal from the destination lamp. In the preceding connection, if the calling station and customer group attendant had been informed by the telephone company operator that some delay would be encountered in reaching the desired destination, the calling station could hang up and thereafter be recalled by the customer group attendant depressing the ring key. When the attendant depresses the ring key, relays 39NT and 39NR operate. Relays 39NT and 39NR operated apply negative 130 volt battery to the a and b leads of the four-wire terminating circuit which extends this potential to both the tip and ring leads toward the attendant trunk. Relays 34TLT and 34RLT in the attendant trunk operate, opening the operating path for relay 36S0 which releases. As described above, relay 36S0 is made slow release to allow time in which to detect a possible second polar signal being applied by the position circuit to the aforementioned tip and ring leads. In the present case, since negative 130 volt battery is applied both to the tip and ring leads resulting in the operation of both relays 34TLT and 34RLT, the slow release of relay 36S0 permits a ground to be applied over make contacts of both relays 34TLT and 34RLT to the winding of relay 36RB. Relay 36RB operates and transfers the tip and ring at the trunk link frame appearance of the attendant trunk to ringing generator. Ringing is removed when the attendant releases the ring key. When the calling station answers, the recall supervisory relay 33LT operates and applies ground over one of its make contacts and make contacts 35D0, 37A2, and 35S1A to the winding of relay 36SS, which operates illuminating the source lamp steadily. The source lamp when steadily illuminated informs the attendant that the recalled extension is off-hook. The recalled extension may at this time converse both with the customer group attendant and the telephone company operator.

If in the extension of the dial "0" call by the customer group attendant to the telephone company operator the attendant had depressed the release RLS–PA key (FIG. 42) instead of the hold key, the selected loop would be disassociated from the position circuit by the sequence of operations initiated by the operation of relay 34CS, as described above. The telephone company operator thereafter maintains control of this connection so that if a delay is encountered, the calling station may hang up and thereafter be recalled by the telephone company operator. The telephone company operator to recall the station applies ringing current to the tip and ring leads. Ringing current operates relay 34R1 in the attendant trunk through the R tube. Relay 34R1 in operating extends a ground over back contacts of relays 34AHRT and 35A1, make contact 35D0A, to the winding of relay 36RB. Relay 36RB operates and applies ringing generator to the tip and ring leads of the trunk link appearance of the attendant trunk toward the station to be recalled.

Should the calling station, which had initiated a dial "0" call and been connected to a telephone company operator, flash his switchhook after the customer group attendant had depressed the release RLS–PA key (FIG. 42) to dissassociate herself from the connection, the flashing station will alert the telephone company operator. The on-hook condition during the switchhook flash will release supervisory relay 33LT in the attendant trunk which completes an operating path to relay 36FL. Relay 36FL operates and temporarily inserts a high resistance in series with the winding of the CS relay across the tip and ring toward the line link frame appearance of the attendant trunk. The high resistance causes the supervisory relay in the telephone company operator's trunk to release, informing her that the calling party requires her assistance. The high resistance bridge is removed when the station releases the switchhook.

It is to be understood that the above-described arrangements are illustrative of the application of the principles of the invention; numerous other arrangements may be devised by those skilled in the art without departing from the spirit and scope of the invention.

What is claimed is:

1. A telephone switching system comprising a plurality of lines and trunks, a plurality of line switches and trunk switches, said lines appearing on said line switches and said trunks appearing on said trunk switches, said lines and said trunks each being capable of exhibiting a calling condition requiring the extension of a connection over said switches from said calling one of said lines to any of said trunks and from said calling one of said trunks to any of said lines, a marker responsive to said calling conditions for operating said line switches and said trunk switches to extend said connections, said marker means normally recording the class of service assigned to said calling ones of said lines, means responsive to the number called by said calling one of said lines and to said class of service of said calling line for selecting one of said trunks, means controlled by the selected one of said trunks for seizing the appearance of the line called by said calling line, means for ascertaining the class of service of said line called by said calling line, means for comparing said last-mentioned and said first-mentioned classes of service, and means controlled by said comparing means for controlling said marker to complete the operating of said switches when said classes of service match.

2. A telephone switching system according to claim 1 wherein said means for ascertaining the class of service of said line called by said calling line includes means for registering the classes of service of predetermined groups of said lines and for restricting said comparing means to compare said calling line class of service only with the classes of service of said predetermined groups of lines.

3. A telephone switching system according to claim 1 wherein said means controlled by the selected one of said trunks for seizing the appearance of the line called includes number group means for decoding said called number to obtain an equipment location and ringing combination and wherein said means for ascertaining the class of service of said called line includes means responsive to said ringing combination for selectively storing the class of service provided at said equipment location indicated by said number group.

4. A telephone switching system according to claim 3 wherein said means controlled by the selected one of said trunks includes means responsive to said ringing combination for canceling the seizure of the line corresponding to said equipment location indicated by said number group.

5. A telephone switching system according to claim 3 wherein said marker includes means responsive to said selectively stored class of service to extend a connection from said selected one of said trunks to another of said plurality of trunks.

6. A telephone switching system according to claim 5 wherein said trunks each have an appearance on said line switches and wherein said connection is established from said line switch appearance of said selected one of said trunks to the trunk switch appearance of said another of said plurality of trunks.

7. A telephone switching system according to claim 6 wherein said marker is controlled to complete the operating of said switches to establish a connection from the trunk switch appearance of said selected trunk to the line switch appearance of said called line.

8. A telephone switching system including a plurality of lines and trunks, each of said lines being capable of initiating service request signals, line switches, trunk switches, marker means for controlling said switches to establish connections among said lines and trunks, means associated with said line switches for indicating the calling privileges assigned said lines appearing on said switches, means at said marker for registering the indicated calling privileges assigned to any calling one of said lines, said marker means responding both to the registered calling privileges of said calling one of said lines and to the number called by said calling one of said lines for selecting one of said trunks, means controlled by the selected one of said trunks for registering the calling privileges of any called one of said lines, means for comparing said registered calling privileges to control said marker to complete a connection from said calling one of said lines over said selected one of said trunks to said called one of said lines, means for registering in said selected one of said trunks the calling privileges of said called line, means at said selected one of said trunks responsive to further service request signals initiatable by said called one of said lines, and means for transferring said calling privileges registered in said selected one of said trunks to said first-mentioned registering means at said marker.

9. A telephone switching system comprising a plurality of lines, incoming trunks and attendant trunks, line switches, trunk switches, said lines appearing on said line switches and said trunks appearing on said trunk switches, marker means for establishing connections among said lines and trunks, said marker means including means for registering the calling privileges of said lines, means for registering a number called by said lines, means for translating a called number to designate a code point corresponding thereto, a plurality of screening relays, means for operating one of said screen relays in accordance with the registered calling privileges of a calling one of said lines, a plurality of route relays, said route relays designating trunk switch operating instructions for said trunks, means for operating one of said route relays from one of said code points over a path determined by said operated one of said screening relays, said marker means thereafter controlling said switches to establish a connection from one of said lines over a selected one of said trunks to said called one of said lines, means at said selected one of said trunks operable incident to the establishment of said last-mentioned connection for registering the calling privileges of said called line, means at said selected one of said trunks responsive to signals from said called one of said lines to transfer said registered calling privileges of said called line to said first-mentioned marker registering means, means for re-operating said plurality of screening relays according to the registered calling privileges of said called one of said lines, means controlled by said selected one of said trunks for designating one of said code points corresponding to a line switch appearance of said selected one of said trunks, and means for operating one of said route relays from said last-mentioned code point over a path determined by said last-operated one of said screening relays, said marker means thereafter controlling said switches to establish a connection from said called one of said lines over said selected one of said trunks to one of said attendant trunks.

10. A telephone switching system comprising a plurality of private lines, private branch exchange extension lines and trunks, line switches, trunk switches, marker means for controlling said line switches and said trunk switches, said trunks including at least one group of attendant trunks for each private branch exchange telephone customer having private branch exchange lines appearing on said line switches, said trunks including a plurality of common trunk groups, each of said attendant and each of said common trunks having an appearance on said line and on said trunk switches, means for extending a connection from one of said common trunks to one of said attendant trunks including means for registering a directory number transmitted over a calling one of said common trunks, number group means controlled by said marker in response to said directory number registering for translating said directory number to obtain a line location on said line switches and ringing information for said calling one of said trunks, said marker normally being responsive to said line location and said ringing information to extend a path over said trunk and said line switches from said calling one of said trunks to said line location, means at said marker responsive to particular ones of said ringing combination for inhibiting the establishment of said connection, means for transmitting information from said line location to said incoming trunk, means at said incoming trunk responsive to the receipt of said information for releasing said marker, means responsive to the release of said marker for registering the number of said calling one of said trunks, means responsive to the registering of said trunk number for seizing a marker, means controlled by said last-mentioned marker for translating said trunk number to obtain the line location thereof and further ringing information for said calling one of said trunks, said marker thereafter being responsive to said line location ringing combination and said information transmitted from said first-mentioned line location to said incoming trunk for operating said line switches and said trunk switches to extend a path from said line appearance of said calling one of said trunks to the trunk appearance of one of said attendant trunks.

11. In a telephone system, a plurality of lines, trunks, line switches, trunk switches, a common switch-controlling marker, said marker controlling said switches to establish forward linkage connections between route selected trunks and called ones of said lines and to establish call-back linkages between said route selected ones of said trunks and said calling ones of said lines, said route selected ones of said trunks being determined by translating the numbers called by said calling ones of said lines and the calling privileges of said calling ones of said lines, the improvement comprising means operative incident to the establishment of said forward linkages for ascertaining the calling privileges of said called ones of said lines, means for comparing said first and said second-mentioned calling privileges, said common switch-controlling marker thereafter being controlled by said comparing means.

12. An automatic telephone exchange system for providing private line service to private lines and private branch exchange line service to private branch exchange lines comprising a plurality of lines including said private lines and groups of said private lines assigned to different private branch exchange customers, a plurality of common trunks, means for extending directly indialed connections from calling ones of said common trunks to any of said lines, means for identifying lines having said connections extended thereto, means for storing said identifying information for predetermined ones of said lines in said calling ones of said trunks, and means responsive to the storage of said identifying information for controlling said trunk to distinguish between subsequent service request signals transmitted by a connected-to one of said private lines and a connected-to one of said private branch exchange lines.

13. An automatic telephone exchange system serving private and private branch exchange lines comprising a plurality of private telephone attendant positions individual to distinct groups of said private branch exchange lines, means for establishing communications connections normally terminating to called ones of said private and private branch exchange lines, means for thereafter distinguishing between service request signals transmitted by said private lines and by said distinct groups of private branch exchange lines, said distinguishing means including means for registering the class of service assigned said private branch exchange lines incident to the establishment of said terminating communications connections thereto, and means for translating said class of service of service request signaling ones of said lines having said class of service registered in said registering means to select a switch route to a distinctive one of said attendant positions.

14. An automatic telephone exchange system according to claim 13 further comprising common means controlled by any said distinctive one of said attendant positions for extending a connection to another of said lines.

15. A crossbar telephone switching system comprising a plurality of lines appearing on line link frames, trunks appearing on trunk link frames, said line link frames including means for identifying a customer class of service for each of said lines, and common control means responsive to the calling condition of said lines and of said trunks for establishing communications channels from said line links to said trunk links and vice versa, characterized by first and second register means associated with said common control means and third register means associated with said trunks, means for transferring said customer class of service information from said line link frames to said first and said third registers preparatory to the extension of a channel from one of said trunks to one of said lines, means for transferring said class of service information from said third register to said second register preparatory to the extension of said channel from said line to another of said trunks and from said other of said trunks to a further one of said lines, means for registering the customer class of service of said further one of said lines in said first register, and means for comparing the registrations in said first and second registers.

16. A crossbar telephone switching system according to claim 15 having intra-office trunks and including means for obtaining the customer class of service of one of said lines preparatory to the extension of a channel from one of said lines to one of said intra-office trunks, characterized by means for transferring said class of service information to said second register means from said obtaining means, means for operating said registration comparing means preparatory to the extension of a channel from said one of said lines to said further one of said lines over one of said intra-office trunks.

17. A telephone central office characterized by circuits for providing private branch exchange service among station lines and private trunks individual to a plurality of different telephone customers, said circuits comprising first means for identifying the lines belonging to each telephone customer and the call-completing privileges assigned each of said lines, means for representing predetermined groups of said identifying means, means responsive to the telephone number called by said lines and said representing means for determining the type of call being made, second identifying means for obtaining corresponding information of called lies, means operative incident to the establishment of a connection to one of said lines for storing information provided by said second identifying means, means responsive to said stored information for preparing a switching route to one of said private trunks means responsive to said type-of-call determining means for operating said storing means, means for comparing information provided by said first and second identifying means, and means responsive to said comparing means for controlling the establishment of a connection to any of said lines.

18. A telephone central office system directly serving a plurality of individual subscriber lines and groups of lines and trunks assigned to different private branch exchange telephone customers comprising means for receiving telephone codes called by any of said individual subscriber lines and any of said lines in said groups of lines assigned to said different private branch exchange customers, and common control means connectable to said receiving means and responsive to a telephone code called by a line in one of said groups of lines for deriving a switching route restricted to said one of said groups of lines and trunks and responsive to said code called by any of said individual subscribers to derive a switching route common to said individual lines.

19. In a telephone system, a plurality of lines, trunks, line switches, trunk switches, a common switch-controlling marker, said marker controlling said switches to establish forward linkage connections between route selected trunks and called ones of said lines and to establish call-back linkages between said route selected ones of said trunks and said calling ones of said lines, said route selected ones of said trunks being determined by translating the numbers called by said calling ones of said lines and the calling privileges of said calling ones of said lines, the improvement comprising means operative incident to the establishment of said forward linkages for ascertaining the calling privileges of said called ones of said lines, means for storing predetermined ones of said calling privileges in said route selected ones of said trunks, and means conditioned by said trunk having one of said predetermined calling privileges stored therein for enabling said trunk to respond to service request signals from said called line.

20. In a telephone system according to claim 19 the improvement wherein said marker is controlled by said trunk conditioned means responding to said service request to establish a linkage connection from said trunk having said one of said predetermined calling privileges stored therein to another of said plurality of trunks.

References Cited by the Examiner
UNITED STATES PATENTS

| | | | |
|---|---|---|---|
| 1,492,995 | 5/1924 | Lubberger | 179—18 |
| 2,748,197 | 5/1956 | Ostline | 179—27 |
| 3,025,357 | 3/1962 | Jacobitti et al. | 179—27 |

ROBERT H. ROSE, *Primary Examiner.*

WILLIAM C. COOPER, *Examiner.*